US010579669B2

(12) United States Patent
Kojima et al.

(10) Patent No.: US 10,579,669 B2
(45) Date of Patent: *Mar. 3, 2020

(54) SYSTEM, APPARATUS, METHOD, PROGRAM AND RECORDING MEDIUM FOR PROCESSING IMAGE

(71) Applicant: Sony Corporation, Tokyo (JP)

(72) Inventors: Tamaki Kojima, Kanagawa (JP); Yoshihiro Yamaguchi, Tokyo (JP); Mikio Sakemoto, Saitama (JP); Katsuhiro Takematsu, Kanagawa (JP)

(73) Assignee: Sony Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/296,409

(22) Filed: Mar. 8, 2019

(65) Prior Publication Data

US 2019/0205335 A1    Jul. 4, 2019

Related U.S. Application Data

(63) Continuation of application No. 15/944,124, filed on Apr. 3, 2018, now Pat. No. 10,289,698, which is a
(Continued)

(30) Foreign Application Priority Data

Feb. 1, 2006 (JP) .................. P2006-024185

(51) Int. Cl.
*G06F 16/583* (2019.01)
*G06F 16/40* (2019.01)
(Continued)

(52) U.S. Cl.
CPC ............ *G06F 16/583* (2019.01); *G06F 16/40* (2019.01); *G06F 16/51* (2019.01);
(Continued)

(58) Field of Classification Search
CPC ......... G06F 17/30265; G06F 17/30247; G06F 17/30793; G06K 9/00; G06K 9/00288;
(Continued)

(56) References Cited

U.S. PATENT DOCUMENTS 5,023,725 A  *  6/1991  McCutchen ........... G03B 37/04
                                                   348/264
6,035,055 A      3/2000  Wang et al.
(Continued)

FOREIGN PATENT DOCUMENTS

JP     H0793369       4/1995
JP     2000076275 A   3/2000
(Continued)

OTHER PUBLICATIONS

Sarvas R et al: "Metadata Creation System for Mobile Images" The 2nd International Conference on Mobile Systems, Applications and Services.Boston, MA, vol. CONF. 2, Jun. 6, 2004 (Jun. 6, 2004), Jun. 9, 2004 (Jun. 9, 2004) pp. 36-48.
(Continued)

*Primary Examiner* — Ali Bayat
(74) *Attorney, Agent, or Firm* — Lerner, David, Littenberg, Krumholz & Mentlik, LLP

(57) ABSTRACT

An image processing system may include an imaging device for capturing an image and an image processing apparatus for processing the image. The imaging device may include an imaging unit for capturing the image, a first recording unit for recording information relating to the image, the information being associated with the image, and a first transmission control unit for controlling transmission of the image to the image processing apparatus. The image processing apparatus may include a reception control unit for controlling reception of the image transmitted from the imaging device, a feature extracting unit for extracting a
(Continued)

feature of the received image, a second recording unit for recording the feature, extracted from the image, the feature being associated with the image, and a second transmission control unit for controlling transmission of the feature to the imaging device.

19 Claims, 46 Drawing Sheets

Related U.S. Application Data continuation of application No. 15/705,673, filed on Sep. 15, 2017, now Pat. No. 9,965,493, which is a continuation of application No. 15/370,237, filed on Dec. 6, 2016, now Pat. No. 9,805,064, which is a continuation of application No. 14/695,422, filed on Apr. 24, 2015, now Pat. No. 9,710,490, which is a continuation of application No. 12/977,835, filed on Dec. 23, 2010, now Pat. No. 9,047,287, which is a continuation of application No. 11/700,736, filed on Jan. 31, 2007, now Pat. No. 7,884,847.

(51) Int. Cl.
| G06F 16/51 | (2019.01) |
| G06K 9/46 | (2006.01) |
| G06K 9/62 | (2006.01) |
| G06T 7/70 | (2017.01) |
| G06K 9/00 | (2006.01) |
| G06K 9/48 | (2006.01) |
| H04N 7/18 | (2006.01) |

(52) U.S. Cl.
CPC ..... *G06F 16/5838* (2019.01); *G06K 9/00268* (2013.01); *G06K 9/00288* (2013.01); *G06K 9/46* (2013.01); *G06K 9/4647* (2013.01); *G06K 9/4652* (2013.01); *G06K 9/481* (2013.01); *G06K 9/6212* (2013.01); *G06T 7/70* (2017.01); *G06T 2207/10004* (2013.01); *G06T 2207/10024* (2013.01); *G06T 2207/30201* (2013.01); *G06T 2207/30242* (2013.01); *H04N 7/183* (2013.01)

(58) Field of Classification Search
CPC .. G06K 9/4647; G06K 9/4652; G06K 9/6212; G06K 9/46; G06K 2009/00328
USPC .......................................................... 382/190
See application file for complete search history.

(56) References Cited

U.S. PATENT DOCUMENTS

| 6,240,423 | B1 | 5/2001 | Hirata |
| 6,441,854 | B2 | 8/2002 | Fellegara et al. |
| 6,535,243 | B1 | 3/2003 | Tullis |
| 6,577,249 | B1 | 6/2003 | Akatsuka et al. |
| 6,876,382 | B1 | 4/2005 | Sakamoto |
| 6,885,761 | B2 | 4/2005 | Kage |
| 7,627,199 | B2 | 12/2009 | Sato et al. |
| 7,646,915 | B2 | 1/2010 | Ikeda et al. |
| 8,116,571 | B2 * | 2/2012 | Kamei ............... G06K 9/00275 382/190 |
| 8,732,161 | B2 | 5/2014 | Jain et al. |
| 9,008,435 | B2 | 4/2015 | Gokturk et al. |
| 2001/0008417 | A1 * | 7/2001 | Kinjo ............... H04N 1/00132 348/207.99 |
| 2002/0191082 | A1 | 12/2002 | Fujino et al. |
| 2003/0011683 | A1 | 1/2003 | Yamasaki et al. |
| 2004/0008258 | A1 | 1/2004 | Aas et al. |
| 2004/0017930 | A1 | 1/2004 | Kim et al. |
| 2004/0174442 | A1 | 9/2004 | Chosa |
| 2004/0202384 | A1 | 10/2004 | Hertz et al. |
| 2005/0088690 | A1 | 4/2005 | Haneda et al. |
| 2005/0105779 | A1 * | 5/2005 | Kamei ............... G06K 9/00281 382/118 |
| 2005/0201595 | A1 * | 9/2005 | Kamei ............... G06K 9/00275 382/118 |
| 2005/0219375 | A1 | 10/2005 | Hasegawa et al. |
| 2005/0226413 | A1 | 10/2005 | Wada |
| 2005/0251463 | A1 | 11/2005 | Nagai et al. |
| 2007/0097420 | A1 | 5/2007 | Shah et al. |
| 2007/0172155 | A1 | 7/2007 | Guckenberger |
| 2008/0126426 | A1 | 5/2008 | Manas et al. |

FOREIGN PATENT DOCUMENTS

| JP | 2001309102 A | 11/2001 |
| JP | 2002189724 A | 7/2002 |
| JP | 2002204444 A | 7/2002 |
| JP | 2002366558 A | 12/2002 |
| JP | 2002374481 A | 12/2002 |
| JP | 2003030243 A | 1/2003 |
| JP | 2003150932 A | 5/2003 |
| JP | 2003204541 A | 7/2003 |
| JP | 2003337817 A | 11/2003 |
| JP | 2004005314 A | 1/2004 |
| JP | 2004062868 A | 2/2004 |
| WO | 2005031612 A1 | 4/2005 |

OTHER PUBLICATIONS

Oami Ryoma et al: "Mobile multimedia library: An MPEG-7 application with camera equipped mobile phones" Proceedings of SPIE—The Internationalsociety for Optical Engineering; Applications of Digital Image Processing XXVIII vol. 5909, 2005, pp. 1-9,.section 2.2; figure 1 section 6.

Boyd J E et al: "Content description servers for networked video surveillance" International Conference on Information Technology: Coding and Computing, Las Vegas, NV, US,vol. 1, Apr. 5, 2004 (Apr. 5, 2004), Apr. 7, 2005 (Apr. 7, 2005) pp. 798-803.

Davis M et al: Mobile media metadata for mobile imaging 2004 IEEE International Conference on Multimedia and Expo (ICME) (IEEE Cat.No. 04TH8763), vol. 3, 2004, pp. 1707-1710.

Office Action from Japanese Application No. 2006-024185, dated Apr. 26, 2011.

Makiko Noda, Cosmos: Convenient Image Retrieval System of Flowers for Mobile Computing Situations, Information Processing Society memoir vol. 2001 No. 108 IPSJ SIG Notes, Japan Information Processing Society of Japan, Nov. 16, 2001, vol. 2001 No. 108, pp. 9-14.

Introduccion of Windows 2000/XP improvement, PC Japan vol. 7 No. 7, Japan Softbank publishing Co., Ltd., Jul. 1, 2002, vol. 7, p. 169.

Chitose Yamazaki, Windows practical use guide No. 1, Nikkei PC beginners vol. 10, Japan, Nikkei BP Nikkei Business Publications, Inc., Oct. 13, 2005, vol. 10 No. 20, p. 107-108.

Office Action from Japanese Application No. 2006-024185, dated Jul. 19, 2011.

Office Action from Japanese Application No. 2006-024185, dated Oct. 2, 2012.

Office Action from Japanese Applicatin No. 2012-263444, dated Oct. 1, 2013.

Office Action from Japanese Application No. 2012-263444, dated Jan. 9, 2014.

Japanese Office Action for JP Application No. 2014135789, dated Mar. 12, 2015.

Japanese Office Action for JP Application No. 2012263444, dated Sep. 8, 2015.

Japanese Office Action for JP Application No. 2014135789, dated Dec. 17, 2015.

Japanese Office Action for JP Application No. 2014-135789, dated May 16, 2016.

Summons to Attend Oral Proceedings for Application No. EP07001738.9 dated Aug. 2, 2017.

(56) References Cited

OTHER PUBLICATIONS

Brief Communication in Preparation of Oral Proceedings for Application No. EP07001738.9, dated Jan. 4, 2018.
Aigrain, et al., "Content-Based Representation and Retrieval of Visual Media: A State-of-the-Art Review", Multimedia Tools and Applications, Jan. 1, 1996, pp. 179-202, vol. 3, No. 3, Kluwer Academic Publishers, Boston, MA, USA.
Extended European Search Report including Written Opinion for European Patent Application No. 18164324.8 dated Jun. 18, 2018.

\* cited by examiner

FIG. 11
201
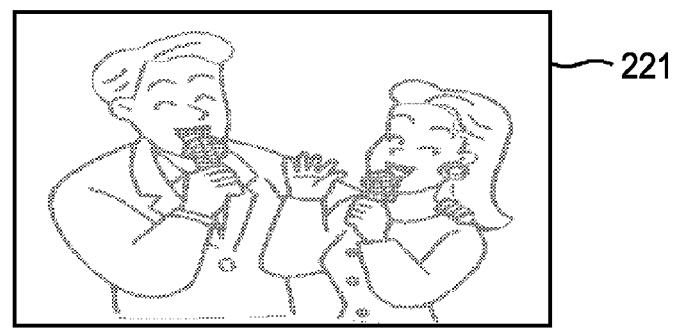
221
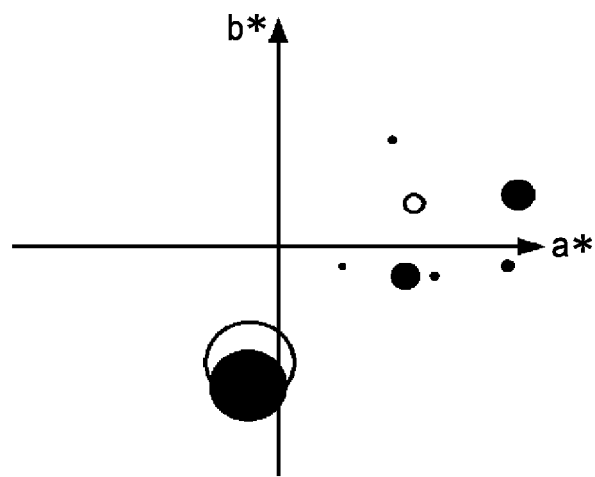

FIG. 15

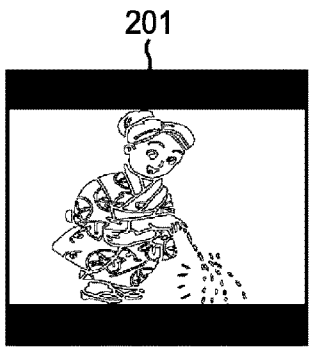

```
<photo>
  <guid>F9D9A25C46C96C8A50E819AEAD8D4B5B</guid>
  <FullImgPath>hogehoge/DSC00167.JPG</FullImgPath>
  <CacheImgPath>hogehoge/Cache/DSC00167.JPG</CacheImgPath>
  <TimeStamp>2003:03:31 06:52:32</TimeStamp>
  <FaceInfo>
    <TotalFace>1</TotalFace>
    <FaceEntry>
      <x>0.328767</x>
      <y>0.204082</y>
      <width>0.408163</width>
      <height>0.273973</height>
      <roll>0.000000</roll>
      <pitch>0.000000</pitch>
      <yaw>0.000000</yaw>
    </FaceEntry>
  </FaceInfo>
  <SimilarityInfo>
    <ColorInfo>
      <ColorWhite>0</ColorWhite>
      <ColorBlack>0</ColorBlack>
      <ColorRed>0</ColorRed>
      <ColorYellow>0</ColorYellow>
      <ColorGreen>12</ColorGreen>
      <ColorBlue>0</ColorBlue>
    </ColorInfo>
    <VectorInfo>
      <method>Color Feature</method>
      <vector>24f8f2374f2384f2348723f842f48273f487234fff28374f234f2374f23874f238</vector>
    </VectorInfo>
    <VectorInfo>
      <method>Texture Feature</method>
      <vector>24f8f2374f2384f2348723f842f48273f487234fff28374f234f2374f23874f238</vector>
    </VectorInfo>
  </SimilairtyInfo>
</photo>
```

FIG. 16

| property | type | SUMMARY |
|---|---|---|
| GUID | string | CONTENT ID/ID UNIQUE TO IMAGE |
| UTCdate | date | IMAGE CAPTURING TIME (UTC) SUCH AS ONE RECORDED AT DATE TIME ORIGINAL IN EXIF FORMAT |
| date | date | LOCAL IMAGE CAPTURING TIME SUCH AS ONE RECORDED AT DATA TIME ORIGINAL IN EXIF FORMAT |
| path | string | DIRECTORY PATH OF MASTER IMAGE SUCH AS ms/DCIM/XXXXX101 |
| DCFname | string | FILE NAME SUCH AS DSC00001.JPG |
| vgaCachePath | string | FILE PATH OF CONTRACTED IMAGE SUCH AS /DATA/EVENTIMAGE/00000000001.JPG |
| groupID | number | GROUP ID OF GROUP TO WHICH IMAGE BELONGS |
| faceExistence | number | FACE DETECTION RESULT 1: PICTURE OF LANDSCAPE/2: PICTURE OF FEW PERSONS/3: PICTURE OF MANY PERSONS |
| labels | number array | ARRANGEMENT OF LABELS |
| comment | string | COMMENT |
| protect | boolean | PROTECT STATUS OF IMAGE |
| exchengeOrImportFlag | boolean | THIS FLAG IS SET TO BE TRUE FOR IMAGE EXCHANGED OR IMPORTED |
| metaEnableFlag | boolean | THIS FLAG IS SET TO BE TRUE FOR IMAGE WITH METADATA THEREOF GENERATED BY SERVER |
| backUpFlag | boolean | THIS FLAG IS SET TO BE TRUE FOR IMAGE THAT IS BACKED UP BY SERVER |

FIG. 34

| COLOR NAME | RELATION LEVEL EXTRACTOR |
|---|---|
| "RED" | "RED" RELATION LEVEL EXTRACTOR |
| "BLUE" | "BLUE" RELATION LEVEL EXTRACTOR |
| "YELLOW" | "YELLOW" RELATION LEVEL EXTRACTOR |
| ... | ... |

FIG. 35

| CONTENT ID | "RED" | "BLUE" | "YELLOW" | ... |
|---|---|---|---|---|
| 000 | 0.80 | 0.00 | 0.10 | ... |
| 001 | 0.00 | 0.25 | 0.20 | ... |
| 002 | 0.15 | 0.05 | 0.00 | ... |
| ... | ... | ... | ... | ... |

FIG. 45

| COLOR VALUE (L*, a*, b*) | "BLUE" |
|---|---|
| (0.02, 0.04, 0.10) | No |
| (0.72, 0.00, 0.12) | Yes |
| (0.28, −0.02, 0.15) | No |
| ... | ... |

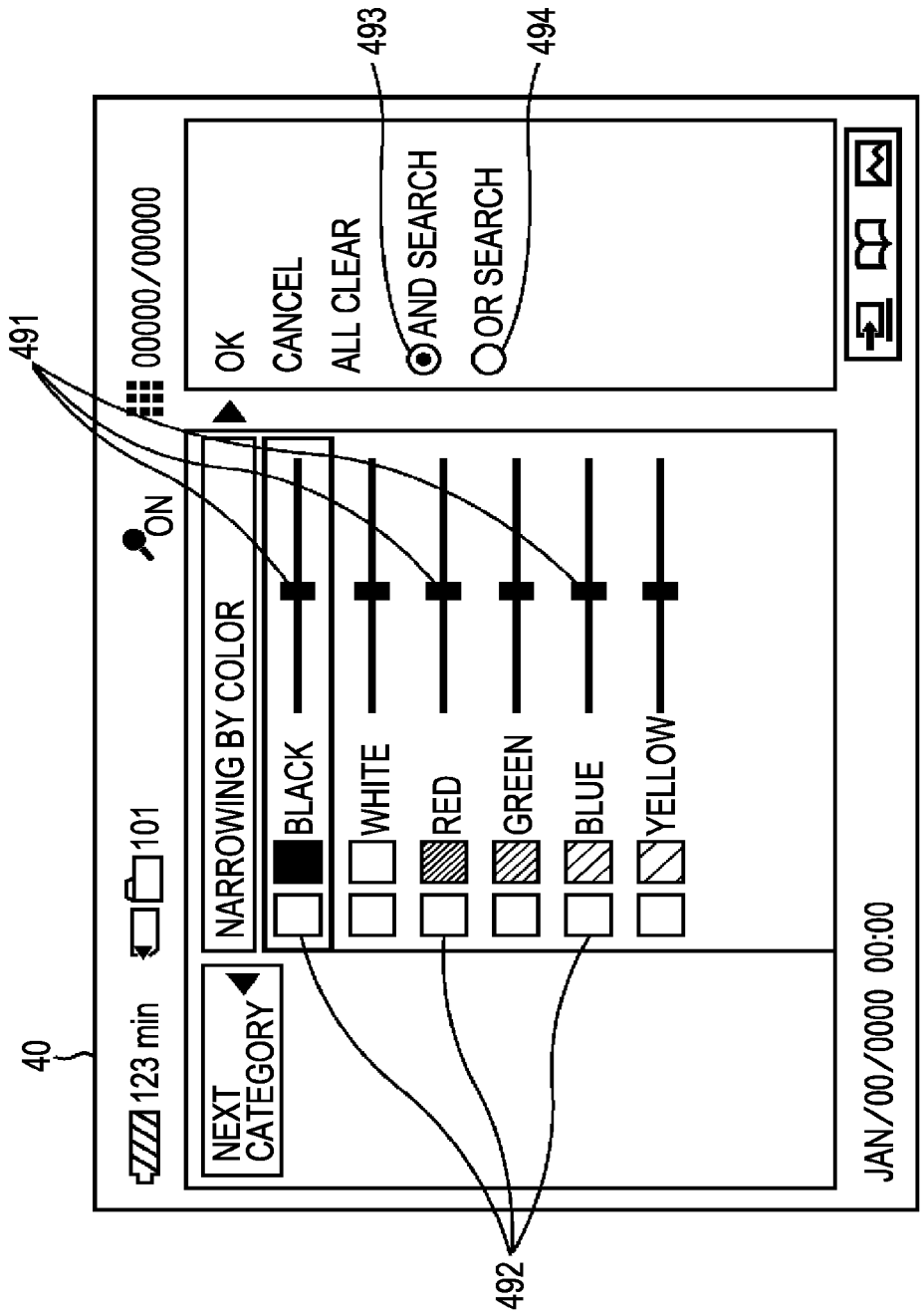

SYSTEM, APPARATUS, METHOD, PROGRAM AND RECORDING MEDIUM FOR PROCESSING IMAGE

CROSS-REFERENCE TO RELATED APPLICATIONS

The present application is a continuation of U.S. patent application Ser. No. 15/944,124, filed Apr. 3, 2018, which is a continuation of U.S. patent application Ser. No. 15/705,673, filed Sep. 15, 2017, now U.S. Pat. No. 9,965,493, which is a continuation of U.S. patent application Ser. No. 15/370,237, filed Dec. 6, 2016, now U.S. Pat. No. 9,805,064, which is continuation of U.S. patent application Ser. No. 14/695,422, filed Apr. 24, 2015, now U.S. Pat. No. 9,710,490, which is a continuation of U.S. patent application Ser. No. 12/977,835, filed Dec. 23, 2010, now U.S. Pat. No. 9,047,287, which is a continuation of U.S. patent application Ser. No. 11/700,736 filed Jan. 31, 2007, now U.S. Pat. No. 7,884,847, which claims priority from Japanese Patent Application No. JP 2006-024185 filed in the Japanese Patent Office on Feb. 1, 2006, the entire contents of which are incorporated herein by reference.

BACKGROUND OF THE INVENTION

Field of the Invention

The present invention relates to a system, apparatus, method and recording medium for processing an image and, in particular, to a system, apparatus, method and recording medium for extracting a feature from the image.

Description of the Related Art

Japanese Unexamined Patent Application Publication No. 2004-62868 discloses functions of detecting a face, extracting a feature of an image, and retrieving the image in small consumer electronics (CE) such as digital still camera Since processors mounted on a typical small CE are limited in performance, an image can be analyzed within a limited area. The image cannot be analyzed sufficiently. Analysis results provide insufficient accuracy level and find limited applications.

Detection of human faces requires a long period of time unless definition of an image to be analyzed is set to be low. Process time substantially exceeds time available for typical users. If the definition of an image is set to be too low, it is difficult to detect a face image of a small size, particularly, a face image of a person in a group photo. The low-definition image thus cannot satisfy a need for retrieving a particular face on a group photo.

For example, if the above-discussed analysis process is performed on a digital still camera, the camera must focus on that process and power consumption increases. Time available for image capturing is shortened, and the number of frames of image is reduced.

Digital still cameras are now in widespread use, and many digital still camera functions are transferred to cellular phones. In daily life, the opportunity of (still) picture capturing is substantially increased. If a user attempts to view captured images on a digital still camera, only reduced images (thumb-nail images) are available in the order of image capturing in retrieval process. In image retrieval performance, the digital still camera is substantially outperformed by a computer provided with an image management program.

SUMMARY OF THE INVENTION

There is a need for retrieving an image desired by the user in a digital still camera having a large storage function and a photo album function.

It is desirable to provide an apparatus that allows a desired image to be retrieved even with a relatively small throughput thereof.

In accordance with one embodiment of the present invention, an image processing system may include an imaging device for capturing an image and an image processing apparatus for processing the image. The imaging device may include an imaging unit for capturing the image, a first recording unit for recording information relating to the image as data having a predetermined data structure, the information being associated with the image, and a first transmission control unit for controlling transmission of the image to the image processing apparatus. The image processing apparatus may include a reception control unit for controlling reception of the image transmitted from the imaging device, a feature extracting unit for extracting a feature of the received image, a second recording unit for recording the feature, extracted from the image, as data having the same structure as the data structure in the imaging device, the feature being associated with the image, and a second transmission control unit for controlling transmission of the feature to the imaging device.

The imaging unit captures the image. The first recording unit may record the information relating to the image as the data having a predetermined data structure with the information associated with the image. The first transmission control unit may control the transmission of the image to the image processing apparatus. The reception control unit may control the reception of the image transmitted from the imaging device. The feature extracting unit may extract the feature of the received image. The second recording unit may record the feature, extracted from the image, as the data having the same structure as the data structure in the imaging device, with the feature associated with the image. The second transmission control unit may control the transmission of the feature to the imaging device.

In accordance with one embodiment of the present invention, an image processing apparatus may include a feature extracting unit for extracting a feature of an image, a first recording unit for recording the feature, extracted from the image, as data having a predetermined structure, the feature being associated with the image, and a transmission control unit for controlling transmission of the feature to a device, the device recording information relating to the image as data having the same structure as the predetermined structure.

The image processing apparatus may further include a reception control unit for controlling reception of the image transmitted from the device.

The image processing apparatus may further include a second recording unit for recording the image.

The image processing apparatus may further include a retrieval unit for retrieving the recorded image in accordance with the feature recorded as the data having the structure.

The image processing apparatus may further include a display unit for displaying the retrieved image.

The first recording unit may include a database.

The feature extracting unit may extract the feature as information relating to a face image contained in the image.

The feature extracting unit may extract at least one of the features containing number of face images contained in the image, a position of the face image, a size of the face image, and a direction the face image looks toward.

The feature extracting unit may extract the feature representing the number of pixels classified as indicating a particular color from among colors of the image.

The feature extracting unit may extract the feature that is used to calculate the degree of similarity between features of any two images.

In accordance with one embodiment of the present invention, an image processing method may include steps of extracting a feature of an image, recording the feature, extracted from the image, as data having a predetermined structure, the feature being associated with the image, and controlling transmission of the feature to a device, the device recording information relating to the image as data having the same structure as the predetermined structure.

In accordance with one embodiment of the present invention, a computer program is provided which may cause a computer to perform steps of extracting a feature of an image, recording the feature, extracted from the image, as data having a predetermined structure, the feature being associated with the image, and controlling transmission of the feature to a device, the device recording information relating to the image as data having the same structure as the predetermined structure.

In accordance with one embodiment of the present invention, a recording medium stores the computer program.

In accordance with embodiments of the present invention, the feature of the image may be extracted, the feature, extracted from the image, may be recorded as the data having a predetermined structure with the feature associated with the image. The transmission of the feature to a device is controlled. The device recording information relating to the image records as data having the same structure as the predetermined structure.

In accordance with one embodiment of the present invention, the device may retrieve images.

In accordance with one embodiment of the present invention, a desired image may be retrieved with a device having a relatively low throughput.

BRIEF DESCRIPTION OF THE DRAWINGS

FIG. 11 illustrates the generation of a color histogram;

FIG. 15 illustrates a specific example of metadata;

FIG. 16 illustrates the structure of metadata stored on a content database;

FIG. 34 illustrates correspondence information recorded on a correspondence to relation level extractor;

FIG. 35 illustrates the logical structure of relation level recorded on an extracted feature storage;

FIG. 45 illustrates determination data;

FIG. 48 illustrating a GUI image in the retrieval process; and

DETAILED DESCRIPTION

Figure 1:
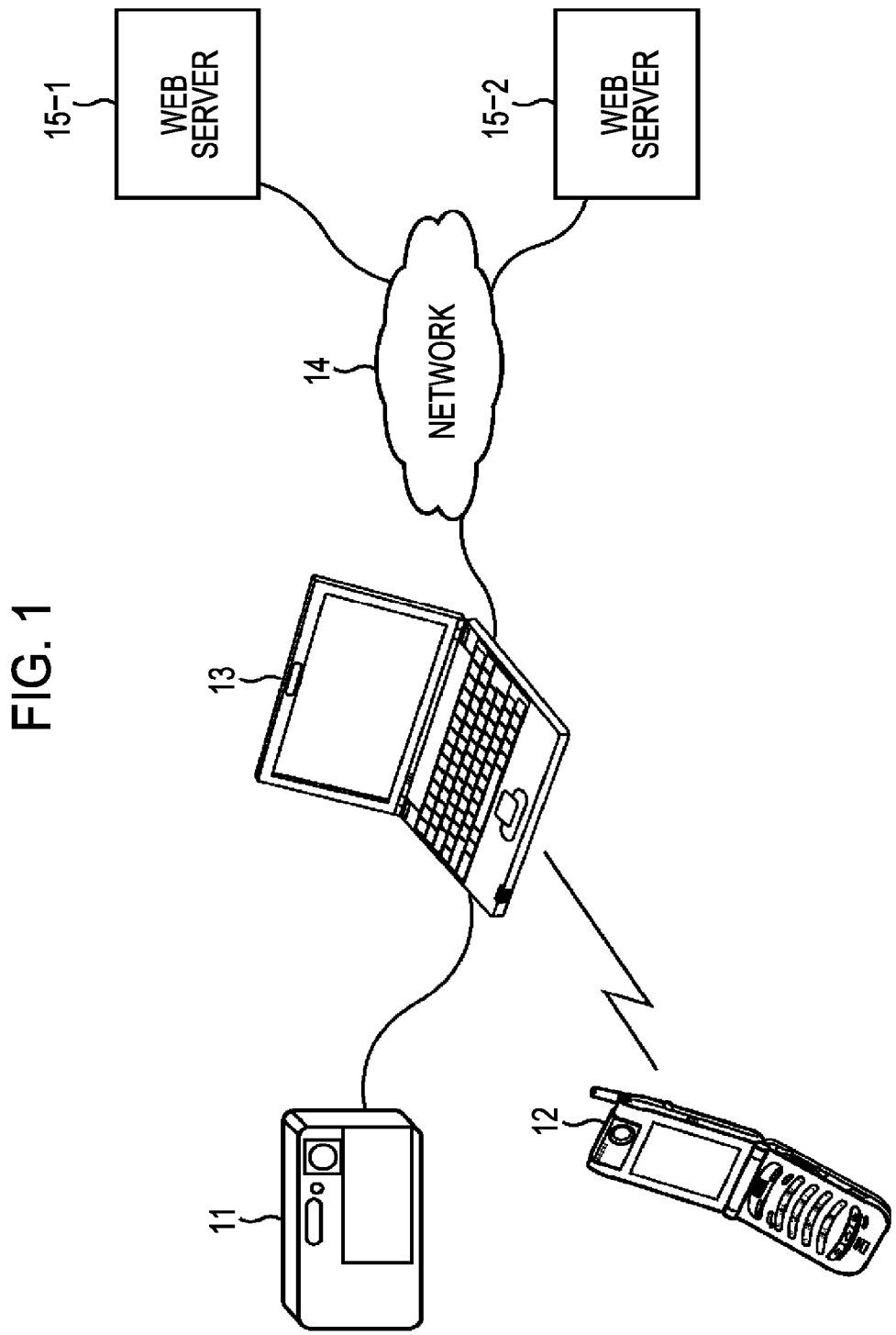
FIG. 1 is a block diagram of an information processing system in accordance with one embodiment of the present invention.

Before describing an embodiment of the present invention, the correspondence between the elements of the claims and the specific elements disclosed in this specification or the drawings is discussed now. This description is intended to assure that embodiments supporting the claimed invention are described in this specification or the drawings. Thus, even if an element in the following embodiments is not described in the specification or the drawings as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

In accordance with one embodiment of the present invention, an image processing system includes an imaging device (for example, digital still camera 11 of FIG. 1) for capturing an image and an image processing apparatus (for example, server 13 of FIG. 1) for processing the image. The imaging device includes an imaging unit (for example, imaging device 33 of FIG. 2) for capturing the image, a first recording unit (for example, similar feature database 112 of FIG. 4) for recording information relating to the image as data having a predetermined data structure, the information being associated with the image, and a first transmission control unit (for example, transmission controller 108 of FIG. 4) for controlling transmission of the image to the image processing apparatus. The image processing apparatus includes a reception control unit (for example, reception controller 139-1 of FIG. 5) for controlling reception of the image transmitted from the imaging device, a feature extracting unit (for example, image analyzer 131 of FIG. 5) for extracting a feature of the received image, a second recording unit (for example, similar feature database 142 of FIG. 5) for recording the feature, extracted from the image, as data having the same structure as the data structure in the imaging device, the feature being associated with the image, and a second transmission control unit (for example, similar feature database 142 of FIG. 5) for controlling transmission of the feature to the imaging device.

In accordance with one embodiment of the present invention, an image processing apparatus (for example, server 13 of FIG. 1) includes a feature extracting unit (for example, image analyzer 131 of FIG. 5) for extracting a feature of an image, a first recording unit (for example, similar feature database 142 of FIG. 5) for recording the feature, extracted from the image, as data having a predetermined structure, the feature being associated with the image, and a transmission control unit (for example, transmission controller 138-1 of FIG. 5) for controlling transmission of the feature to a device (for example, digital still camera 11 of FIG. 1), the device recording information relating to the image as data having the same structure as the predetermined structure.

The image processing apparatus may further include a reception control unit (for example, reception controller 139-1 of FIG. 5) for controlling reception of the image transmitted from the device.

The image processing apparatus may further include a second recording unit (for example, image storage 140 of FIG. 5) for recording the image.

The image processing apparatus may further include a retrieval unit (for example, retrieval unit 137 of FIG. 5) for retrieving the recorded image in accordance with the feature recorded as the data having the structure.

The image processing apparatus may further include a display unit (for example, output unit 77 as a display of FIG. 3) for displaying the retrieved image.

Figure 9:
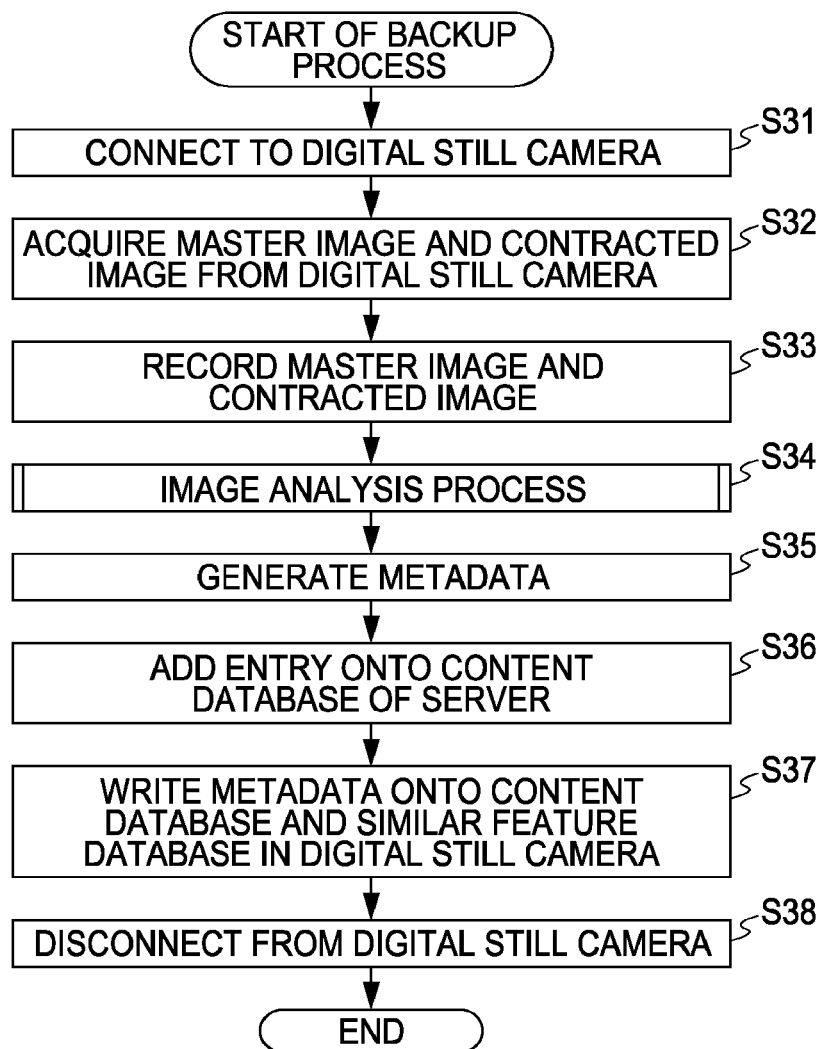
FIG. 9 is a flowchart illustrating a backup process.

In accordance with embodiments of the present invention, one of an image processing method and a computer program includes steps of extracting a feature of an image (for example, step S34 of FIG. 9), recording the feature, extracted from the image, as data having a predetermined structure, the feature being associated with the image (for example, step S36 of FIG. 9), and controlling transmission of the feature to a device, the device recording information relating to the image as data having the same structure as the predetermined structure (for example, step S37 of FIG. 9).

FIG. 1 illustrates an image processing system in accordance with one embodiment of the present invention. A digital still camera 11 as an example of imaging device captures an image, and supplies the captured image to a server 13 as an example of image processing apparatus. A cellular phone 12 as another example of imaging device captures an image and then supplies the captured image to the server 13. Each of the digital still camera 11 and the cellular phone 12 generates a contracted image from the captured image.

Each of the digital still camera 11, the cellular phone 12, and the server 13 is also one example of a display controller.

The server 13 includes a personal computer, a non-portable recorder, a game machine, and a dedicated device, and records images supplied from one of the digital still camera 11 and the cellular phone 12. The server 13 processes the image supplied from one of the digital still camera 11 and the cellular phone 12, and extracts a feature of the image. The server 13 supplies data obtained as a result of process to one of the digital still camera 11 and the cellular phone 12.

The server 13 acquires an image from one of a Web server 15-1 and a Web server 15-2, and records the acquired image thereon. The server 13 processes the image acquired from one of the Web server 15-1 and the Web server 15-2, and generates a contracted image from the acquired image. The server 13 supplies data obtained as a result of processing to one of the digital still camera 11 and the cellular phone 12 together with the contracted image.

One of the digital still camera 11 and the cellular phone 12 retrieves a desired image from the recorded images based on the data obtained as a result of image processing and supplied by the server 13. The server 13 also retrieves a desired image of the recorded images based on the data obtained as a result of image processing.

Since each of the digital still camera 11, the cellular phone 12, and the server 13 retrieves the image based on the same data obtained as a result of image processing, a desired image is retrieved in the same way.

Figure 2:
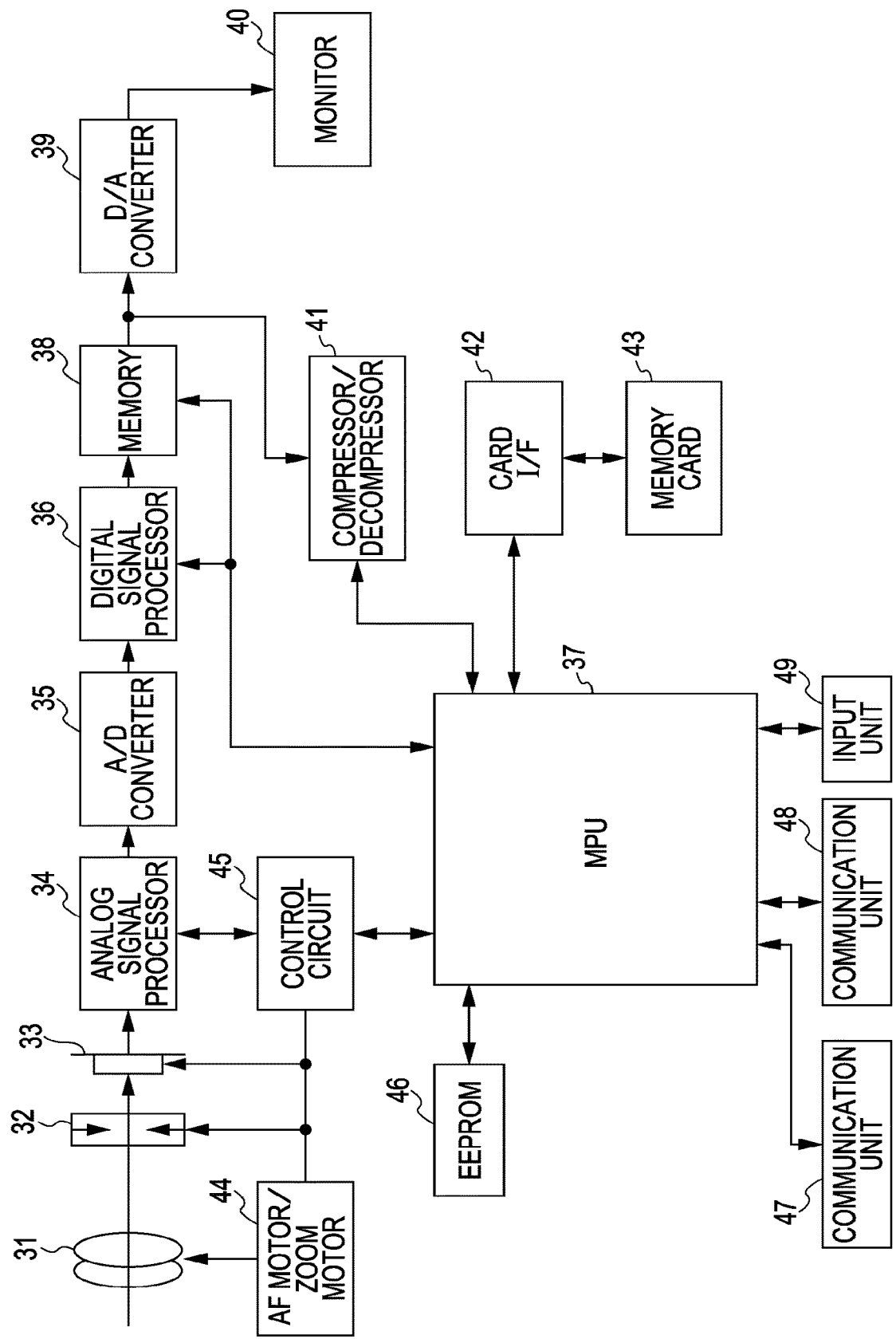
FIG. 2 is a block diagram of a digital still camera.

FIG. 2 is a block diagram illustrating the structure of the digital still camera 11. The digital still camera 11 includes an imaging lens 31, a stop 32, an imaging device 33, an analog signal processor 34, an analog-to-digital (A/D) converter 35, a digital signal processor 36, a microprocessor (MPU) 37, a memory 38, a digital-to-analog (D/A) converter 39, a monitor 40, a compressor/decompressor 41, a card interface 42, a memory card 43, a AF motor and zoom motor 44, a control circuit 45, an electrically erasable programmable read only memory (EEPROM) 46, a communication unit 47, a communication unit 48, and an input unit 49.

The imaging lens 31 focuses an optical image of a subject on a light focusing surface of the imaging device 33 through the stop 32. The imaging lens 31 includes at least one lens. The imaging lens 31 may be a monofocus lens or a variable focus type lens such as a zoom lens.

The stop 32 adjusts the quantity of light of the optical image focused on the focusing surface of the imaging device 33.

The imaging device 33 may include one of a charge-coupled device (CCD) or a complementary metal oxide semiconductor (CMOS) sensor, and converts the optical image focused on the focusing surface thereof into an electrical signal. The imaging device 33 supplies the electrical signal obtained as a result of conversion to the analog signal processor 34.

The analog signal processor 34 includes a sample-hold circuit, a color separation circuit, a gain control circuit, etc. The analog signal processor 34 performs correlated double sampling (CDS) process on the electrical signal from the imaging device 33 while separating the electrical signal into R (red), G (green), and B (blue) color signals, and adjusting the signal level of each color signal (in white balance process). The analog signal processor 34 supplies the color signals to the A/D converter 35.

The A/D converter 35 converts each color signal into a digital signal, and then supplies the digital signal to the digital signal processor 36.

The digital signal processor 36 includes a luminance and color difference signal generator, a sharpness corrector, a contrast corrector, etc. The digital signal processor 36 under the control of the MPU 37 converts the digital signal into a luminance signal (Y signal) and color difference signals (Cr and Cb signals). The digital signal processor 36 supplies the processed digital signals to the memory 38.

The MPU 37 is an embedded type processor and generally controls the digital still camera 11 by executing the program thereof.

The memory 38 includes a dynamic random access memory (DRAM). The memory 38 under the control of the MPU 37 temporarily stores the digital signal supplied from the digital signal processor 36. The D/A converter 39 reads the digital signal from the memory 38, converts the read signal into an analog signal, and supplies the analog signal to the monitor 40. The monitor 40, such as a liquid-crystal display (LCD) or a electroluminescence (EL) display, displays an image responsive to the analog signal supplied from the D/A converter 39.

An electrical signal supplied from the imaging device 33 periodically updates the digital signal on the memory 38, and the analog signal produced from the updated digital signal is supplied to the monitor 40. As a result, the image focused on the imaging device 33 is displayed on the monitor 40 on a real-time basis.

The monitor 40 displays a graphical user interface (GUI) image on the screen thereof. To this end, the MPU 37 writes on the memory 38 video data to display the GUI image, causes the D/A converter 39 to convert the video data into the analog signal, and causes the monitor 40 to display the GUI image based on the analog signal.

The compressor/decompressor 41 under the control of the MPU 37 encodes the digital signal stored on the memory 38 in accordance with Join Photographic Experts Group (JPEG) or JPEG 2000 standards. The compressor/decompressor 41 supplies the encoded video data to the memory card 43 via the card interface 42. The memory card 43, containing a semiconductor memory or a hard disk drive (HDD), is removably loaded on the digital still camera 11. When loaded on the digital still camera 11, the memory card 43 is electrically connected to the card interface 42. The memory card 43 stores the video data supplied from the card interface 42.

In response to a command from the MPU 37, the card interface 42 controls the recording of the video data to and the reading of the video data from the memory card 43 electrically connected thereto.

The video data recorded on the memory card 43 is read via the card interface 42 and decoded into a digital signal by the compressor/decompressor 41.

The AF motor and zoom motor 44, driven by the control circuit 45, move the imaging lens 31 with respect to the imaging device 33 to modify the focus and the focal length of the imaging lens 31. In response to a command from the MPU 37, the control circuit 45 drives the AF motor and zoom motor 44 while also controlling the stop 32 and the imaging device 33.

The EEPROM 46 stores a program executed by the MPU 37 and a variety of data.

The communication unit 47 meets standards such as universal serial bus (USB) or Institute of Electrical and Electronic Engineers (IEEE) 1394, and exchanges a variety of data with the server 13 via a wired transmission medium.

The communication unit 48 meets standards such as IEEE 802.11a, IEEE 802.11b, or IEEE 802.11g, or Bluetooth, and exchanges a variety of data with the server 13 via a wireless transmission medium.

The input unit 49 includes switches, buttons, and touch-panels and supplies to the MPU 37 a signal responsive to a user operation input.

As described above, the memory card 43 records the video data. The medium having the video data recorded thereon is not limited to the semiconductor memory or the magnetic disk. The medium may be any of an optical disk, a magnetooptical disk. Also usable as a medium may be the one that permits data to be written and read in an electrical way, a magnetic way, an optical way, a quantum way, or a combination thereof. One of these media may be housed in the digital still camera 11.

The video data may be simply referred to as an image.

Figure 3:
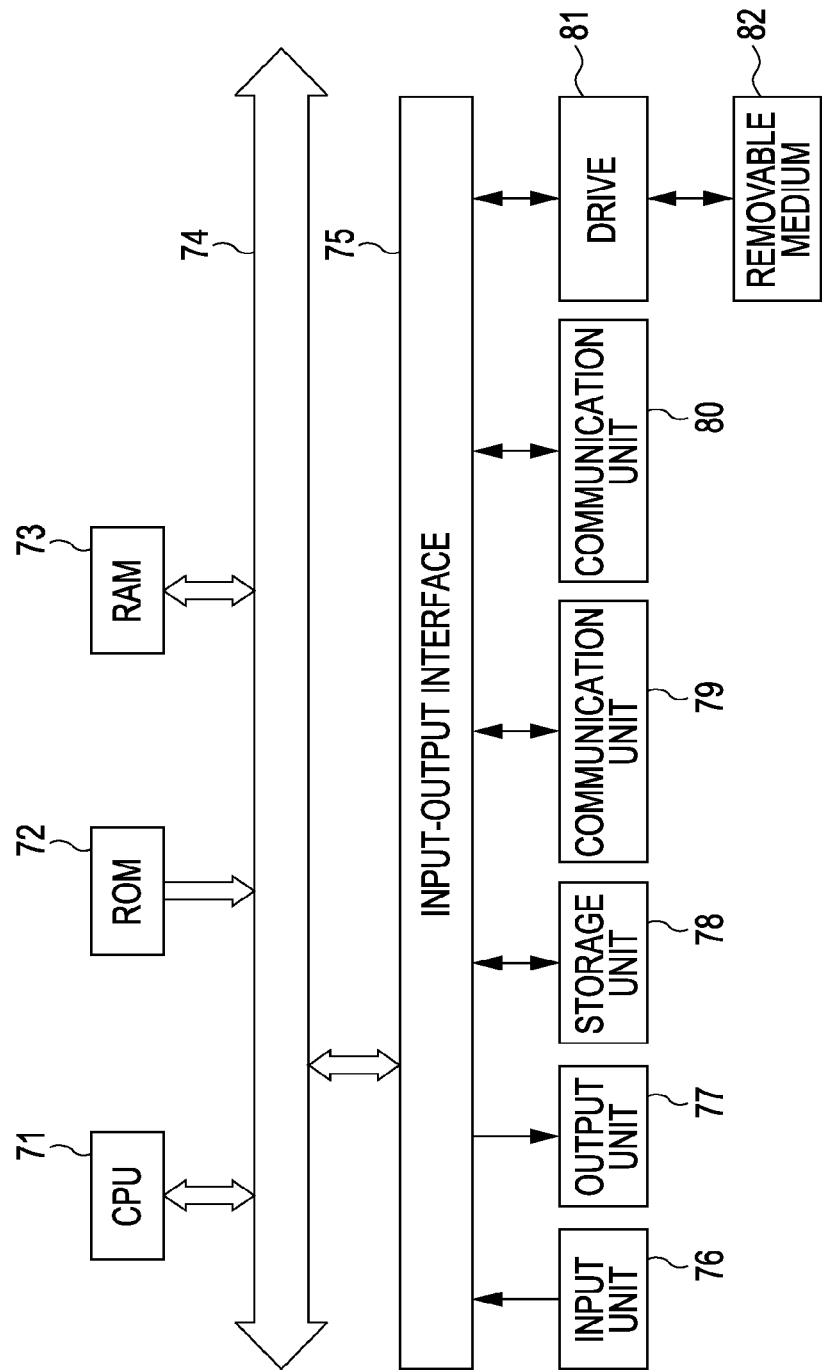
FIG. 3 is a block diagram of a server.

FIG. 3 is a block diagram illustrating the structure of the server 13. The CPU 71 performs a variety of processes under the control of the program stored on a read-only memory (ROM) 72 or a storage unit 78. A random-access memory (RAM) 73 stores programs to be executed by the CPU 71 and data. The CPU 71, the ROM 72 and the RAM 73 are interconnected via a bus 74.

The CPU 71 connects to an input-output interface 75 via the bus 74. Also connected to the input-output interface 75 are an input unit 76, composed of a keyboard, a mouse, a microphone, etc., and an output unit 77 composed of a display and a loudspeaker. In response to a command input from the input unit 76, the CPU 71 performs a variety of processes. The CPU 71 outputs process results to the output unit 77.

The storage unit 78 connected to the input-output interface 75 includes a hard disk, for example, and stores a program to be executed by the CPU 71 and data. The communication unit 79 meets standards such as USB or IEEE 1394, and exchanges a variety of data with one of the digital still camera 11 and the cellular phone 12 via a wired transmission medium, or meets standards such as IEEE 802.11a, IEEE 802.11b, or IEEE 802.11g, or Bluetooth, and exchanges a variety of data with one of the digital still camera 11 and the cellular phone 12 via a wireless transmission medium. The communication unit 80 communicates with one of the Web server 15-1 and the Web server 15-2 via a network 14 such as the Internet or a local area network.

A program may be acquired via the communication unit 80 and then stored on the storage unit 78.

When being loaded with a removable medium 82 such as a magnetic disk, an optical disk, a magneto-optic disk, or a semiconductor memory, a drive 81 connected to the input-output interface 75 drives the loaded medium to read the program and the data recorded thereon. The program and data read are transferred to the storage unit 78 as necessary for storage.

Figure 4:
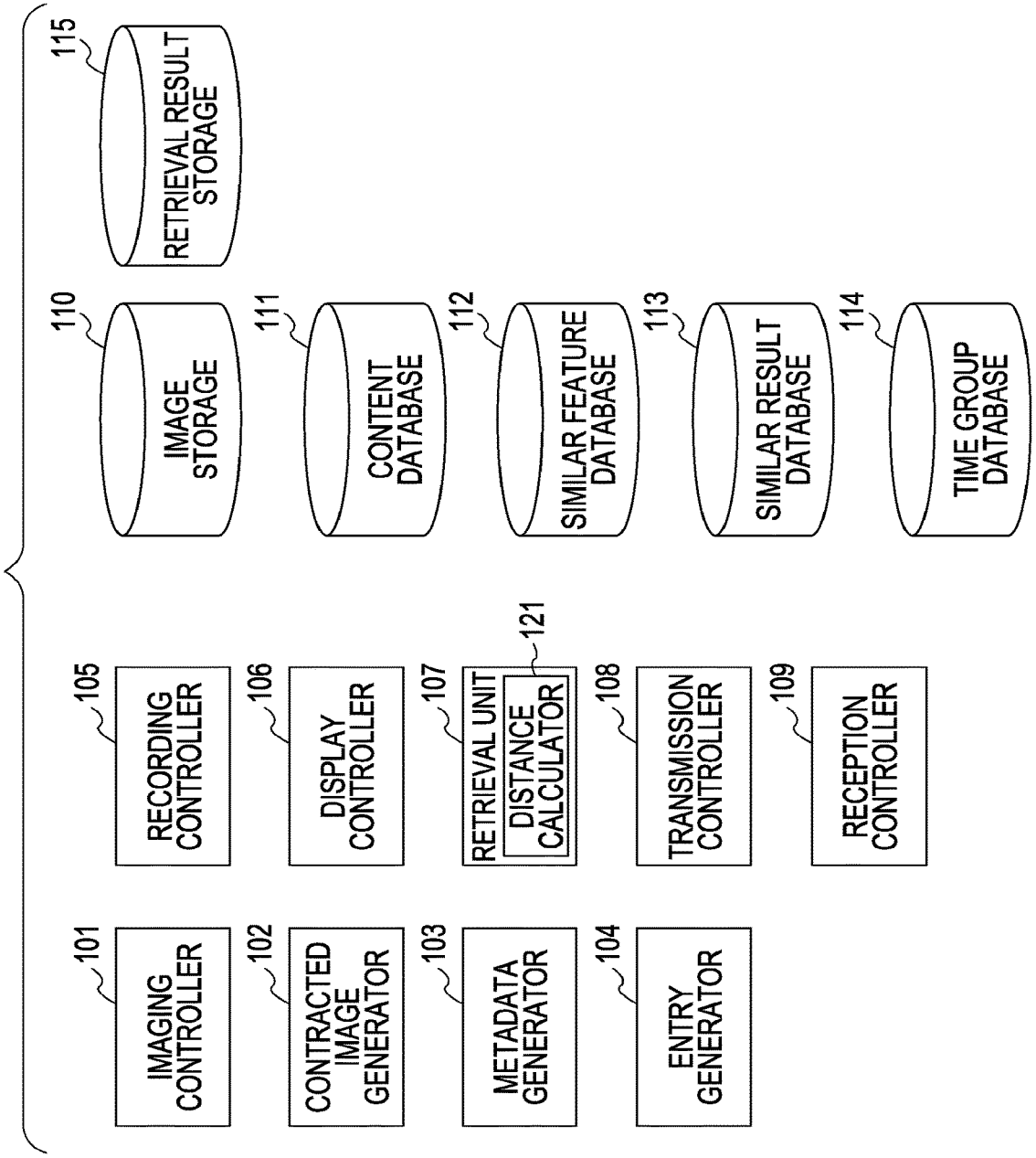
FIG. 4 illustrates a function of a microprocessor unit (MPU) performing a program.

FIG. 4 illustrates a function of the RAM 73 executing the program. By executing the program, the MPU 37 implements an imaging controller 101, a contracted image generator 102, a metadata generator 103, an entry generator 104, a recording controller 105, a display controller 106, a retrieval unit 107, a transmission controller 108, a reception controller 109, an image storage 110, a content database 111, a similar feature database 112, a similar result database 113, a time group database 114, and a retrieval result storage 115.

By controlling the imaging lens 31 through the digital signal processor 36 and the memory 38 through the control circuit 45, the imaging controller 101 controls an image capturing operation on the digital still camera 11. The imaging controller 101 records the captured image on a recording area of the memory card 43 functioning as the image storage 110.

The contracted image generator 102 reads the digital signal of the captured image from the memory 38, and contracts the captured image, thereby generating the contracted image. The generated contracted image is then supplied to the memory card 43 via the card interface 42, and then recorded on the recording area of the memory card 43 as the image storage 110.

A high-definition image of a pixel count of 3000000 pixels to 4000000 pixels is now captured under the control of the imaging controller 101. The contracted image generator 102 generates from the captured image a contracted image size of a pixel count of 640×480 pixels at VGA level (video graphic array) appropriate for view with the digital still camera 11 or an equivalent image size.

The contracted image generator 102 may read the image from the image storage 110, and may contract the read image to generate a contracted image.

To differentiate between the contracted image and the captured image, the captured image is referred to as a master image. If there is no need for differentiating between the two images, both images are simply referred to as image.

As will be described later, the master image and the contracted image are mapped to each other by data recorded on a content database 111.

The metadata generator 103 generates metadata of the metadata of the master image. For example, the metadata generator 103 generates the metadata to be stored in a format specified by Exchangeable Image File Format (EXIF) standardized by Japanese Electronic Industry Development Association (JEIDA).

The entry generator 104 is organized as a data management system and generates entries of the master image and the contracted image when the master image is captured. The generated entries are stored on the content database 111.

The recording controller 105 controls the recording of the master image and the contracted image to the image storage 110.

The display controller 106 controls the displaying of the contracted image and the GUI image to the monitor 40.

The retrieval unit 107 retrieves a desired contracted image or a desired master image from the contracted image and the master image recorded on the image storage 110 based on the data stored on the content database 111, the similar feature database 112, the similar result database 113 and the time group database 114. The searcher 107 causes the data responsive to the retrieval results to be stored on the search result storage 115.

The retrieval unit 107 includes a distance calculator 121. The distance calculator 121 calculates a distance representing the degree of similarity between two images from the data representing the feature of the images stored on the similar feature database 112. The distance calculator 121 causes the similar result database 113 to store the calculated distance.

The transmission controller 108 controls the communication unit 47, thereby controlling the transmission of the master image or the contracted image by the communication unit 47 to the server 13. By controlling the communication unit 47, the reception controller 109 controls the reception of the feature of the image transmitted from the server 13 via the communication unit 47. The feature of the image is obtained using a variety of image processes in the server 13.

The image storage 110, arranged in a recording space in the memory card 43, stores the master image and the contracted image.

The content database 111, the similar feature database 112, the similar result database 113, and the time group database 114 are constructed of predetermined recording spaces in the memory card 43 and the database management systems thereof.

The content database 111 stores data identifying each image and a variety of metadata of images in association with the data. The similar feature database 112 stores data representing the feature of the image obtained as a result of image processing in the server 13.

The similar result database 113 stores a distance representing the degree of similarity between two images calculated by the distance calculator 121 in the retrieval unit 107.

When a user classifies images into groups, the time group database 114 stores information identifying an image belonging to each group.

The retrieval result storage 115 stores data as retrieval results. For example, the retrieval result storage 115 stores retrieval results of the image having a color corresponding to a weight. Retrieval operation has been performed in accordance with the relation level under which each image is thought of by a particular color name, and in accordance with the weight of the color represented by a color name input by a user operation.

The relation level will be described in detail later.

Figure 5:
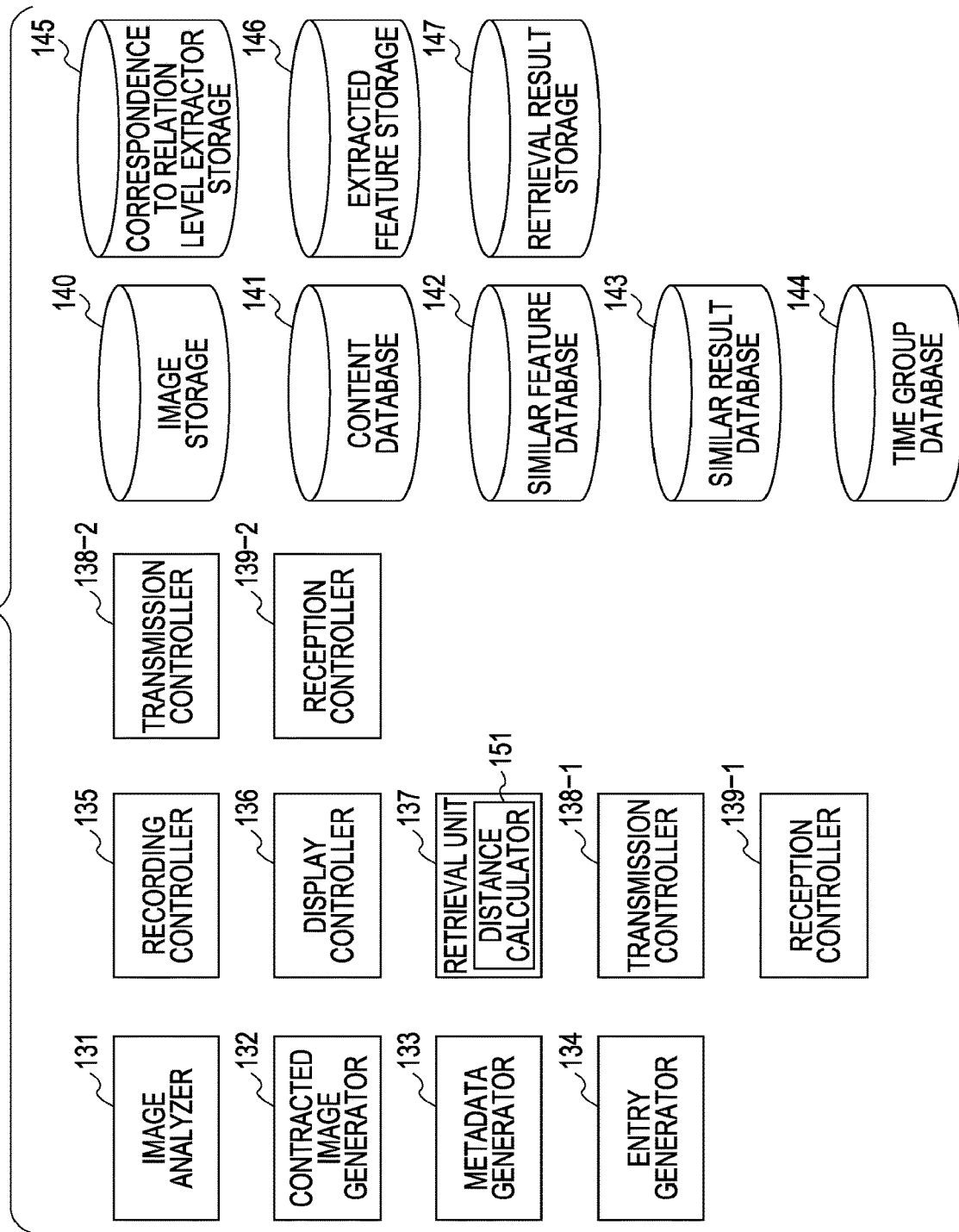
FIG. 5 illustrates a function of a central processing unit (CPU) performing a program.

FIG. 5 illustrates the function of the CPU 71 that executes the program thereof. By executing the program, the CPU 71 implements an image analyzer 131, a contracted image generator 132, a metadata generator 133, an entry generator 134, a recording controller 135, a display controller 136, a retrieval unit 137, transmission controllers 138-1 and 138-2, reception controllers 139-1 and 139-2, an image storage 140, a content database 141, a similar feature database 142, 1 similar result database 143, a time group database 144, a correspondence to relation level extractor storage 145, an extracted feature storage 146, and a retrieval result storage 147.

The image analyzer 131 extracts a feature of each image. More specifically, the image analyzer 131 performs image processing on each image, thereby analyzing the image. The image analyzer 131 supplies the feature of the image obtained as a result of image processing to one of the similar feature database 142 and the transmission controller 138-1.

Figure 6:
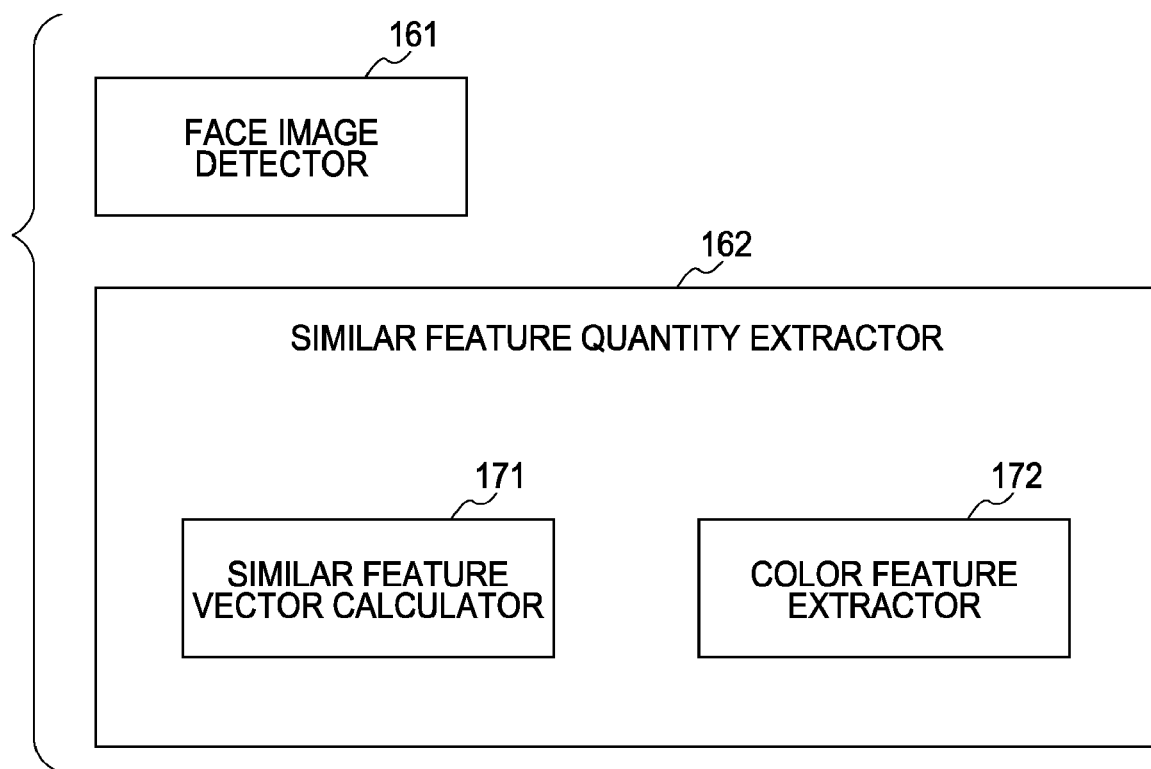
FIG. 6 is a block diagram of an image analyzer.

FIG. 6 is a block diagram illustrating the structure of the image analyzer 131. The image analyzer 131 includes a face image detector 161 and a similar feature quantity extractor 162.

The face image detector 161 extracts the feature of the image as information relating to a face image contained in the image. For example, the face image detector 161 extracts the number of face images contained in the image, the position of the face image in the image, the size of the face image, and the direction in which the face image looks toward in the image.

The similar feature quantity extractor 162 extracts a feature quantity of the image to determine the degree of similarity of images. The similar feature quantity extractor 162 includes a similar feature vector calculator 171 and a color feature extractor 172. The similar feature vector calculator 171 extracts the features of two images from which the degree of similarity between the two images is calculated. The color feature extractor 172 extracts from the color of each pixel in the image the relation level under which the image is thought of by the predetermined color name. In other words, the color feature extractor 172 extracts the feature representing the number of pixels classified in a color having a predetermined color name.

Returning to FIG. 5, the contracted image generator 132 under the control of the reception controller 139-2 contracts the maser image acquired from one of the Web server 15-1 and the Web server 15-2 via the network 14, thereby generating the contracted image. The contracted image is then recorded on the image storage 140.

The contracted image generator 132 may read an image from the image storage 140, and contracts the read image, thereby generating the contracted image.

The metadata generator 133 generates the metadata of the master image. For example, the metadata generator 133 generates the metadata to be stored as data complying with the EXIF format standardized by the JEIDA.

Under the control of the reception controller 139-1, the entry generator 134, organized as a database management system, generates an entry of the master image acquired from the digital still camera 11. The entry generator 134 under the control of the reception controller 139-2 acquires the master image from one of the Web server 15-1 and the Web server 15-2 via the network 14. If the contracted image is obtained from the master image, the entry generator 134 generates entries of the master image and the contracted image. The generated entries are stored on the content database 141.

The recording controller 135 controls the recording of the master image and the contracted image onto the image storage 140.

The display controller 136 controls the displaying of the master image and the GUI image onto the output unit 77 as a display.

In accordance with the data stored one of the content database 141, the similar feature database 142, and the time group database 144, the retrieval unit 137 retrieves the master images and the contracted images stored on the image storage 140 for a desired master image or a desired contracted image. In accordance with the data stored on the extracted feature storage 146, the retrieval unit 137 retrieves the master images and the contracted images stored on the image storage 140 for a desired master image or a desired contracted image. The retrieval unit 137 stores retrieval result data on the retrieval result storage 147.

The retrieval unit 137 contains a distance calculator 151. The distance calculator 151 calculates a distance indicating the degree of similarity of the two images from the data representing the feature of the image stored on the similar feature database 142. The distance calculator 151 causes the similar result database 143 to record the calculated distance thereon.

By controlling the communication unit 79, the transmission controller 138-1 causes the communication unit 79 to transmit the feature of the image obtained as a result of image processing in the image analyzer 131 to the digital still camera 11. By controlling the communication unit 79, the reception controller 139-1 causes the communication unit 79 to receives the master image and the contracted image transmitted from the digital still camera 11.

The transmission controller 138-2 controls the communication unit 80. The transmission controller 138-2 causes the communication unit 80 to transmit a request for an image to one of the Web server 15-1 and the Web server 15-2 via the network 14. By controlling the communication unit 80, the reception controller 139-2 causes the communication unit 80 to receive the master image and the contracted image transmitted from one of the Web server 15-1 and the Web server 15-2.

The image storage 140, arranged in a recording space of the storage unit 78 composed of a hard disk, records the master image and the contracted image. The image storage 140 may be arranged in a recording space in the removable medium 82, such as a magnetic disk, an optical disk, a magneto-optical disk, or a semiconductor memory, loaded on the drive 81.

The content database 141, the similar feature database 142, the similar result database 143 and the time group database 144 are composed of predetermined recording spaces in the storage unit 78 and database management systems thereof.

The content database 141 stores data identifying each image and a variety of metadata in association with the identifying data. The similar feature database 142 stores data of the feature of the image obtained as a result of image processing in the image analyzer 131.

The similar result database 113 stores a distance indicating the degree of similarity between two images, calculated by the distance calculator 151 in the retrieval unit 137.

When the user classifies the images into groups, the time group database 144 stores information identifying an image belonging to each group.

The correspondence to relation level extractor storage 145 stores correspondence information indicating correspondence between the color name in the color feature extractor 172 and a relation level extractor extracting the relation level on a per color (as will be described in detail with reference to FIG. 33).

The extracted feature storage 146 stores the relation level under which the image is thought of by a predetermined color name. The relation level is extracted by the color feature extractor 172.

The retrieval result storage 147 stores retrieval results of the image having a color corresponding to a weight. Retrieval operation has been performed in accordance with the relation level under which each image is thought of by a particular color name, and in accordance with the weight of the color represented by a color name input by a user operation. For example, the retrieval result storage 147 stores the retrieval results of the image of the color corresponding to the weight, retrieved under the relation level and the retrieval condition as the weight of the color represented by the color name.

The feature is extracted from the image, and the extracted feature is then recorded on the server 13 and the digital still camera 11. This process is described below.

The image capturing process of the digital still camera 11 is described below with reference to a flowchart of FIG. 7.

In step S11, the imaging controller 101 controls the imaging lens 31 through the digital signal processor 36, the memory 38, the AF motor and zoom motor 44, and the control circuit 45, thereby capturing an image of a subject.

In step S12, the imaging controller 101 causes the compressor/decompressor 41 to encode the digitals signal stored on the memory 38 in accordance with JPEG or JPEG 2000 standards, thereby generating the master image as the video data. The imaging controller 101 records the master image on the image storage 110.

The metadata generator 103 generates the metadata of the master image. For example, the metadata generator 103 generates the metadata embedded in EXIF data standardized by the JEIDA. The metadata may include image capturing time of the master image or imaging condition, for example.

In step S13, the contracted image generator 102 reads the digital signal of the captured image from the memory 38, and contracts the captured image, thereby generating a contracted image. The contracted image generator 102 causes the image storage 110 to record the contracted image.

In step S14, the entry generator 104 generates the entries of the master image and the contracted image. The entry generator 104 associates the generated entries with the metadata generated by the metadata generator 103, and then adds (stores) the entries on the content database 111 to end the process thereof.

Since the metadata such as the image capturing time and the imaging condition is stored on the content database 111, the master image and the contracted image are retrieved according to the image capturing time and the imaging condition.

Figure 7:
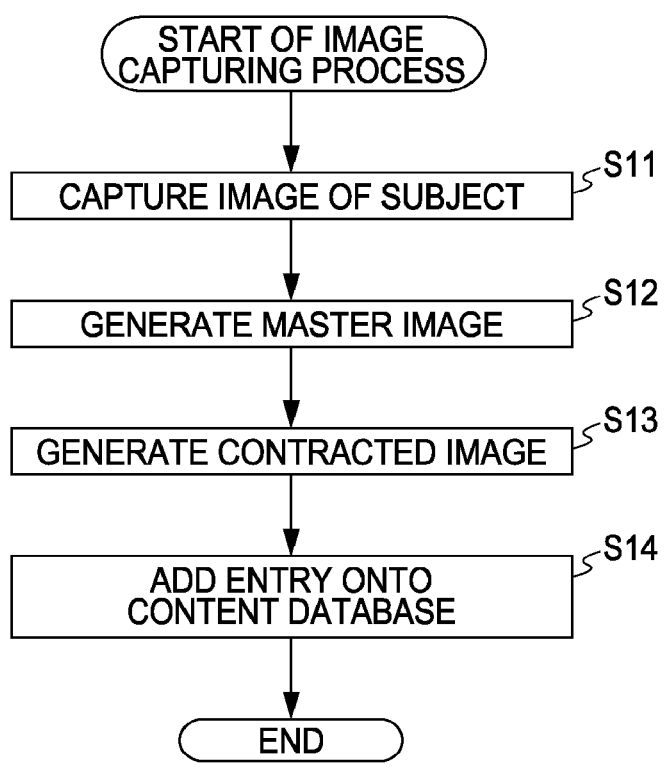
FIG. 7 is a flowchart of an image capturing process.

The cellular phone 12 performs the same image capturing process as the one shown in the flowchart of FIG. 7.

Figure 8:
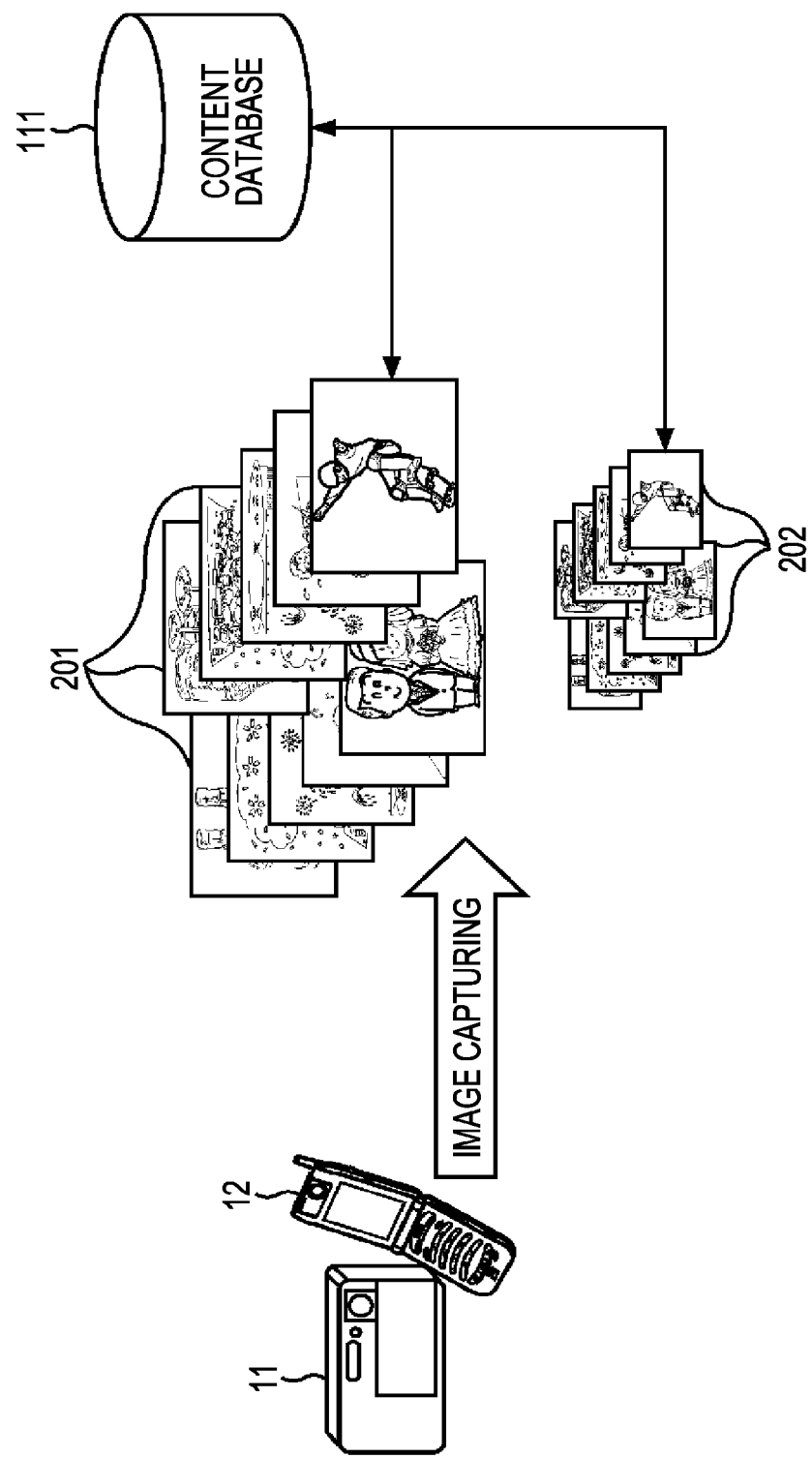
FIG. 8 illustrates relationship between a master image and a reduced image.

When one of the digital still camera 11 and the cellular phone 12 captures an image as shown in FIG. 8, the metadata associated with a master image 201 is stored on the content database 111 and a contracted image 202 is generated from the master image 201. The metadata, associated with the master image 201 and stored on the content database 111, is also associated with the contracted image 202.

A backup process of the server 13 is described below with reference to a flowchart of FIG. 9. In the backup process, an image captured by the digital still camera 11 is backed up by the server 13. The backup process of the server 13 starts in response to the startup of the program when a universal serial bus (USB) with one end thereof connected to the digital still camera 11 is connected to the server 13.

In step S31, the transmission controller 138-1 and the transmission controller 138-2 in the server 13 are connected to the digital still camera 11 via the communication unit 79.

In step S32, the transmission controller 138-1 and the transmission controller 138-2 in the server 13 causes the communication unit 79 to acquire the master image 201 and the contracted image 202 from the digital still camera 11. For example, in step S32, the transmission controller 138-1 causes the communication unit 79 to transmit a transmission request to the digital still camera 11 to transmit the master image 201 and the contracted image 202. Since the digital still camera 11 transmits the master image 201 and the contracted image 202, the reception controller 139-1 causes the reception controller 139-1 to receive the master image 201 and the contracted image 202 from the digital still camera 11. The reception controller 139-1 supplies the received master image 201 and contracted image 202 to the image storage 140.

In step S33, the image storage 140 records the master image 201 and the contracted image 202 acquired from the digital still camera 11.

In step S34, the image analyzer 131 analyzes the image recorded on the image storage 140.

The image analyzer 131 may analyze the master image 201 or the contracted image 202.

Figure 10:
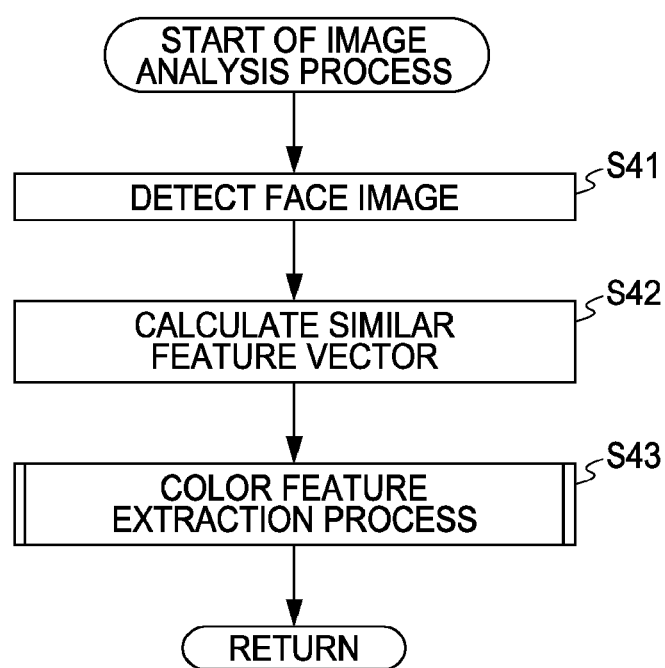
FIG. 10 is a flowchart illustrating an image analysis process.

The analysis process in step S34 is described more in detail with reference to a flowchart of FIG. 10.

In step S41, the face image detector 161 in the image analyzer 131 detects a face image from the image. More specifically, in step S41, the face image detector 161 extracts the feature of the image as information relating to the face image contained in the image. In step S41, the face image detector 161 extracts the number of image faces contained in the image, the position of each face image in the image, the size of the face image, and the direction in which the face image looks toward.

More specifically, the face image detector 161 identifies a pixel having a pixel value indicating a color falling within a predetermined color range corresponding to the skin of a human. The face image detector 161 then treats, as a face image, an area composed consecutive pixels of a predetermined number from among pixels identified by color.

The face image detector 161 counts the number of detected face images. When each of the overall height and overall width of the image is set to be 1, the face image detector 161 detects as the position of the face image relative to the entire image a vertical position and a horizontal position of the face image.

When each of the overall height and overall width of the image is set to be 1, the face image detector 161 detects as the size of the face image in the image the height and width of the face image relative to the entire image.

The face image detector 161 determines whether a selected image face matches one of a plurality of predefined patterns in each of assumed directions of a face. The direction of the face is detected by determining a direction matching the pattern of the face image as the direction of the face. In this case, the face image detector 161 detects as the direction of the face of the selected face image a roll angle, a pitch angle, and a yaw angle of the face.

In step S42, the similar feature vector calculator 171 in the similar feature quantity extractor 162 in the image analyzer 131 calculates a similar feature vector as a feature quantity in the determination of the degree of similarity of the image. More specifically, in step S42, the similar feature vector calculator 171 extracts the features of the two images from which the degree of similarity of the two images is calculated.

For example, the similar feature vector calculator 171 calculates the similar feature vector as a color histogram.

More specifically, as shown in FIG. 11, the similar feature vector calculator 171 generates reduces 167772161 colors of the 24 bit RGB master image 201 to 32 colors, thereby generating a reduced color image 221 having 32 colors. In other words, 5 bit RGB reduced color image 221 is produced. The similar feature vector calculator 171 extracts predetermined higher bits from the pixel values of the pixels of the master image 201, thereby generating the reduced color image 221.

The similar feature vector calculator 171 converts each pixel color of the reduced color image 221 represented by RGB into a pixel color represented in L*a*b*. The similar feature vector calculator 171 identifies a position in the L*a*b* space representing the pixel color of the reduced color image 221. In other words, any color (position in the L*a*b* space) of the 32 colors represented by each pixel of the reduced color image 221 is identified.

The similar feature vector calculator 171 further determines the number of pixels at each color of the 32 colors in the reduced color image 221, namely, the frequency of occurrence of each color, thereby producing a color histogram. The scale of the color histogram represents a color and the frequency of the color histogram represents the number of color pixels.

For example, the similar feature vector calculator 171 calculates the similar feature vector as a vertical component histogram and a horizontal component histogram.

Figure 12:
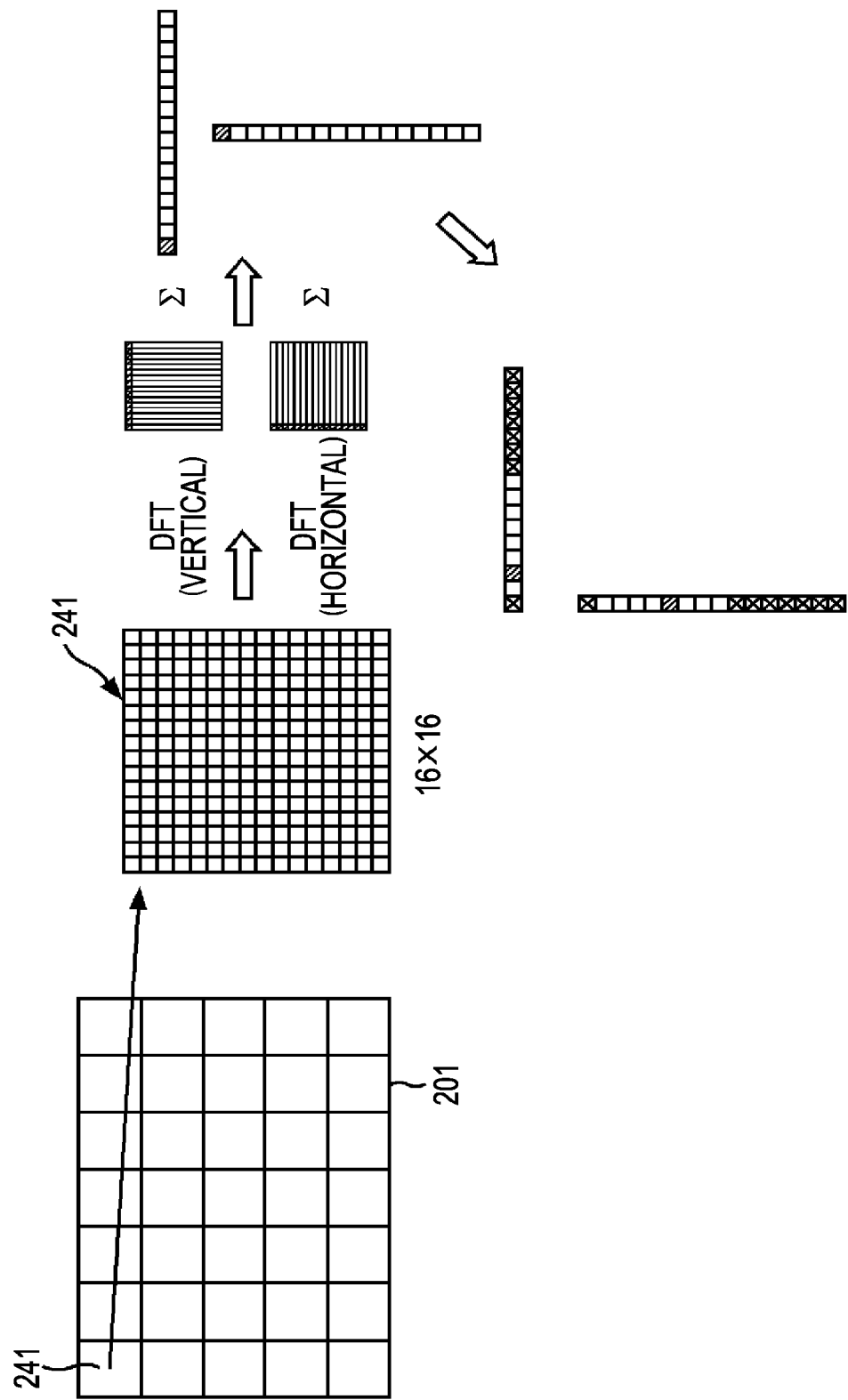
FIG. 12 illustrates the generation of a vertical component histogram and a horizontal component histogram.

As shown in FIG. 12, the similar feature vector calculator 171 segments the master image 201 into blocks 241, each block 241 including 16 pixels by 16 pixels. A discrete Fourier transform (DFT) process is performed on the block 241 in a vertical direction and a horizontal direction.

More specifically, the similar feature vector calculator 171 performs the DFT process on 16 pixels arranged in a vertical column of each block 241, thereby extracting a frequency component of the image in the 16 pixels in the vertical column. Since the block 241 includes 16 vertical columns, each vertical column including 16 pixels. The similar feature vector calculator 171 thus extracts frequency components of 16 images by performing the DTF process on the block 241 in the vertical direction.

The similar feature vector calculator 171 sums the frequency components of the image as a result of performing the DTF process on the block 241 in the vertical direction on a per frequency basis. The similar feature vector calculator 171 selects a maximum component from among eight lowest frequency components, except a DC component, of the values summed. If the maximum value is less than a predetermined threshold, the process result of the block 241 is discarded.

Figure 13:
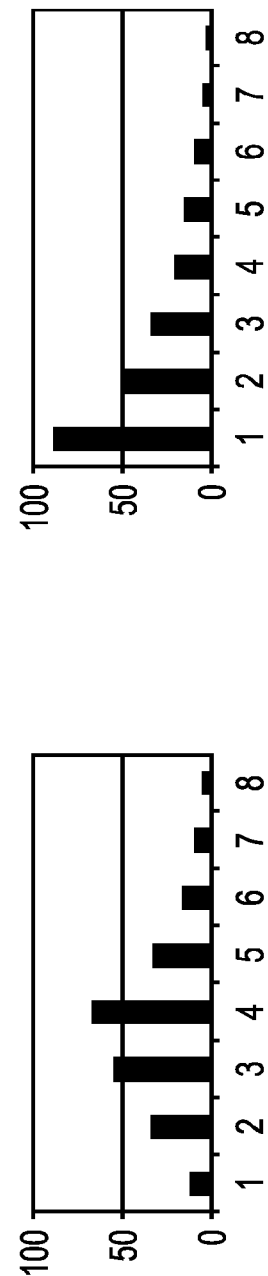
FIGS. 13A and 13B illustrate the generation of the vertical component histogram and the horizontal component histogram.

The similar feature vector calculator 171 sums each maximum value determined in each block 241 every 8 frequencies in the image. As shown in FIGS. 13A and 13B, the similar feature vector calculator 171 generates a vertical component histogram representing the frequency of occurrence of the maximum value every 8 frequencies. The scale of the vertical component histogram represents the frequency of the image, and the frequency of occurrence in the vertical component histogram represents the number providing a maximum frequency component.

Similarly, the similar feature vector calculator 171 performs the DFT process on 16 pixels arranged in one row of the block 241, and extracts frequency components of the image for the 16 pixels in one row. Since each block 241 includes 16 rows, each row including 16 pixels, the similar feature vector calculator 171 extracts frequency components of 16 images by performing the DFT process on the block 241 in a horizontal direction.

The similar feature vector calculator 171 sums the frequency components of the images obtained as a result of performing the DFT process on the block 241 in a horizontal direction. The similar feature vector calculator 171 sums the frequency components of the image as a result of performing the DTF process on the block 241 in the horizontal direction on a per frequency basis. The similar feature vector calculator 171 selects a maximum component from among eight lowest frequency components, except a DC component, of the values summed. If the maximum value is less than a predetermined threshold, the process result of the block 241 is discarded.

The similar feature vector calculator 171 sums each maximum value determined in each block 241 every 8 frequencies in the image. As shown in FIGS. 13A and 13B, the similar feature vector calculator 171 generates a horizontal component histogram representing the frequency of occurrence of the maximum value every 8 frequencies. The scale of the horizontal component histogram represents the frequency of the image, and the frequency of occurrence in the horizontal component histogram represents the number providing a maximum frequency component.

In this way, the similar feature vector calculator 171 generates the vertical component histogram and the horizontal component histogram for the image.

In step S42, the similar feature vector calculator 171 extracts the color histogram, the vertical component histogram and the horizontal component histogram as the features of the two images from which the degree of similarity of the two images is calculated.

Returning to FIG. 10, in step S43, the color feature extractor 172 in the similar feature quantity extractor 162 in the image analyzer 131 performs the color feature extraction process on the image, thereby ending the process. Through the color feature extraction process, the relation level under which the image is thought of in response to a predetermined color name is extracted from the image based on the color of the pixels of the image. The color feature extraction process will be described later with reference to a flowchart of FIG. 36.

In step S34, the image analyzer 131 analyzes the image recorded on the image storage 140 and extracts the feature of the image.

In step S35, the metadata generator 133 generates the metadata containing the feature of the image extracted in step S34. In step S36, the entry generator 134 generates the entries of the master image 201 and the contracted image 202. The entry generator 134 associates the generated entries with the metadata generated in step S35, and adds (stores) the entries on the content database 141 and the similar feature database 142. The content database 141 and the similar feature database 142 record the metadata containing the feature of the image extracted in the server 13.

In step S37, the transmission controller 138-1 causes the communication unit 79 to record the metadata containing the feature of the image on the content database 111 and the similar feature database 112 in the digital still camera 11. More specifically, in step S37, the transmission controller 138-1 causes the communication unit 79 to transmit to the digital still camera 11 a command to write to the content database 111 and the similar feature database 112 and the metadata generated in step S35. When the communication unit 47 receives the metadata and the command to write to the content database 111 and the similar feature database 112, the reception controller 109 supplies to the content database 111 and the similar feature database 112 the metadata and the command to write to the content database 111 and the similar feature database 112. Upon receiving the command to write, the content database 111 and the similar feature database 112 records the metadata containing the feature of the image extracted in the server 13.

The content database 141 and the similar feature database 142 and the content database 111 and the similar feature database 112 record the same metadata containing the feature of the image extracted in the server 13.

In step S38, the transmission controller 138-1 and the reception controller 139-1 in the server 13 cause the communication unit 79 to break connection with the digital still camera 11 to end the process thereof.

The server 13 can perform on the image captured by the cellular phone 12 the same backup process as the one shown in FIG. 9.

Figure 14:
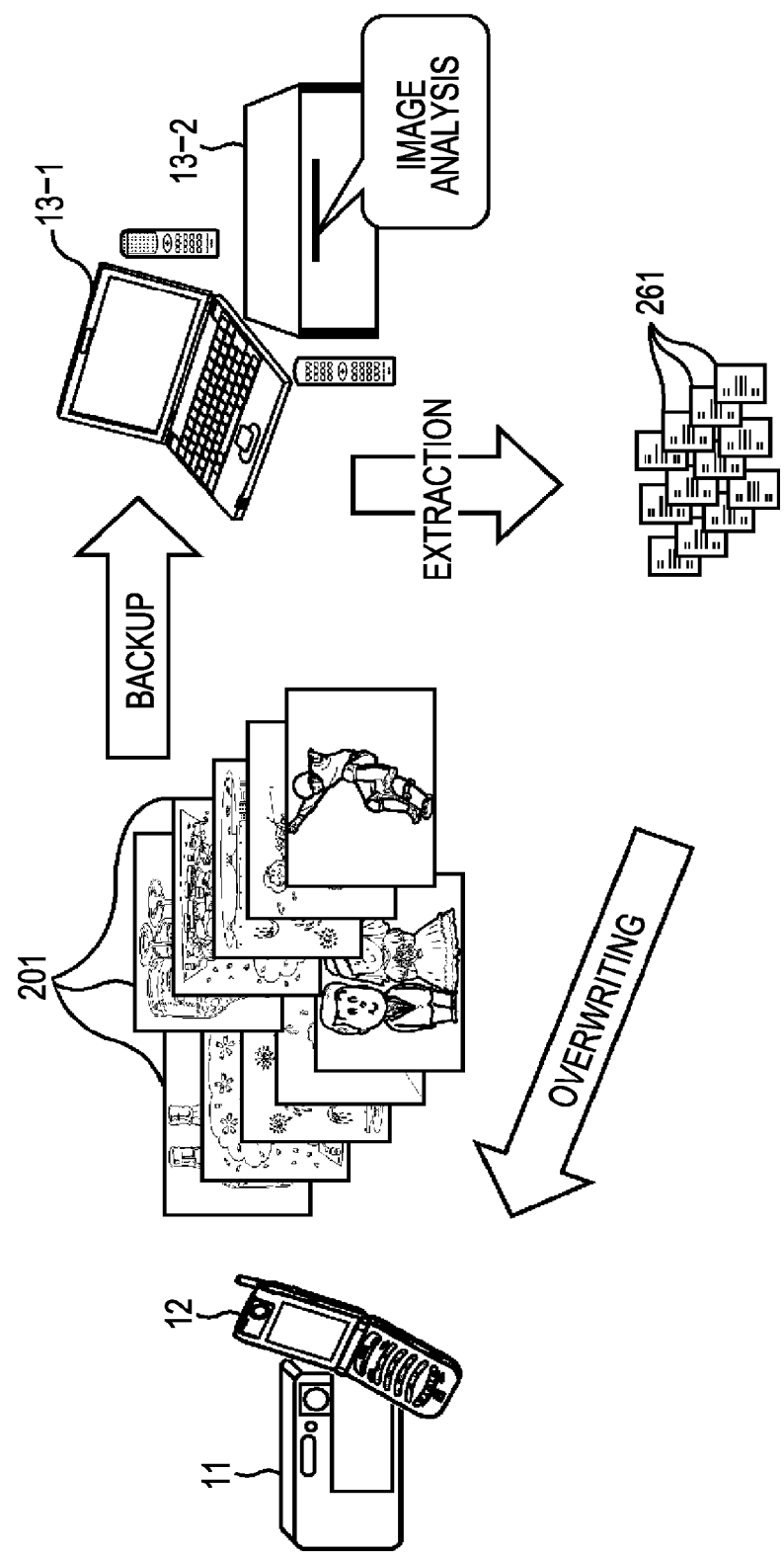
FIG. 14 illustrates image backup and metadata overwriting.

When the image captured by one of the digital still camera 11 and the cellular phone 12 is backed up by one of the server 13-1 and the server 13-2 as shown in FIG. 14, the server 13-1 and the server 13-2 analyze the backed up images, extract the features of the images, and overwrite one of the digital still camera 11 and the cellular phone 12 with metadata 261 containing the feature of the image extracted.

FIG. 15 illustrates a specific example of the metadata 261 that describes the extracted feature of the image and is associated with the master image 201 and the contracted image 202.

The metadata 261 is described in eXtensible Mark-up Language (XML), for example.

Information associated with the master image 201 and the contracted image 202 and information indicating the feature of the master image 201 and the contracted image 202 are arranged between a <photo> tag and a </photo> tag.

A content ID as identification information identifying the master image 201 and the contracted image 202 associated with the metadata 261 is arranged between a <guid> tag and a </guid> tag. For example, the content ID is 128 bits long. The content ID is common to the master image 201 and the contracted image 202 derived from the master image 201.

A path of a file containing the master image 201 as the video data and a file name of the file containing the master image 201 are arranged between a <FullImgPath> tag and a </FullImgPath> tag. A path of a file containing the contracted image 202 as the video data and a file name of the file containing the contracted image 202 are arranged between a <CacheImgPath> tag and </CacheImgPath> tag.

Timestamp 2003:03:31 06:52:32 arranged between a <TimeStamp> tag and a </TimeStamp> tag means that the master image 201 was captured at 6:52:32, Mar. 31, 2003.

Information relating the face image contained in the master image 201 and the contracted image 202 identified by the content ID is arranged between a <Faceinfo> tag and a </Faceinfo> tag.

One arranged between a <TotalFace> tag and a </TotalFace> tag means that the number of face images contained in one of the master image 201 and the contracted image 202 identified by the content ID is one. More specifically, the value arranged between the <TotalFace> tag and the </TotalFace> tag indicates the number of face images contained in one of the master image 201 and the contracted image 202 identified by the content ID.

Information relating to one face image is arranged between a <FaceEntry> tag and a </FaceEntry> tag. Since the number of face images in the metadata 261 shown in FIG. 15 is one, a pair of <FaceEntry> tag and </FaceEntry> tag is arranged.

A value arranged between a <x> tag and a </x> tag indicates a position of the face image in the horizontal direction in one of the master image 201 and the contracted image 202 identified by the content ID. As shown in FIG. 15, 0.328767 between the <x> tag and the </x> tag indicates that the right end position of the face image in the horizontal direction is 0.328767 with the left end of one of the master image 201 and the contracted image 202 at 0.0 and the right end of one of the master image 201 and the contracted image 202 at 1.0.

A value arranged between a <y> tag and a </y> tag indicates a position of the face image in a vertical direction in one of the master image 201 and the contracted image 202 identified by the content ID. As shown in FIG. 15, 0.204082 between the <y> tag and the </y> tag indicates that the right end position of the face image in the horizontal direction is 0.204082 with the upper end of one of the master image 201 and the contracted image 202 at 0.0 and the lower end of one of the master image 201 and the contracted image 202 at 1.0.

More specifically, a normalized horizontal position of the face image is arranged between the <x> tag and the </x> tag, and a normalized vertical position of the face image is arranged between the <y> tag and the </y> tag.

A value arranged between a <width> tag and a </width> tag indicates a width of the face image (a size in the horizontal direction) in one of the master image 201 and the contracted image 202 identified by the content ID. As shown in FIG. 15, 0.408163 between the <width> tag and the </width> tag shows that the width of the face image is 0.408163 with the width of one of the master image 201 and the contracted image 202 being 1.0.

A value arranged a <height> tag and a </height> tag indicates a height of the face image in one of the master image 201 and the contracted image 202 identified by the content ID (a size in the vertical direction). As shown in FIG. 15, 0.273973 between the <height> tag and the </height> tag shows that the height of the face image is 0.273973 with the height of the one of the master image 201 and the contracted image 202 being 1.0.

More specifically, a normalized width of the face image is arranged between the <width> tag and the </width> tag, and a normalized height of the face image is arranged between the <height> tag and the </height> tag.

A value arranged between a <roll> tag and a </roll> tag is a roll angle of the face image. As shown in FIG. 15, 0.000000 between the <roll> tag and the </roll> tag shows that the roll angle of the face image is 0.000000 degree.

A value arranged between a <pitch> tag and a </pitch> tag is a pitch angle of the face image. As shown in FIG. 15, 0.000000 between the <pitch> tag and the </pitch> shows that the pitch angle of the face image is 0.000000 degree.

A value arranged between a <yaw> tag and a </yaw> tag is a yaw angle of the face image. As shown in FIG. 15, 0.000000 between the <yaw> tag and the </yaw> tag shows that the yaw angle of the face image is 0.000000 degree.

The roll angle is an angle made with respect to a fore-aft axis (x axis) representing the position of the face in a fore-aft direction. The pitch angle is an angle made with respect to a horizontal axis (y axis) representing the position of the face in a right-left lateral direction. The yaw angle is an angle made with respect to a vertical axis (z axis) representing the position of the face in a vertical direction.

Arranged between a <Similarityinfo> tag and a </Similarityinfo> tag is a feature quantity of one of the master image 201 and the contracted image 202 identified by the content ID. The feature quantity is used when similarity between one of the master image 201 and the contracted image 202 identified by the content ID and another image is determined.

As shown in FIG. 15, the relation level and the feature quantity are arranged between the <Similarityinfo> tag and the </Similarityinfo> tag. The relation level indicates the degree of association under which one of the master image 201 and the contracted image 202 is thought of in response to a predetermined color name, and the feature quantity is used to calculate the degree of similarity of color or the frequency component of the image.

A relation level, arranged between a <Colorinfo> tag and a </Colorinfo> tag, indicates the degree of association under which one of the master image 201 and the contracted image 202 is thought of in response to a particular color name based on the colors of the pixels of the one of the master image 201 and the contracted image 202 extracted from the one of the master image 201 and the contracted image 202 identified by the content ID.

A relation level, arranged between a <ColorWhite> tag and a </ColorWhite> tag, indicates the degree of association under which one of the master image 201 and the contracted image 202 is thought of in response to a color name of white extracted from the colors of the pixels of the one of the master image 201 and the contracted image 202 identified by the content ID. As shown in FIG. 15, 0 between the <ColorWhite> tag and the </ColorWhite> tag shows that the relation level indicating the degree of association under which one of the master image 201 and the contracted image 202 is thought of in response to the color name of white is 0.

A relation level, arranged between a <ColorBlack> tag and a </ColorBlack> tag, indicates the degree of association under which one of the master image 201 and the contracted image 202 is thought of in response to a color name of white extracted from the colors of the pixels of the one of the master image 201 and the contracted image 202 identified by the content ID. As shown in FIG. 15, 0 between the <ColorBlack> tag and the </ColorBlack> tag shows that the relation level indicating the degree of association under which one of the master image 201 and the contracted image 202 is thought of in response to the color name of black is 0.

A relation level, arranged between a <ColorRed> tag and a </ColorRed> tag, indicates the degree of association under which one of the master image 201 and the contracted image 202 is thought of in response to a color name of red extracted from the colors of the pixels of the one of the master image 201 and the contracted image 202 identified by the content ID. As shown in FIG. 15, 0 between the <ColorRed> tag and the </ColorRed> tag shows that the relation level indicating the degree of association under which one of the master image 201 and the contracted image 202 is thought of in response to the color name of red is 0.

A relation level, arranged between a <ColorYellow> tag and a </ColorYellow> tag, indicates the degree of association under which one of the master image 201 and the contracted image 202 is thought of in response to a color name of yellow extracted from the colors of the pixels of the one of the master image 201 and the contracted image 202 identified by the content ID. As shown in FIG. 15, 0 between the <ColorYellow> tag and the </ColorYellow> tag shows that the relation level indicating the degree of association under which one of the master image 201 and the contracted image 202 is thought of in response to the color name of yellow is 0.

A relation level, arranged between a <ColorGreen> tag and a </ColorGreen> tag, indicates the degree of association under which one of the master image 201 and the contracted image 202 is thought of in response to a color name of green extracted from the colors of the pixels of the one of the master image 201 and the contracted image 202 identified by the content ID. As shown in FIG. 15, 12 between the <ColorWhite> tag and the </ColorWhite> tag shows that the relation level indicating the degree of association under which one of the master image 201 and the contracted image 202 is thought of in response to the color name of green is 0.12. The relation level is represented in percentage.

A relation level, arranged between a <ColorBlue> tag and a </ColorBlue> tag, indicates the degree of association under which one of the master image 201 and the contracted image 202 is thought of in response to a color name of blue extracted from the colors of the pixels of the one of the master image 201 and the contracted image 202 identified by the content ID. As shown in FIG. 15, 0 between the <ColorBlue> tag and the </ColorBlue> tag shows that the relation level indicating the degree of association under which one of the master image 201 and the contracted image 202 is thought of in response to the color name of blue is 0.

Arranged between a <VectorInfo> tag and a </VectorInfo> tag is a feature of one of the master image 201 and the contracted image 202 identified by the content ID to determine the degree of similarity between the one of the master image 201 and the contracted image 202 identified by the content ID and another image.

A single feature of each of the master image 201 and the contracted image 202 identified by the content ID is arranged between a pair of <VectorInfo> tag and </VectorInfo> tag. In the metadata 261 of FIG. 15, three pairs of <VectorInfo> tag and </VectorInfo> tag are described.

A <method> tag and a </method> tag and a <vector> tag and a </vector> tag are arranged between each pair of <VectorInfo> tag and </VectorInfo> tag. The method of feature is described between the <method> tag and the </method> tag, and the feature quantity thereof is described between a <vector> tag and a </vector> tag. The feature quantity described between the <vector> tag and the </vector> tag is a vector quantity.

A color feature described between the <method> tag and the </method> tag arranged between the topmost <VectorInfo> tag and the </VectorInfo> tag on the top in FIG. 15 shows that the feature quantity arranged between the subsequent <vector> tag and </vector> tag is a color feature quantity. The color feature quantity is the one shown in the color histogram discussed with reference to FIG. 11.

As shown in FIG. 15, a text feature arranged between a <method> tag and a </method> tag between the second <VectorInfo> tag and <VectorInfo> tag from the top shows that a feature quantity between subsequent <vector> and </vector> is a feature quantity of pattern. The feature quantity of pattern is the one represented by the histograms of frequency components, namely, the vertical component histogram and the horizontal component histogram discussed with reference to FIGS. 12 and 13.

The whole metadata 261 is stored on the content database 111 and the similar feature database 112 in the digital still camera 11 and on the content database 141 and the similar feature database 142 in the server 13. More specifically, the metadata 261 is appropriately segmented with part thereof stored on the content database 111 and the remaining part thereof stored on the similar feature database 112. In the server 13, the same part of the metadata 261, stored on the content database 111, is also stored on the content database 141, and the same part of the metadata 261, stored on the similar feature database 112, is also stored on the similar feature database 142.

FIG. 16 illustrates the structure of the metadata stored one of the content database 111 and the content database 141.

The metadata stored on one of the content database 111 and the content database 141 includes a content ID, image capturing time, path name, file name, group ID, information relating to a face image contained in the image (hereinafter referred to as face image information), label ID, and comment.

The content ID, unique to an image, identifies the image. The content ID identifies the master image 201 and the contracted image 202. The content ID is a GUID property and described in a character string. The image capturing time indicating date and time at which the image was captured is described in Coordinated Universal Time (UTC) or local time. The image capturing time described the Coordinated Universal Time is identical to image capturing time (UTC) embedded in Date Time Original data in EXIF format.

The image capturing time described in local time is date property, and described in date format. The image capturing time described in local time is identical to image capturing time (local time) embedded in Date Time Original data in EXIF format.

The path name, such as ms/CDIM/XXXXX/, indicates a directory name (file name) of a file of the master image 201. The path name is a path property, and described in a character string.

The file name, such as DSC00001.JPG, indicates a name of a file containing the master image 201 as the video data. The file name is a DCFname property, and described in a character string.

The path name and the file name of the contracted image 202, such as /DATA/EVENTTIMAGE/000000000001.JPG, indicate a directory name and a file name of a file of the contracted image 202. The path name and the file name of the contracted image 202 are vgaCachePath property, and written in a character string.

The group ID identifies a group to which an image belongs. The images are categorized by the user into desired groups. The group ID identifies a group of categorized images. For example, images are categorized by event (such as travel, athletic festivals, etc.), images captured at each event are categorized into a group corresponding to the event.

The group ID is a groupID property and described in a numerical string.

For example, the face image information indicates whether the image is a picture of landscape (containing no face image), a picture of small number of persons (one to five persons), or a picture of a large number of persons (six persons or more). If the face image information is 1, the image is a picture of landscape. If the face image information is 2, the image is a picture of a small number of persons. If the face image information is 3, the image is a picture of a large number of persons. The face image information is faceExistence property, and described in a numerical string.

The face image information may indicate the number of face images contained in the image, the position of the face image in the image, the size of the face image, and the direction toward which the face looks.

The label ID indicates a label attached to the image. The label ID is labels property and described in a numerical string.

The comment is a comment property and described in a character string.

Protect state indicates the protect state of the image, such as deleted or added. The protect state is a protect property and described in a logical data string.

Exchange/import flag indicates whether the image is exchanged or imported. The exchange/import flag is a exchangeOrImport property and described in a logical data string.

A meta enable flag, which is true, indicates that the server 13 generates the metadata from the image. The meta enable flag is a metaEnableFlag property and described in a logical data string.

A backup flag, which is true, indicates that the server 13 backs up the image. The backup flag is a backUpFlag property and described in a logical data string.

Figure 17:
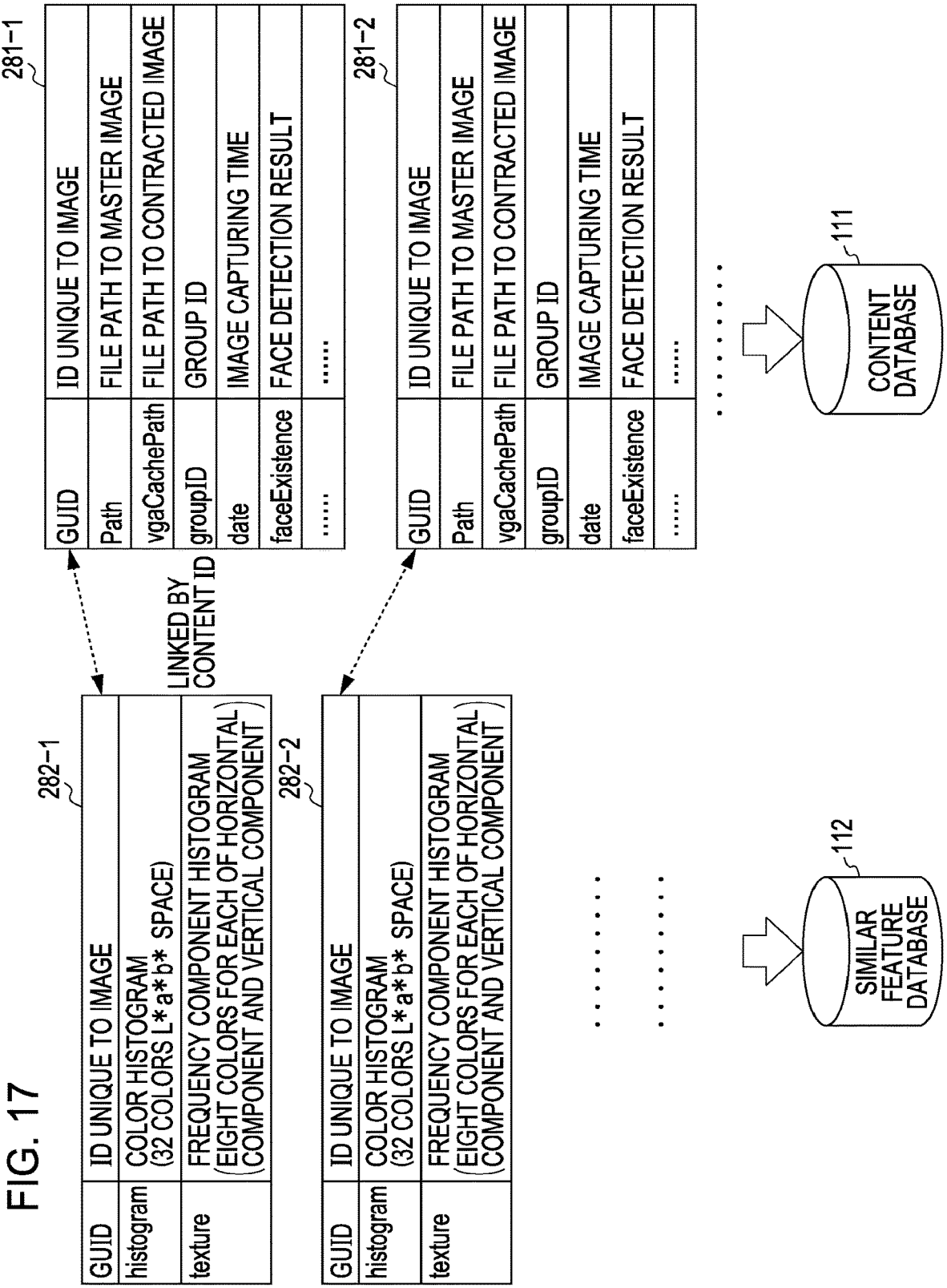
FIG. 17 illustrates the structure of metadata stored on the content database or metadata stored on a similar feature database.

FIG. 17 illustrates the structure of a metadata portion stored on the digital still camera 11 and a metadata portion stored on the similar feature database 112.

A content item is stored on the content database 111 on a per image basis. The content item is composed part of the metadata 261.

For example, a content item 281-1 corresponds to one image identified by a stored content ID, and contains the content ID, the path name and the file name of the master image 201 (Path in FIG. 17), the path name and the file name of the contracted image 202, the group ID, the image capturing time in local time format, and the face image information. A content item 281-2, corresponding to another image, contains the content ID, the path name and the file name of the master image 201 (Path in FIG. 17), the path name and the file name of the contracted image 202, the group ID, the image capturing time in local time format, and the face image information.

If there is no need for discriminating between the content items 281-1 and 281-2, the content item is simply referred to as the content item 281.

A similar feature item is stored on the similar feature database 112 on a per image basis. The similar feature item contains a portion of the metadata 261 excluding the content item 281. The similar feature item contains the content ID.

A content item 282-1 corresponds to the content item 281-1 identified by the stored content ID, i.e., corresponds to one image identified by the stored content ID. The content item 282-1 is composed of the content ID, the color histogram, and the frequency component histograms.

The color histogram indicates the frequency of occurrence of each of the 32 colors in the image, and is a histogram property. The frequency component histograms contain a vertical component histogram and a horizontal component histogram, and indicate the frequency of occurrence of a maximum value of a frequency component of the eight frequencies in each of the vertical direction and the horizontal direction of the image and are texture property.

Similarly, a content item 282-2 corresponds to the content item 281-2 identified by the stored content ID, i.e., corresponds to one image identified by the stored content ID. The content item 282-1 is composed of the content ID, the color histogram, and the frequency component histograms.

If there is no need for discriminating between the content items 282-1 and 282-2, the content item is simply referred to as the content item 282.

The content item 282, corresponding to the content item 281 stored on the content database 111, is stored on the similar feature database 112.

Figure 18:
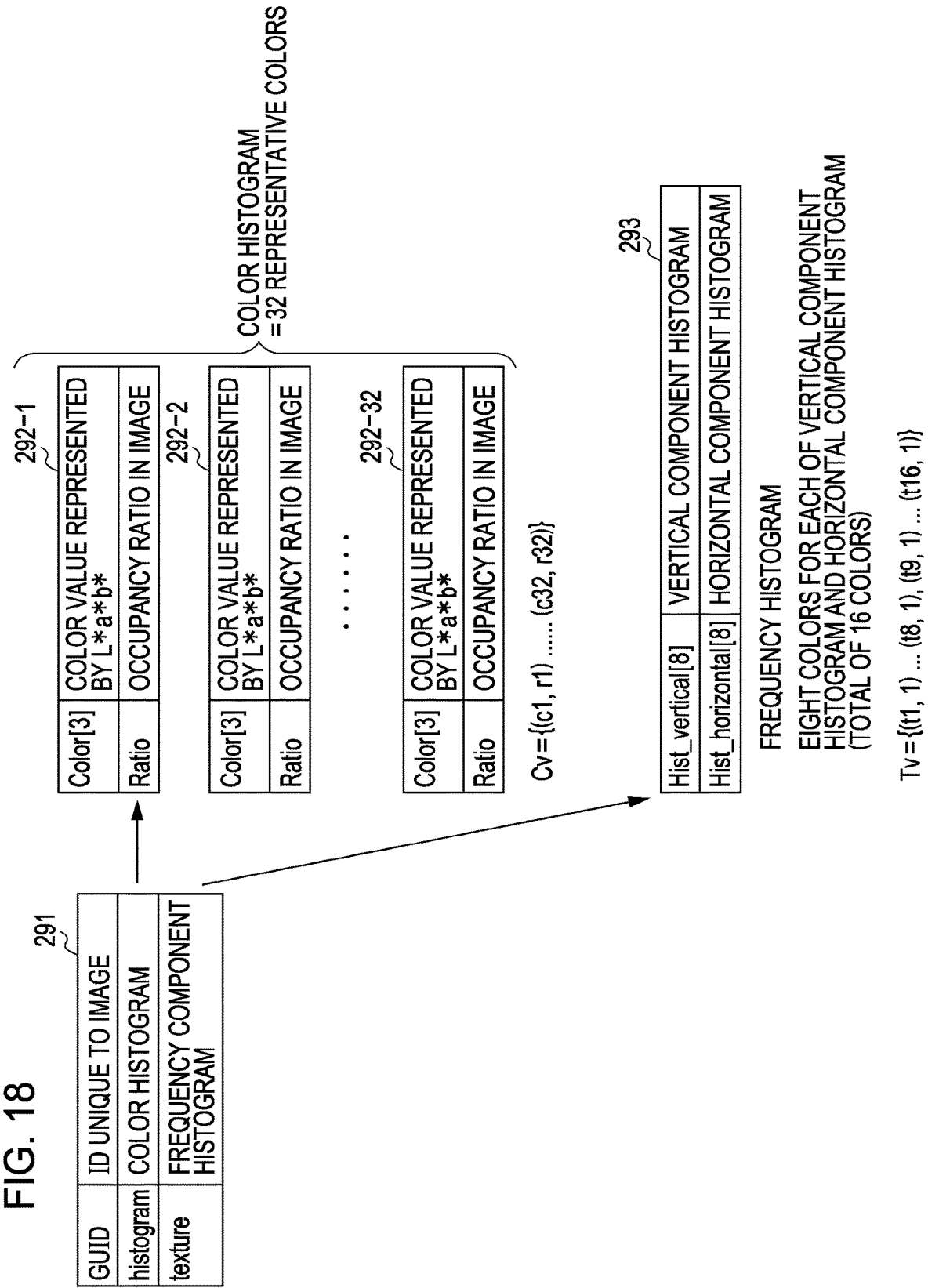
FIG. 18 illustrates the structure of a similar feature item.

FIG. 18 illustrates the structure of the content item 282. The content item 282 contains an item 291, items 292-1 through 292-32, and an item 293. The item 291 contains a content ID, pointers pointing to the items 292-1 through 292-32, and a pointer pointing to the item 293. The pointers pointing to the items 292-1 through 292-32 correspond to the color histogram. The pointer pointing to the item 293 corresponds to the frequency component histogram.

The items 292-1 through 292-32 respectively indicate the frequencies of occurrence of the color histogram, i.e., each color represented by $L*a*b*$ and a ratio of an area of the image occupied by that color to the image (for example, the number of pixels of each of the 32 colors). The item 292-1 indicates, as one of the 32 colors, a first color represented by $L*a*b*$ and an occupancy ratio of the image occupied by the first color to the image. The item 292-2 indicates, as one of the 32 colors, a second color represented by $L*a*b*$ and an occupancy ratio of the image occupied by the second color to the image.

The items 292-3 through 292-32, each color respectively represented by $L*a*b*$, include third through thirty-second colors of the 32 colors, and respectively represent occupancy ratios of the third through thirty-second colors in the image.

The items 292-1 through 292-32 generally represent the color histogram of a single image. The color histogram may be represented by a color feature vector Cv. The color feature vector Cv may be represented as Cv={(c1,r1), ..., (c32,r32)}. Each of (c1,r1) through (c32,r32) represents an occupancy ratio of the image by each of the 32 colors represented by c1 through c32.

The item 293 indicates the vertical component histogram and the horizontal component histogram. Each of the vertical component histogram and the horizontal component histogram shows eight frequencies of occurrence.

The frequency component histogram composed of the vertical component histogram and the horizontal component histogram may be represented by a frequency component vector Tv. The frequency component vector Tv may be described as Tv={(t1,1), ..., (t8,1), (t9,1), ..., (t16,1)}. Each of (t1,1) through (t16,1) represents the maximum number (occurrence) of the frequency component represented by any of t1 through t16.

Figure 19:
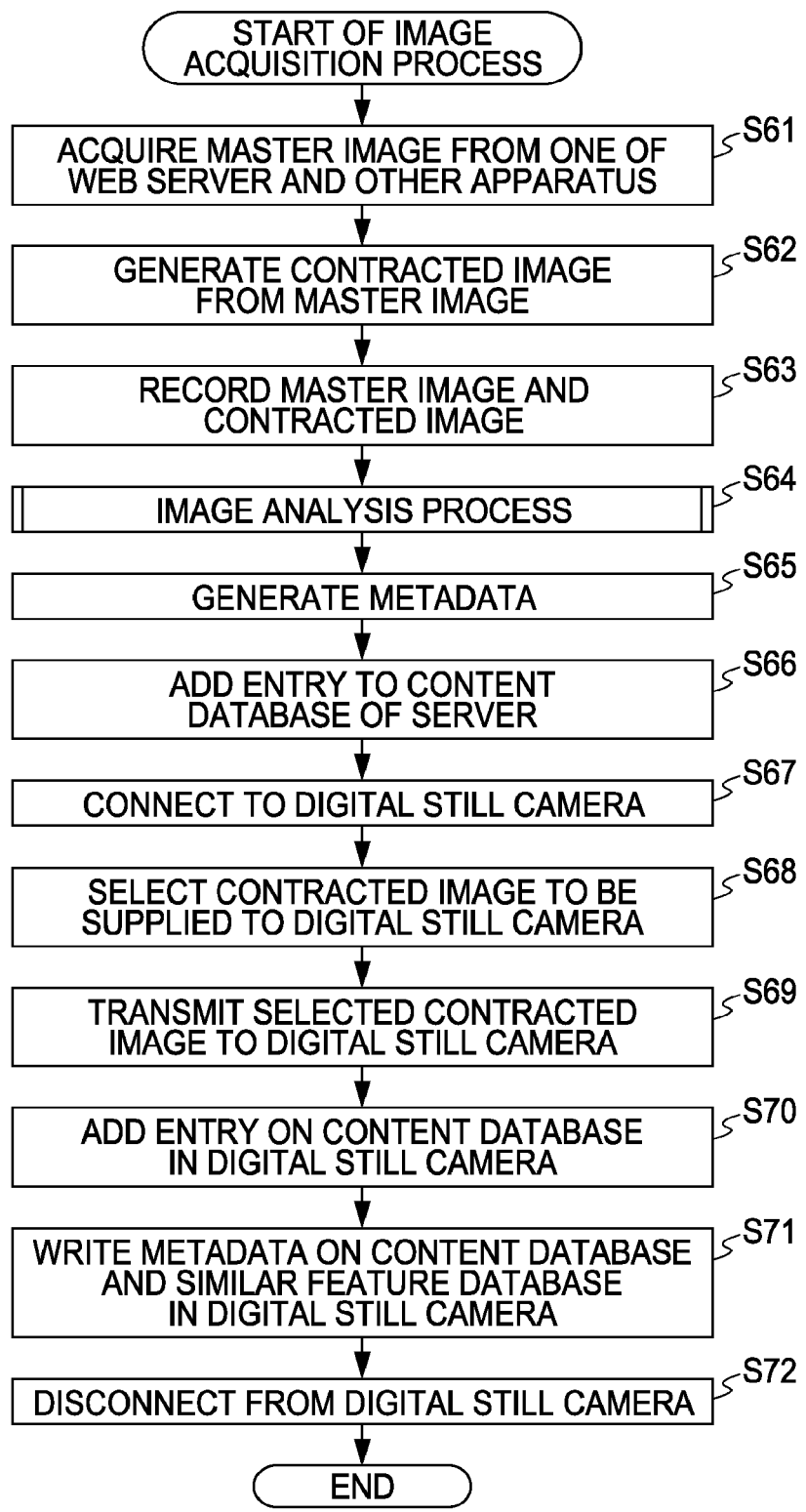
FIG. 19 is a flowchart illustrating an image acquisition process.

An image acquisition process of the server 13 is described below with reference to a flowchart of FIG. 19. In the image acquisition process, the server 13 acquires an image from one of the Web server 15-1, the Web server 15-2, and another device.

In step S61, the transmission controller 138-2 and the reception controller 139-2 in the server 13 cause the communication unit 80 to acquire the master image 201 from the Web server 15-1 via the network 14.

For example, in step S61, the transmission controller 138-2 and the reception controller 139-2 cause the communication unit 80 to connect to the Web server 15-1 via the network 14. The transmission controller 138-2 causes the communication unit 80 to transmit to the Web server 15-1 via the network 14 a request to transmit the master image 201. The Web server 15-1 transmits the requested master image 201 via the network 14. The transmission controller 138-2 causes the communication unit 80 to receive the master image 201 transmitted by the Web server 15-1. The transmission controller 138-2 supplies the received master image 201 to the image storage 140.

In step S62, the contracted image generator 132 generates a contracted image 202 from the received master image 201. For example, the contracted image generator 132 generates the contracted image 202 from the master image 201 by decimating the pixels of the master image 201. Alternatively, the contracted image generator 132 may generate the contracted image 202 by averaging a plurality of consecutive pixels of the master image 201 and representing the plurality of consecutive pixels by the single average pixel value.

The contracted image generator 132 supplies the generated contracted image 202 to the image storage 140.

In step S63, the image storage 140 records the received master image 201 and the contracted image 202 generated by the contracted image generator 132.

The contracted image generator 132 may read the master image 201 from the image storage 140 and generate the contracted image 202 from the read master image 201.

In step S64, the image analyzer 131 analyzes the image recorded on the image storage 140. The image analysis process in step S64 is identical to the process discussed with reference to the flowchart of FIG. 10, and the discussion thereof is omitted here.

In step S65, the metadata generator 133 generates the metadata of the image containing the feature of the image extracted in step S64. In step S66, the entry generator 134 generates the entries of the master image 201 and the contracted image 202. The entry generator 134 associates the generated entries with the metadata generated in step S65, and then stores the entries onto the similar feature database 142 (and the similar feature database 142).

In step S67, the transmission controller 138-1 and the reception controller 139-1 cause the communication unit 79 to connect to the digital still camera 11.

In step S68, the retrieval unit 137 selects a contracted image 202 to be transferred to the digital still camera 11 from among the contracted images 202 recorded on the image storage 140, based on the data transmitted from the digital still camera 11. The retrieval unit 137 reads the selected contracted image 202 from the image storage 140, and supplies the read contracted image 202 to the transmission controller 138-1.

In step S69, the transmission controller 138-1 causes the communication unit 79 to transmit the selected contracted image 202 to the digital still camera 11.

In step S70, the transmission controller 138-1 causes the communication unit 79 to record the feature of the image, as the metadata of the transmitted contracted image 202, on the content database 111 and the similar feature database 112 in the digital still camera 11 in the same manner as in step S37.

In step S72, the transmission controller 138-1 and the reception controller 139-1 in the server 13 cause the communication unit 79 to disconnect the link with the digital still camera 11. Processing thus ends.

Figure 20:
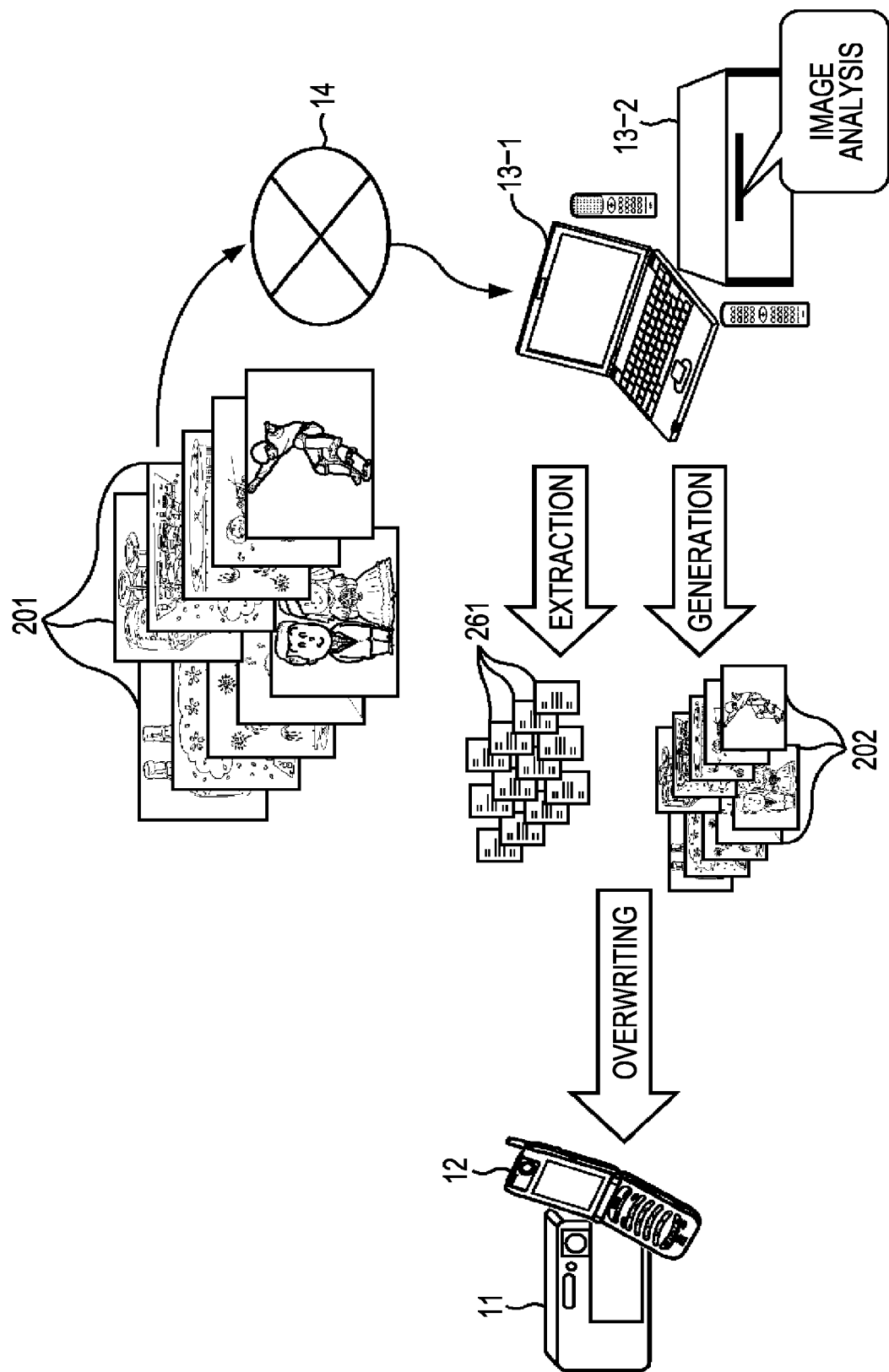
FIG. 20 illustrates acquisition of an image and overwriting of metadata.

As shown in FIG. 20, one of the server 13-1 and the server 13-2 acquires the master image 201 from one of the Web server 15-1, the Web server 15-2, and another device via the network 14, and records the acquired master image 201. One of the server 13-1 and the server 13-2 generates a contracted image 202 from the master image 201, and analyzes the master image 201 in order to extract the feature of the master image 201. One of the server 13-1 and the server 13-2 writes the contracted image 202 together with the metadata 261 containing the extracted feature of the master image 201 onto one of the digital still camera 11 and the cellular phone 12.

Figure 21:
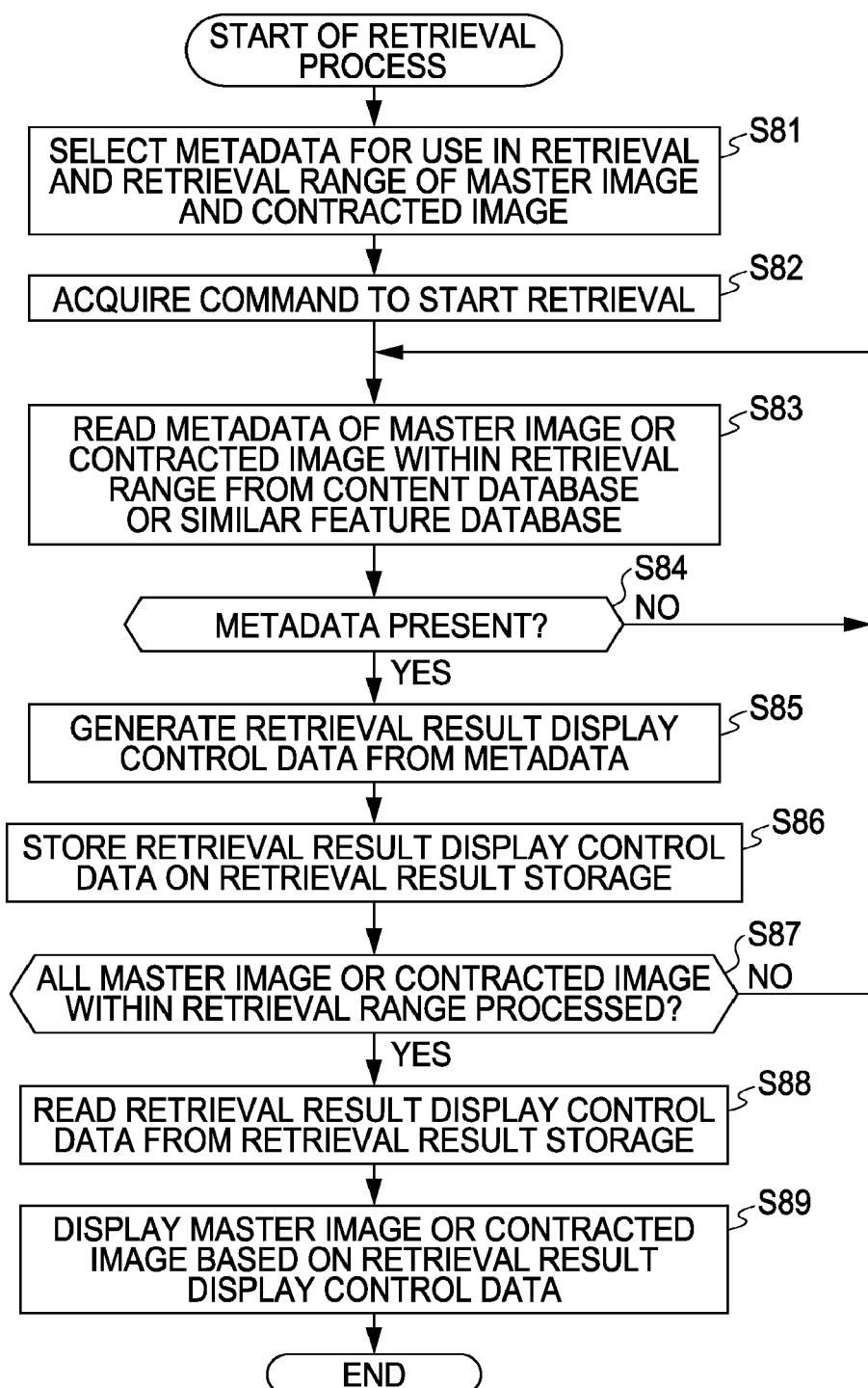
FIG. 21 is a flowchart illustrating a retrieval process.

A retrieval process of the digital still camera 11 is described below with reference to a flowchart of FIG. 21. In step S81, the retrieval unit 107 selects metadata to be used for retrieval from among the metadata stored on one of the digital still camera 11 and the cellular phone 12. For example, the retrieval unit 107 selects between a relation level and a feature as the metadata for use in retrieval. The relation level indicates the degree of association under which the image is thought of in response to the image capturing time, the imaging condition, the face image information, and a predetermined color based on a signal coming from the input unit 49 when the user operates the input unit 49. The feature is the one used to calculate the degree of similarity of color, or the frequency component of the image.

In step S81, in response to the signal from the input unit 49 operated by the user, the retrieval unit 107 selects a range of retrieval in the retrieval of one of the master image 201 and the contracted image 202 recorded on the image storage 110.

In step S82, the retrieval unit 107 acquires a retrieval start command as a signal supplied from the input unit 49 operated by the user.

In step S83, the retrieval unit 107 reads successively the metadata 261 of the one of the master image 201 and the contracted image 202 within the retrieval range from one of the content database 111 and the similar feature database 112.

In step S84, the retrieval unit 107 determines whether the metadata 261 is present, i.e., whether the metadata 261 is null. If it is determined in step S84 that the metadata 261 is present, processing proceeds to step S85. The retrieval unit 107 generates retrieval result display control data from the metadata 261.

In step S85, the metadata as a vector indicating the feature used to calculate the degree of similarity of the frequency component of the color or the image is used. More specifically, based on the metadata, the retrieval unit 107 calculates a distance of the vector based on the metadata as the vector of the selected image (serving as a reference image), and the metadata as the vector of the image within the retrieval range. The retrieval unit 107 thus generates the distance of the vector as the retrieval result display control data.

The smaller the distance of the vector, the more the images look similar. Using the retrieval result display control data as the distance of vector, a more similar image is read, and the images are then displayed in the order of similarity.

In step S85, the retrieval unit 107 compares the relation level with an input threshold value based on the metadata as the relation level indicating the degree of association under which the image is thought of in response to the predetermined color, and generates retrieval result display control data having a relation level higher than the input threshold value.

Using the retrieval result display control data having a relation level higher than the input threshold value, an image having a higher degree of association in response to a color name, i.e., an image having more component of that color is read. Only the images having the color of that color name are thus displayed.

For example, the retrieval unit 107 calculates the retrieval result display control data by calculating the distance between the input threshold value and the relation level based on the metadata as the relation level indicating the degree of association under which association is created in response to the predetermined color name.

Using the retrieval result display control data, i.e., the distance between the input threshold value and the relation level, an image having a desired amount of color component of a desired color name is read and then displayed.

The retrieval result display control data contains the content ID, and the content ID is used to identify one of the master image 201 and the contracted image 202 corresponding to the retrieval result display control data.

In step S86, the retrieval unit 107 stores the generated retrieval result display control data on the retrieval result storage 115.

In step S87, the retrieval unit 107 determines whether all master images 201 or all contracted images 202 within the retrieval range are processed. If it is determined in step S87 that all master images 201 or all contracted images 202 within the retrieval range are not processed, processing returns to step S83. The retrieval unit 107 reads the metadata 261 of one of a next master image 201 and a next contracted image 202 within the retrieval range from one of the content database 111 and the similar feature database 112 to repeat the above-described process.

If it is determined in step S84 that the metadata 261 is not present, i.e., that the metadata 261 is null, processing returns to step S83. The searcher 107 reads the metadata 261 of one of a next master image 201 and a next contracted image 202 within the retrieval range from one of the content database 111 and the similar feature database 112, and repeats the above-described process.

If it is determined in step S87 that all master images 201 or all contracted images 202 within the retrieval range are processed, processing proceeds to step S88. The display controller 106 reads the retrieval result display control data from the retrieval result storage 115. In step S89, the display controller 106 reads one of the master image 201 and the contracted image 202 from the image storage 110 based on the retrieval result display control data, and displays the one of the master image 201 and the contracted image 202. Processing thus ends.

If the retrieval result display control data as the distance of vector indicating the feature used to calculate the degree of similarity of the frequency component of the color or the image is generated in step S85, the display controller 106 displays on the monitor 40 one of the master image 201 and the contracted image 202 in the order of similarity with respect to a reference image in step S89.

If the retrieval result display control data indicating that the relation level as the degree of association thought of in response to the predetermined color name is above the input threshold value in step S85, the display controller 106 displays on the monitor 40 one of the master image 201 and the contracted image 202 containing more color of that color name in step S89.

If the retrieval result display control data as the distance between the relation level indicating the degree of association thought of in response to the predetermined color name and the input threshold value is generated in step S85, the display controller 106 displays on the monitor 40 one of the master image 201 and the contracted image 202 containing a desired amount of color of a desired color name in step S89.

The cellular phone 12 performs the same retrieval process as the one discussed with reference to the frequency component histogram of FIG. 21. The server 13 performs the same retrieval process as the one discussed with reference to the frequency component histogram of FIG. 21.

Figure 22:
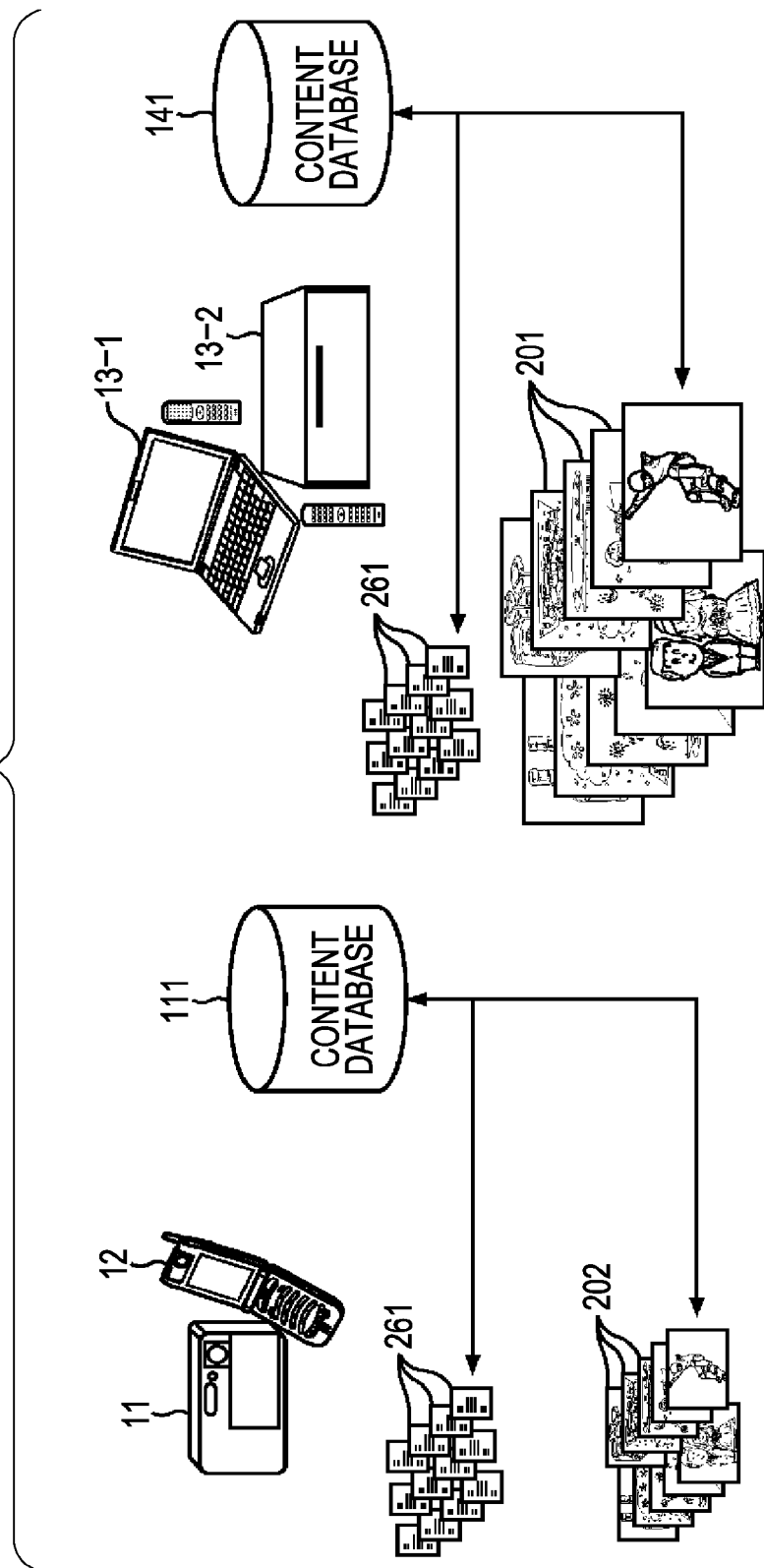
FIG. 22 illustrates an association between metadata common to a digital still camera and a server and the image.

As shown in FIG. 22, the contracted image 202 is retrieved based on the metadata 261 stored on the content database 111 and the similar feature database 112 in one of the digital still camera 11 and the cellular phone 12 in the same manner such that the master image 201 is retrieved based on the metadata 261 stored on the content database 141 and the similar feature database 142 in one of the server 13-1 and the server 13-2.

The specific retrieval process of the digital still camera 11 is described below.

Figure 23:
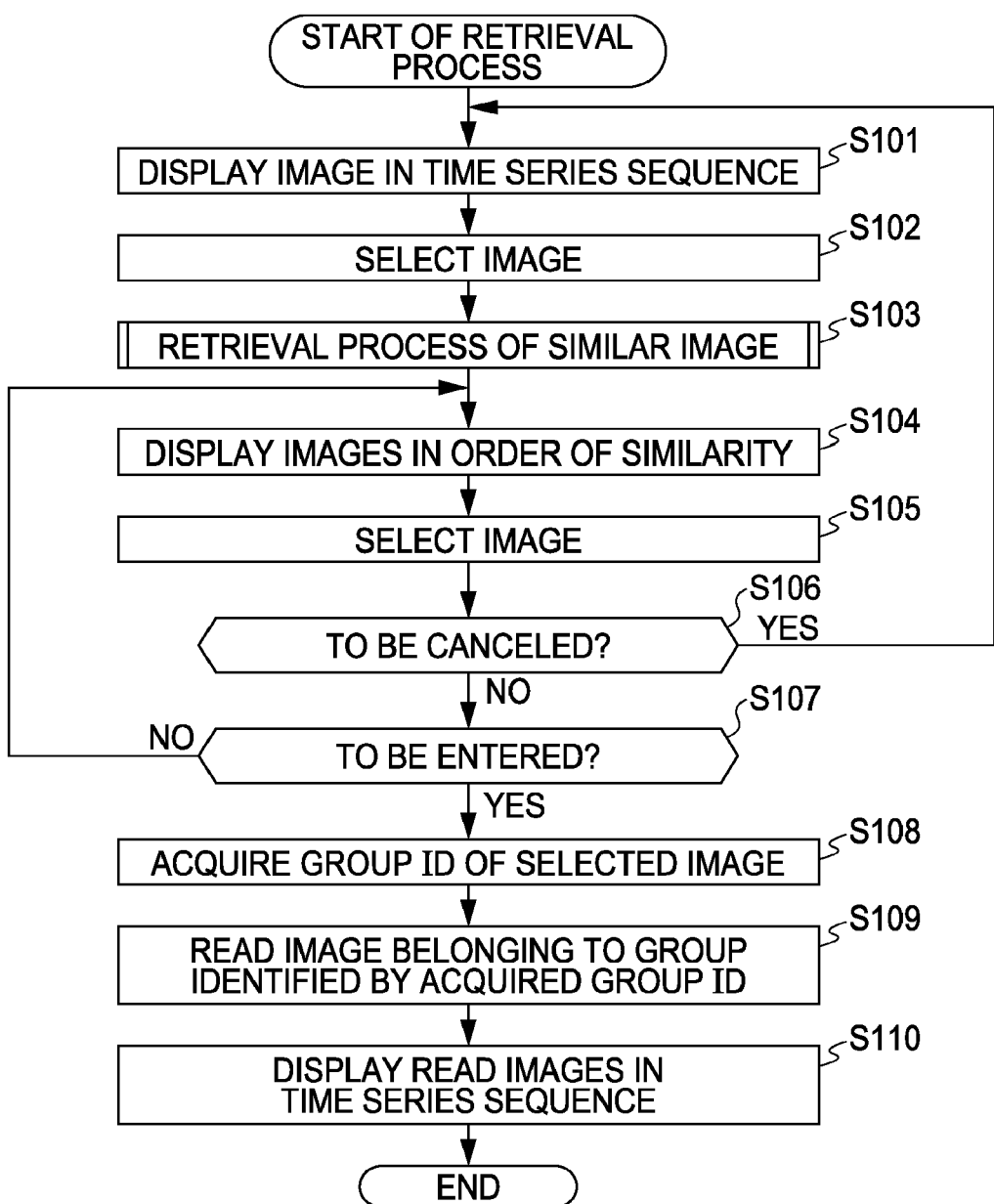
FIG. 23 is a flowchart illustrating the retrieval process.

FIG. 23 is a flowchart illustrating another retrieval process of the digital still camera 11. In step S101, the display controller 106 causes the contracted image 202 to be displayed in time series sequence on the monitor 40. More specifically, in step S101, the image storage 110 supplies to the display controller 106 the contracted image 202 within a predetermined range responsive to a signal from the input unit 49 operated by the user, out of the recorded contracted image 202. The content database 111 supplies to the display controller 106 the metadata at the image capturing time, out of the metadata 261 of the contracted image 202 within the predetermined range supplied from the display controller 106. The display controller 106 causes the monitor 40 to display the contracted image 202 by the image capturing time in time series image capturing order.

Figure 24:
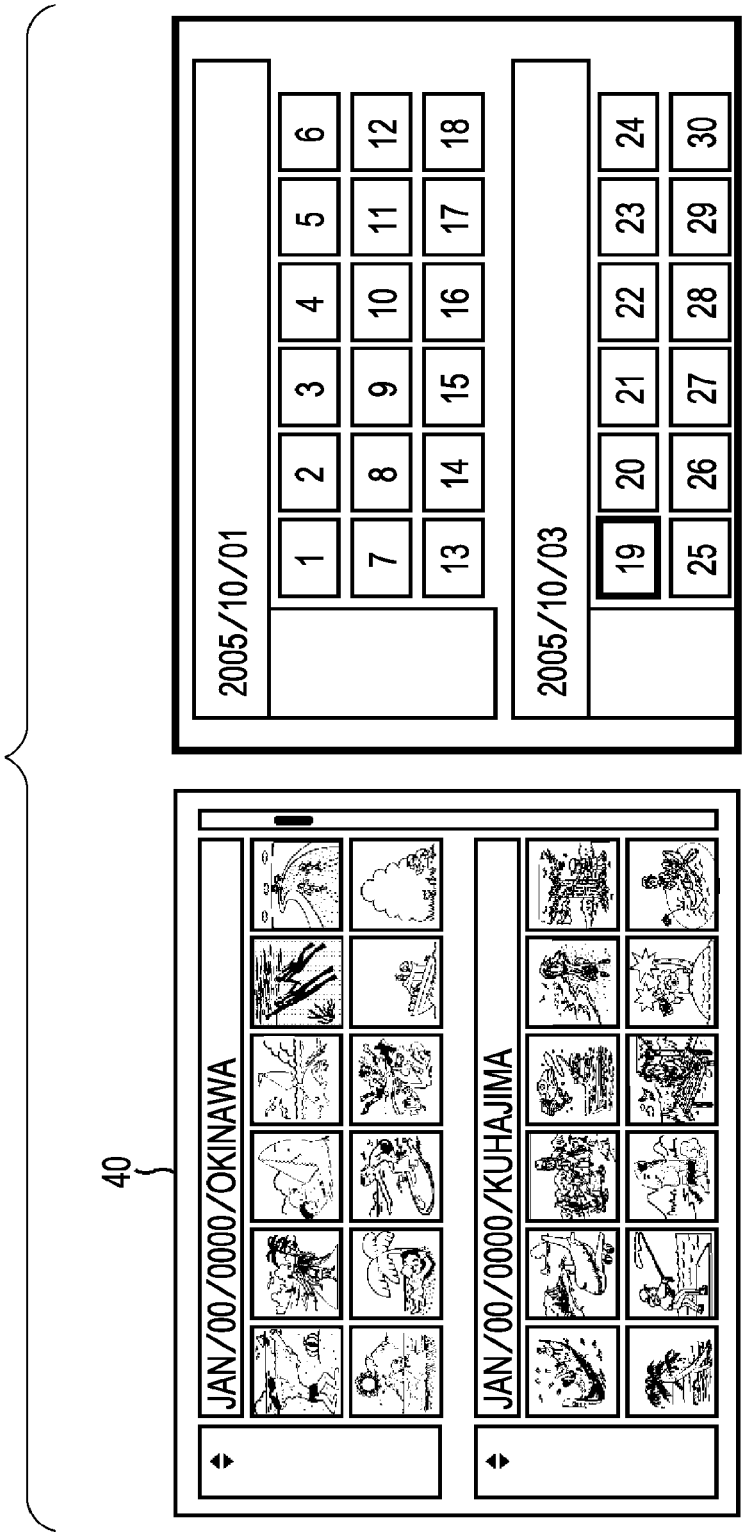
FIG. 24 illustrates the display of a reduced image.

As shown in FIG. 24, the display controller 106 causes the monitor 40 to display the contracted image 202 in time series order of image capturing on a per group basis. Each group is identified by a group ID. Each square on the right of FIG. 24 indicates one contracted image 202, and a number in each square indicates an image capturing order. The display controller 106 displays contracted images 202 on the monitor 40 in the order of image capture in a raster scan sequence on a per group basis.

In step S101, the image storage 110 may cause clustered images on the monitor 40.

Images p1 through p12 captured at times t1 through t12, respectively, are now clustered. For example, condition A and condition B are set in a clustering process. From the condition A, one cluster is composed of image p1 through image p12. The condition A defines a low granularity (coarse) cluster, and the condition B defines a high granularity (fine) cluster. The condition B is higher in granularity than the condition A. For example, an event name "wedding ceremony" is set in the cluster defined by the condition A.

In the cluster with the event name "wedding ceremony" set, the degree of variations in time intervals of image capturing times of image is smaller than a predetermined threshold value.

From images p1 through p12, the condition B defines one cluster of images p1 through p3, another cluster of images p4 through p7, and yet another cluster of images p8 through p12.

A "ceremony at church" is set in the cluster composed of images p1 through p3, an "entertainment for wedding" is set in the cluster of composed of images p4 through p7, and a "second party" is set in the cluster composed of images p8 through p12.

The degree of variations in time intervals of image capturing times of image is small between the images p1 through p3 in the cluster having the event name "ceremony at church." There occurs a relatively long time interval from image p3 to image p4, which is the first image of a next cluster composed of images p4 through p7 having a low degree of variations in time interval of image capturing times (in time axis). During the time interval between image p3 and image p4, the frequency of occurrence is determined to change.

In the cluster with the event name "entertainment for wedding" set therein, the degree of variations in time interval of image capturing times is small between images p4 through p7. There occurs a relatively long time interval from image p7 to image p8, which is the first image of a next cluster composed of images p8 through p12 having a low degree of variations in time interval of image capturing times (in time axis). During the time interval between image p7 and image p8, the frequency of occurrence is determined to change.

In the cluster with the event name "second party" set therein, the degree of variations in time interval of image capturing times is small between images p8 through p12. There occurs a relatively long time interval from image p12 to a next image, which is the first image of a next cluster having a low degree of variations in time interval of image capturing times (in time axis). During the time interval between image p12 and the next image, the frequency of occurrence is determined to change.

The event names the "wedding ceremony," the "ceremony at church," the "entertainment for wedding," and the "second party" are manually set by the user, for example.

A plurality of conditions is set to cluster images and clusters of different granularity levels are defined based on the conditions.

Images contained in each cluster thus defined are presented to the user in a layered structure.

In step S101, the image storage 110 may cause the monitor 40 to segment a display area into partitions by date, and display the contracted image 202 in a predetermined partition so that the data assigned to the partition matches the date of image capture. More specifically, in step S101, the image storage 110 displays the contracted image 202 in a calendar format.

In step S102, the retrieval unit 107 selects one contracted image 202 from the contracted images 202 displayed on the monitor 40 based on the signal from the monitor 40 operated by the user.

When any of the contracted images 202 displayed in a time series format is selected, the display controller 106 highlights the selected contracted image 202 or enhances the outline of the selected contracted image 202 as shown in FIG. 24.

Figure 25:
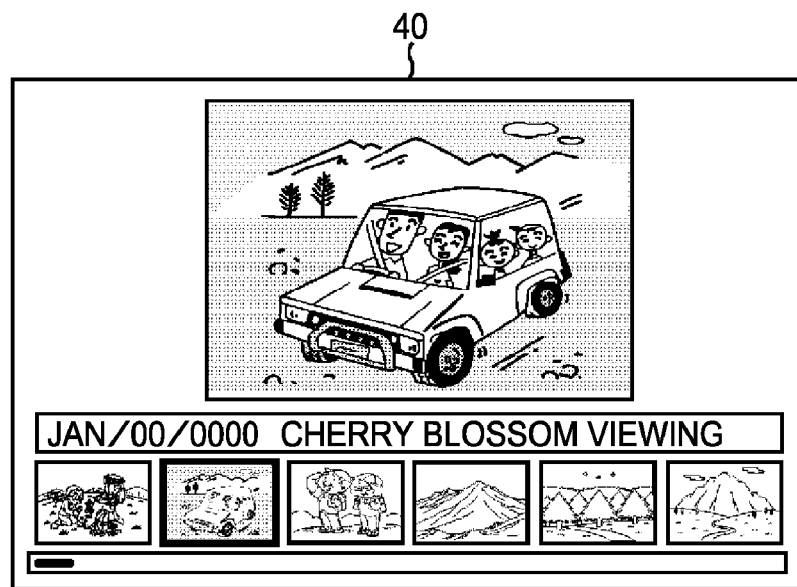
FIG. 25 illustrates the display of a reduced image.

When any of the contracted images 202 displayed in a time series format is selected, the display controller 106 expands the selected contracted image 202 on the monitor 40 as shown in FIG. 25.

In step S103, the retrieval unit 107 retrieves a similar image.

Figure 26:
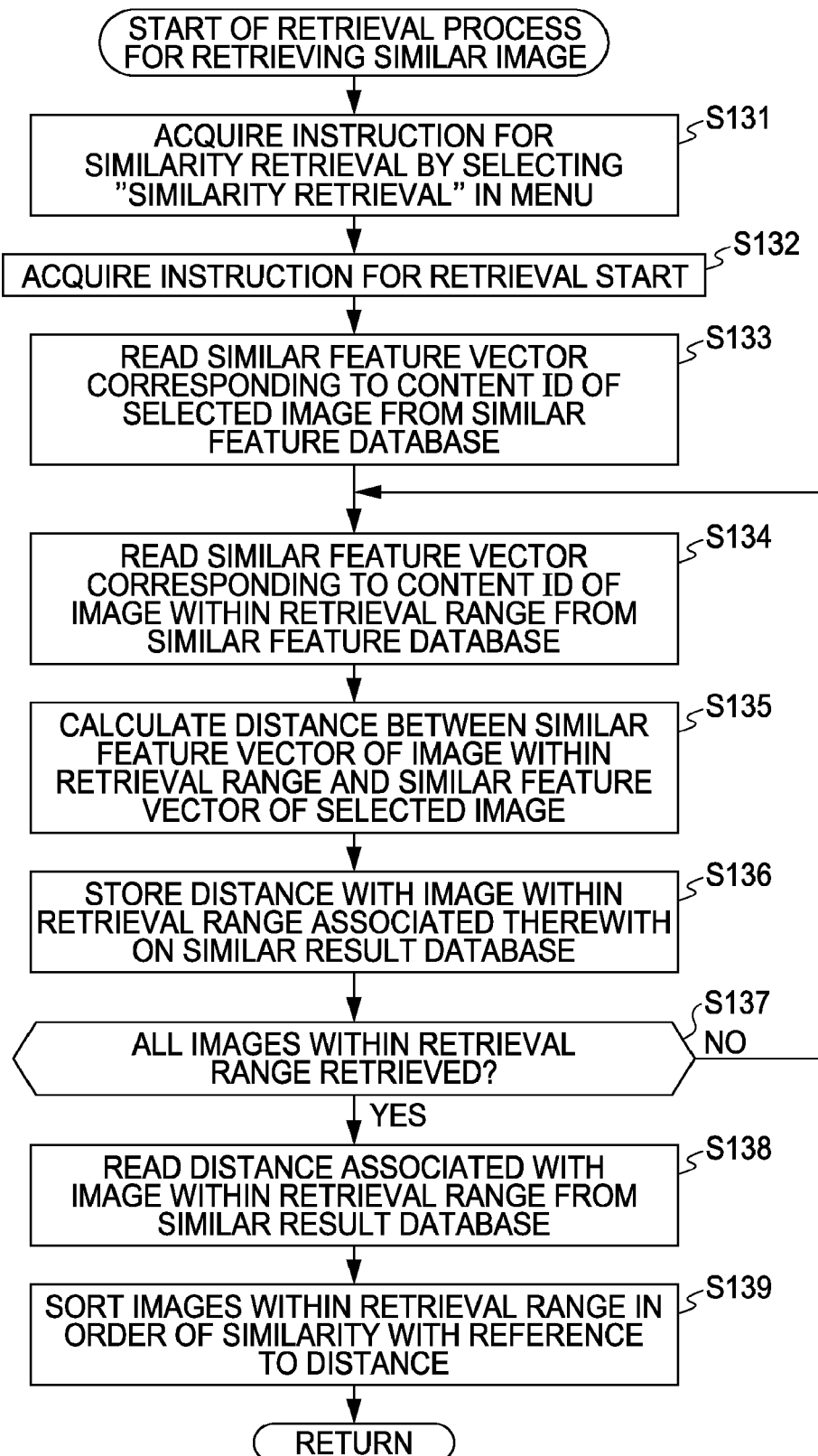
FIG. 26 is a flowchart illustrating a retrieval process retrieving similar images.

FIG. 26 is a flowchart illustrating a similar image retrieval process performed in step S103. In step S131, the retrieval unit 107 receives a signal from the input unit 49 operated by the user, and thus acquires a similarity retrieval instruction by selecting a "similarity retrieval" item in a menu displayed on the monitor 40.

In step S132, the retrieval unit 107 receives a retrieval start instruction by receiving a signal from the monitor 40 operated by the user.

In step S133, the retrieval unit 107 reads a similar feature vector corresponding to a content ID of the contracted image 202 selected in step S102 from the similar feature database 112. The similar feature vector is one of a color feature vector Cv and a frequency component vector Tv.

In step S134, the retrieval unit 107 reads a similar feature vector corresponding to a content ID of one contracted image 202 within a retrieval range from the similar feature database 112.

If the similar feature vector as the color feature vector Cv is read in step S133, a similar feature vector as a color feature vector Cv is read in step S134. If the similar feature vector as the frequency component vector Tv is read in step S133, a similar feature vector as a frequency component vector Tv is read in step S134.

In step S135, the retrieval unit 107 calculates a distance between the similar feature vector of the contracted image 202 within the retrieval range and the similar feature vector of the selected contracted image 202.

Calculation of the distance between a color feature vector $Cv1=\{(c1\_1,r1\_1), \ldots, (c32\_1,r32\_1)\}$ and a color feature vector $Cv2=\{(c1\_2,r1\_2), \ldots, (c32\_2,r32\_2)\}$, each having 32 elements, is described below.

The concept of ground distance $d_{ij}=d(c1i,c2j)$ is introduced here. The ground distance $d_{ij}$ defines a distance between elements of a color feature vector, and is an Euclidean distance between two colors (distance in three-axis L*a*b* space). The ground distance $d_{ij}$ is thus described as $dij=\|c1i-c2j\|$.

An earth movers distance (EMD) between the color feature vector Cv1 and the color feature vector Cv2 is calculated by solving a transport problem of determining a flow $F=\{Fji\}$ from the color feature vector Cv1 to the color feature vector Cv2. Here, the color feature vector Cv1 is a supplier, the color feature vector Cv2 is a market, and $d_{ij}$ is unit transport cost.

EMD is calculated from equation (1) by dividing an optimum value of the transport problem (a minimum value of overall transport cost) by the number of flows and normalizing the quotient.

$$EMD = \frac{\min \sum_{i=1}^{32} \sum_{j=1}^{32} d_{ij} F_{ij}}{\sum_{i=1}^{32} \sum_{j=1}^{32} F_{ij}} \quad (1)$$

then $$\sum_{i=1}^{32} \sum_{j=1}^{32} F_{ij} = \sum_{i=1}^{32} r_{1\_i} \sum_{i=1}^{32} r_{2\_i}$$

EMD calculated by equation (1) is the distance between the color feature vector Cv1 and the color feature vector Cv2.

The distance of the frequency component vectors Tv is determined in the same way as the distance of the color feature vectors Cv.

Weight Wc may be determined for the distance of the color feature vector Cv and weight Wt may be determined for the distance of the frequency component vector Tv, and the final distance may be calculated using equation (2).

$$\text{distance} = EMD_{color} \times w_c + EMD_{texture} \times w_t (w_c + w_t = 1) \quad (2)$$

The user may determines weights Wc and Wt. The weight Wc and Wt may be fixed values. More specifically, each of the weights Wc and WT may be 0.5, and the final distance may be determined by averaging the distance of the color feature vector Cv and the distance of the frequency component vector Tv.

EMD (earth movers distance) used in the calculation of the vector distance is disclosed in the paper entitled "A Metric for Distributions with Applications to Image Databases," by Y. Rubner, C. Tomasi, and L. J. Guibas, Proceedings of the 1998 IEEE International Conference on Computer Vision, Bombay, India, January 1998, pp. 59-66. The vector distance calculation is not limited to this method. For example, Euclidean distance or Hausdorff distance may be used. Also techniques are disclosed in the paper entitled "Interactive Image Retrieval based on Wavelet Transform" authored by Michihiro KOBAYAKAWA and Mamoru HOSHI, Computer Science Magazine bit December issue, Dec. 1, 1999, published by Kyoritsu Shuppan, pp. 30-41, and the paper entitled "Design, Implementation and Performance Evaluation of Similar Image Retrieval System Based on Self-Organizing Feature Map" authored by K. OH, K. KANEKO, A. MAKINOUCHI, and A. UENO, Technical Report of the Institute of Electronics, Information and Communication Engineers (IECE) Vol. 10, No. 31, May 2, 2000, published by the IECE pp. 9-16. Such techniques may also be used.

In step S136, the retrieval unit 107 stores the distance with the image within the retrieval range associated therewith on the similar result database 113. For example, in step S136, the retrieval unit 107 stores the distance together with the content ID of the image within the retrieval range associated therewith on the similar result database 113.

Figure 27:
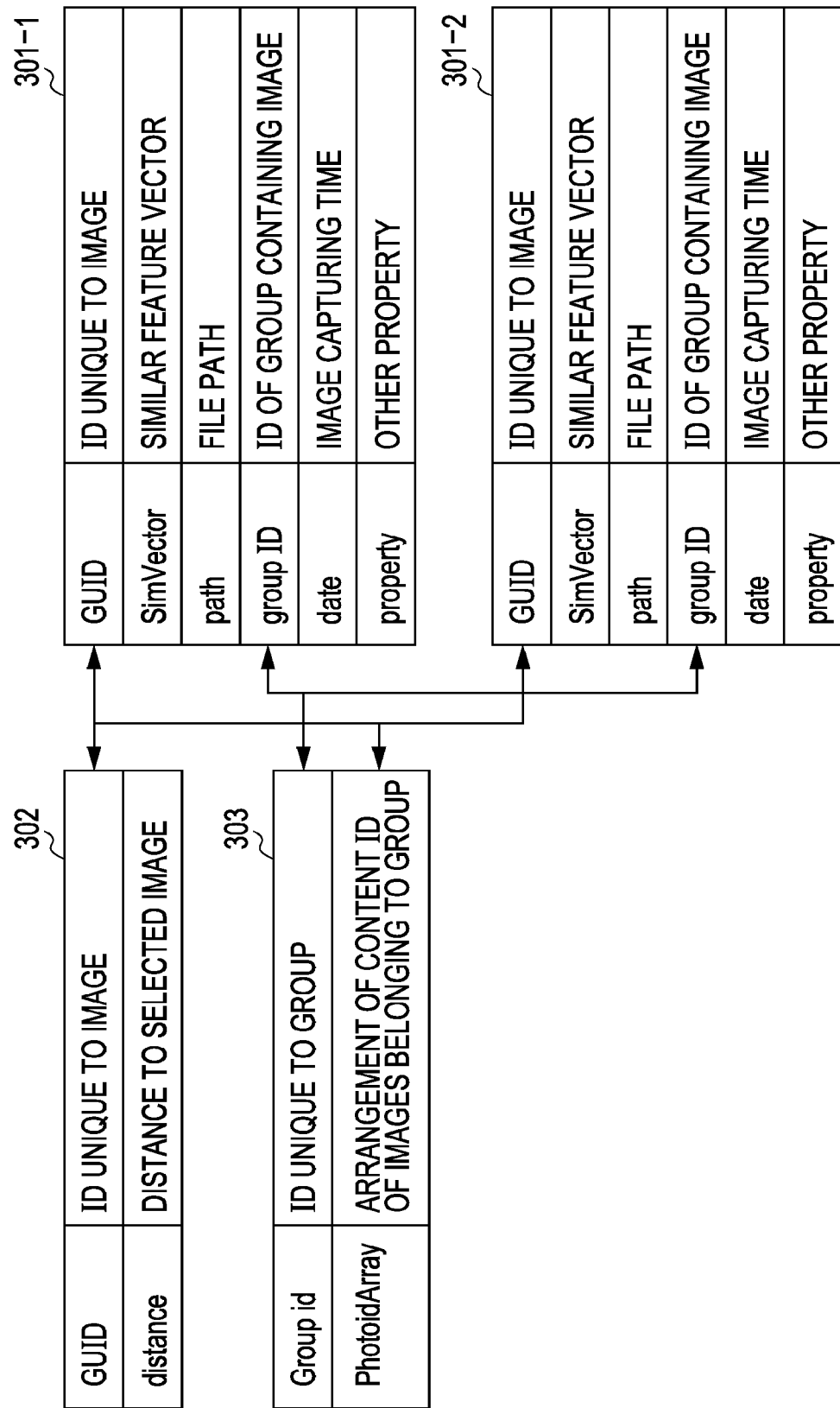
FIG. 27 illustrates the structure of the metadata and distance.

FIG. 27 illustrates the metadata stored on the content database 111 and the similar feature database 112 and the structure of the distance stored on the similar result database 113.

As shown in FIG. 27, a database record 301-1 corresponds to each of the content item 281-1 and the content item 281-1 and a database record 301-2 corresponds to each of the content item 281-2 and the content item 281-2.

More specifically, each of the database record 301-1 and the database record 301-2 includes a content ID, a similar feature vector, a path name and a file name of the master image 201, a group ID, image capturing time, and other properties.

A distance record 302, stored on the similar result database 113, contains the content ID and the distance from the selected image. A distance record 302 is associated with each of the database record 301-1 and the database record 301-2 using the content ID.

If there is no need for differentiating between the database record 301-1 and the database record 301-2, the database record is referred to as a database record 301.

The distance in the distance record 302 is a distance property.

A time group record 303, stored on the time group database 114, contains a group ID unique to a group (for identifying the group), and a content ID identifying the image belonging to the group identified by the group ID. The arrangement of the content ID in the time group record 303 is a PhotoIdArray property.

Figure 28:
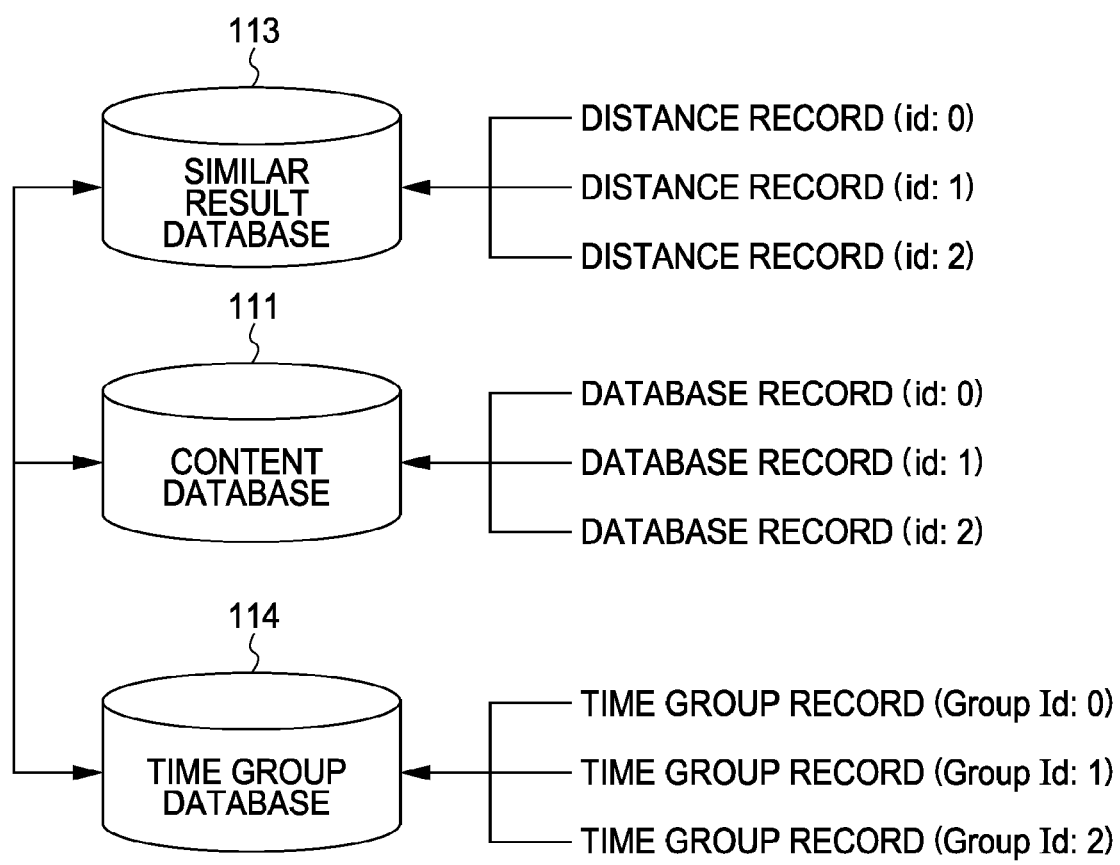
FIG. 28 illustrates an association of the content database, the similar feature database, and a time group database and respective records.

As shown in FIG. 28, the content database 111, the similar result database 113 and the time group database 114 are associated with the records thereof. One or a plurality of database records 301 is stored on each of the content database 111 and the similar feature database 112 (not shown), and one or a plurality of time group records 303 is stored on the time group database 114.

Returning to FIG. 26, in step S137, the retrieval unit 107 determines whether all images within the retrieval range are completed. If it is determined in step S137 that all images are not completed, processing returns to step S134. The retrieval unit 107 reads the similar feature vector corresponding to the content ID of a next contracted image 202 in the retrieval range, and repeats the above-described process.

If it is determined in step S137 that all images have been completed, processing proceeds to step S138. The retrieval unit 107 reads the distance associated with the image within the retrieval range from the similar feature database 112. In step S138, for example, the retrieval unit 107 reads the distance together with the content ID identifying the image within the retrieval range from the similar feature database 112.

In step S139, the retrieval unit 107 sorts the images within the retrieval range in accordance with the distance read in step S138, and ends the process. In step S139, for example, the retrieval unit 107 sorts the images within the retrieval area in the order of similarity by sorting the content IDs identifying the images within the retrieval range in accordance with the order of distance.

Returning back to FIG. 23, in step S104, the display controller 106 displays the contracted images 202 in the order of similarity on the monitor 40. More specifically, in step S104, the display controller 106 reads the contracted images 202 from the image storage 110, and displays the contracted images 202 in the order of similarity sorted in step S139 on the monitor 40 in step S139.

Figure 29:
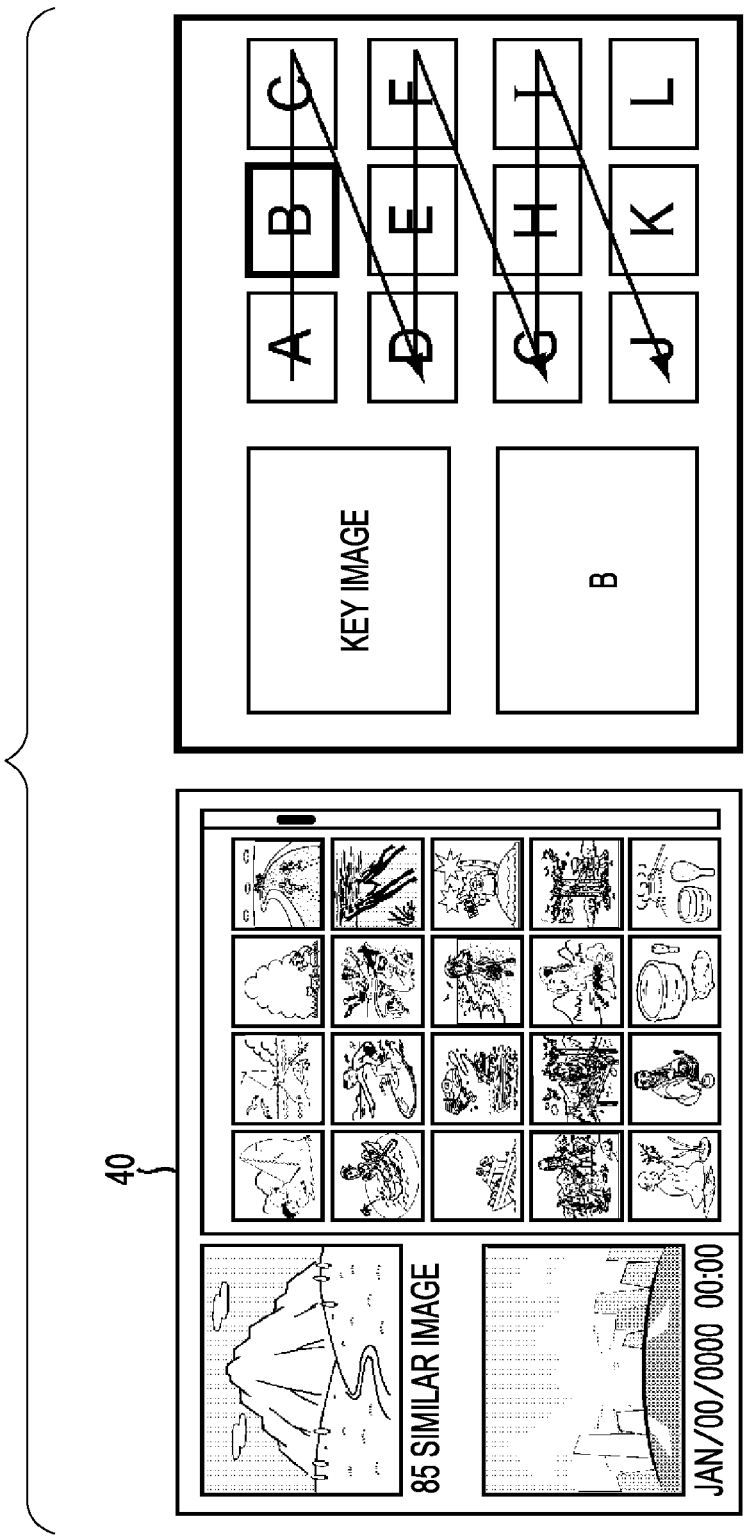
FIG. 29 illustrates a display of the order of similarity.

As shown in FIG. 29, the display controller 106 causes the monitor 40 to display, in the order of similarity, the contracted images 202 similar to the contracted image 202 selected in step S102. For example, the display controller 106 displays the contracted image 202 selected in step S102 (key image in FIG. 29) on the top left of the display area of the monitor 40, and then displays the contracted images 202 similar to the key image in the order of similarity in a raster scan sequence. Each small square on the right side of FIG. 29 represents one contracted image 202 and an alphabet in each square shows the order of similarity of the contracted image 202.

In step S105, the retrieval unit 107 selects one contracted image 202 from the contracted images 202 displayed on the monitor 40 in response to a signal from the input unit 49 operated by the user.

If the contracted image 202 labeled B is selected from among the contracted images 202 displayed on the monitor 40 in a raster scan format in the order of similarity as shown in FIG. 29, the selected contracted image 202 is highlighted or the outline of the selected contracted image 202 is enhanced. At the same time, the display controller 106 displays in an expanded view the selected contracted image 202 below the key image in the display area of the monitor 40.

In step S106, the retrieval unit 107 determines whether to cancel the selection in response to a signal from the input unit 49 operated by the user. If the retrieval unit 107 determines not to cancel, processing proceeds to step S107. The retrieval unit 107 determines whether to enter the selected contracted image 202.

If it is determined in step S107 that the selected contracted image 202 is to be entered, the retrieval unit 107 acquires a group ID of the contracted image 202 selected in step S105. More specifically, the retrieval unit 107 reads the metadata 261 identified by the content ID of the contracted image 202 selected in step S105, and extracts from the metadata 261 the group ID identifying the group to which the selected contracted image 202 belongs to, and acquires the group ID of the selected contracted image 202.

In step S109, the retrieval unit 107 reads from the image storage 110 the contracted image 202 belonging to the group identified by the acquired group ID. More specifically, the retrieval unit 107 retrieves the time group record 303 on the time group database 114 in accordance with the acquired group ID. The retrieval unit 107 reads from the time group database 114 a string of the content ID identifying the image belonging to the group identified by the group ID in accordance with the time group record 303 having the same group ID as the acquired group ID. The retrieval unit 107 reads from the image storage 110 the contracted image 202 identified by the content ID which is an element of the string of the read content ID. The retrieval unit 107 supplies the read contracted image 202 to the display controller 106.

In step S110, the display controller 106 causes the monitor 40 to display the read contracted images 202 in time series format. Processing thus ends.

In step S110, the display controller 106 may cause the monitor 40 to display the contracted images 202 in a clustered format or in a calendar format.

If it is determined in step S107 that the selected contracted image 202 is not to be entered, processing returns to step S104 to repeat step S104 and subsequent steps.

If it is determined in step S106 that the selection is to be canceled, processing returns to step S101 to repeat step S101 and subsequent steps.

In steps S102 and S105, the image selected state is maintained on the screen until a next image is selected. In steps S101, S104, and S110, the selected image is displayed on the with the outline thereof enhanced in a manner such that the user may recognize the selected image.

More specifically, a switching operation is performed in the displaying of the images between a time-series display format and a similarity order display format with the selected image state maintained.

In this way, images captured at the time close to the image capturing time of the image similar to a predetermined image can be immediately displayed. Images similar to the image captured at the time close the image capturing time of a predetermined image can be immediately displayed. Images can thus be traced back in order in the retrieval and retrieval either by image similarity criterion or close time criterion. By combining effectively a time-axis retrieval and a similarity retrieval, the digital still camera 11 having even a small screen size permits the user to view and retrieval images in terms of similarity and time, both of which are predominant factors in human memory.

The distance representing similarity indicates statistical similarity, and a retrieval failure can take place. An image that appears similar from the sense of human may escape retrieval. Even if such a retrieval failure takes place, images at close events are displayed in one view, and the user can still recognize an image that appears similar from the sense of human.

Pictures of events such as cherry blossom viewing, fireworks, barbecue parties may be captured every year. The pictures of such events may be accumulated. The images can be immediately rearranged in time series order after performing similarity retrieval. The images of similar events displayed in the time series order may serve as an album to help the user to recall the events.

The digital still camera 11 may retrieve the master image 201 in the process of a flowchart of FIG. 23.

Figure 30:
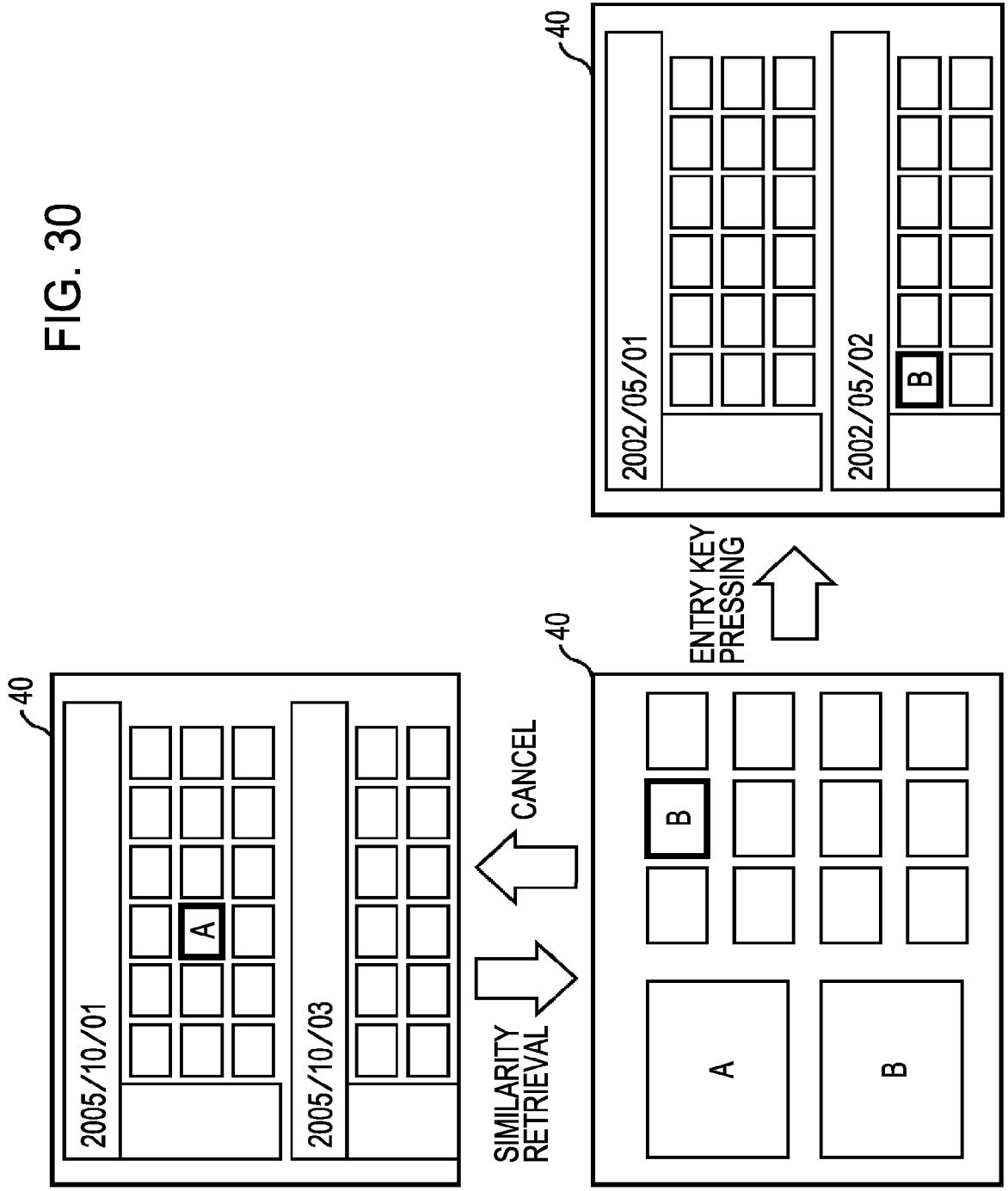
FIG. 30 illustrates switching between the display of the order of similarity and the display of time series.

In the retrieval process illustrated in the flowchart of FIG. 23, the contracted images 202 are displayed by group in the time series order on the monitor 40 as shown in the upper portion FIG. 30. If the contracted image 202 labeled the letter A is selected from the contracted images 202 displayed in time series format, contracted images 202 similar to the contracted image 202 labeled the letter A is retrieved and displayed in the order of similarity on the monitor 40.

The monitor 40 displays in an enlarged view the key image, i.e., the contracted image 202 labeled the letter A.

If the contracted image 202 labeled the letter B is selected from the contracted images 202 displayed in the order of similarity, the monitor 40 displays in an enlarged view the contracted image 202 labeled the letter B as the key image.

The contracted images 202 similar to the contracted image 202 labeled the letter A is displayed in the order of similarity on the monitor 40. If the selection of the contracted image 202 labeled the letter A is canceled, the contracted images 202 are displayed back in the time series format.

If an entry key is selected when the contracted image 202 labeled the letter B is selected from among the contracted images 202 displayed in the order of similarity, the contracted images 202 belonging to the group of the contracted image 202 labeled the letter B are displayed in the time series format. In this case, the contracted image 202 labeled the letter B is displayed with the outline thereof enhanced.

The contracted images 202 may be sorted into groups by image capturing date. On a per group basis, the monitor 40 displays the contracted images 202 in the time series format having date close to the date of image capture of the contracted image 202 labeled the letter B.

Figure 31:
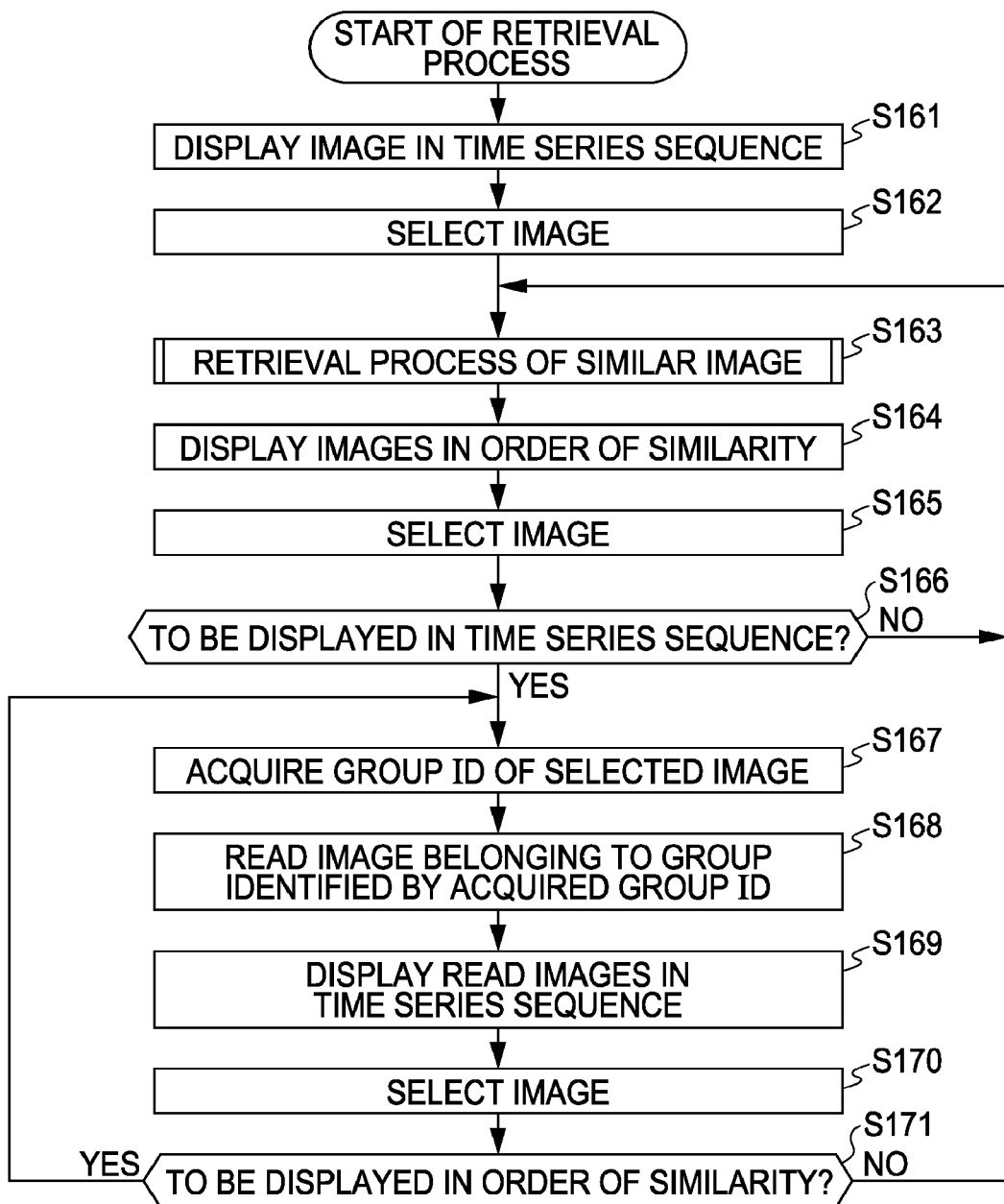
FIG. 31 is a flowchart illustrating the retrieval process.

The retrieval process of the server 13 is described below. FIG. 31 is a flowchart illustrating the retrieval process of the server 13. In step S161, the display controller 136 in the server 13 causes the output unit 77 as a display unit to display the master images 201 in the time series format.

More specifically, in step S161, the image storage 140 supplies to the display controller 136 the master images 201 within the retrieval range responsive to a signal from the input unit 76 operated by the user, from among the master images 201 recorded thereon. The content database 141 supplies to the display controller 136 the metadata 261 at the image capturing time out of the metadata 261 of the master image 201 falling within the predetermined range supplied to the display controller 136. The display controller 136 causes the output unit 77 to display the master images 201 in the time series sequence of image capture in accordance with the image capturing time.

Figure 32:
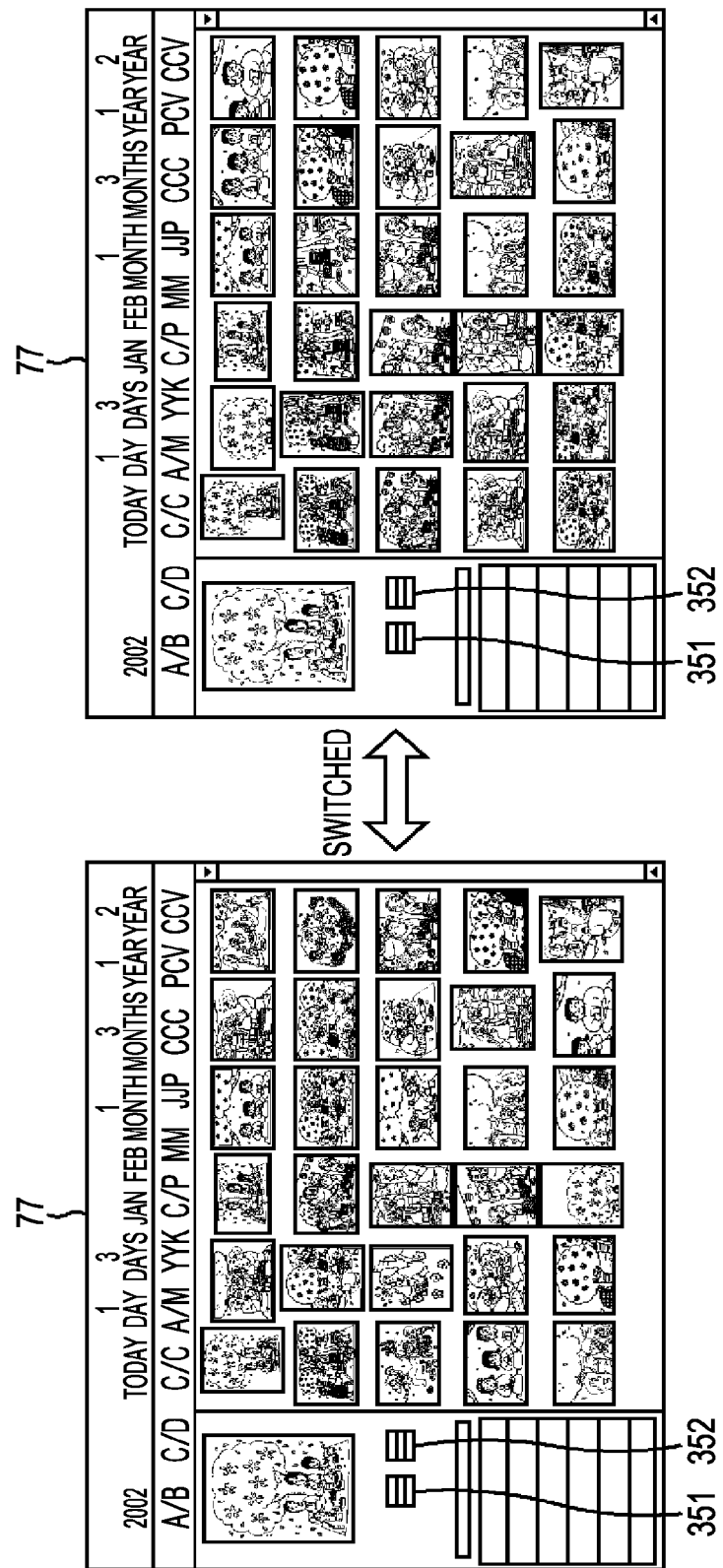
FIG. 32 illustrates switching between the display of the order of similarity and the display of time series.

For example, as shown in the right portion of FIG. 32, the display controller 136 causes the output unit 77 to display the contracted images 202 in the image capture time sequence (i.e., along time axis). The display controller 136 causes the output unit 77 to display the master images 201 in the order of capture on a per group basis.

In step S162, the retrieval unit 137 selects one of the master images 201 displayed on the output unit 77 in response to a signal from the input unit 76 operated by the user.

In step S163, the retrieval unit 137 performs the retrieval process of similar images. The retrieval process in step S163 is performed by the retrieval unit 137 instead of the retrieval unit 107. The rest of the retrieval process in step S163 remains unchanged from the process discussed with reference to FIG. 26, and the discussion thereof is omitted herein.

In step S164, the display controller 136 causes the output unit 77 to display the master image 201 in the order of similarity. More specifically, in step S164, the display controller 136 causes the output unit 77 to display the master images 201 in the order of sorted similarity.

For example, the display controller 136 causes the output unit 77 to display the master images 201 similar to the master image 201 selected in step S162 in the order of similarity as shown in the left portion of FIG. 32.

In step S165, the retrieval unit 137 selects one master image 201 from the master images 201 displayed on the output unit 77 in response to a signal from the input unit 49 operated by the user.

In step S166, the retrieval unit 137 determines in response to a signal from the communication unit 47 operated by the user whether to display the images in the time series format. For example, the retrieval unit 137 determines whether to display the images in the time series order in response to a signal from the input unit 76 input when the user selects one of a switch button 351 and a switch button 352 displayed on the output unit 77.

When the switch button 351 on the output unit 77 to cause the images to be displayed in the time series format is selected, the time series display is determined to be performed in step S166. Processing proceeds to step S167.

In step S167, the retrieval unit 137 acquires the group ID of the selected master image 201 from the content database 141. More specifically, the retrieval unit 137 reads from the content database 141 the metadata 261 identified by the content ID of the selected master image 201, and extracts from the read metadata 261 the group ID identifying the group of the selected master image 201. The retrieval unit 137 thus acquires the group ID of the selected master image 201.

In step S168, the retrieval unit 137 reads from the image storage 140 the master image 201 belonging to the group identified by the acquired group ID. The retrieval unit 137 retrieves the time group record 303 of the time group database 144 in accordance with the acquired group ID. The retrieval unit 137 reads from the time group database 144 the string of the content ID identifying the image belonging to the group identified by the group ID in accordance with the time group record 303 containing the same group ID as the acquired group ID. The retrieval unit 137 reads from the image storage 140 the master image 201 identified by the content ID as an element in the string of the read group ID. The retrieval unit 137 supplies the read master image 201 to the display controller 136.

In step S169, the display controller 136 causes the output unit 77 to display the read master image 201. More specifically, in step S169, the display controller 136 causes the output unit 77 to display the master images 201 in the time series format.

In step S170, the retrieval unit 137 selects one master image 201 from among the contracted images 202 displayed on the output unit 77 in response to a signal from the input unit 76 operated by the user.

In step S171, the retrieval unit 137 determines whether to display the images in the time series format in response to a signal from the input unit 49 operated by the user. For example, the retrieval unit 137 determines whether to display the images in the time series format in response to the signal from the input unit 76 input when one of the switch button 351 and the switch button 352 displayed on the output unit 77 is selected by the user.

If the switch button 352 on the output unit 77 to cause the images to be displayed in the order of similarity is selected by the user, the retrieval unit 137 determines to display the images in the order of similarity in step S171. If it is determined in step S171 that the images are to be displayed in the time series format, processing returns to step S163.

If the switch button 351 on the output unit 77 to cause the images to be displayed in the time series order is selected by the user, the retrieval unit 137 determines to not display the images in the order of similarity in step S171. Processing returns to step S167 to repeat step S167 and subsequent steps.

If the switch button 352 is selected in step S166, the images are not to be displayed in the time series format, and processing returns to step S163 to repeat step S163 and subsequent steps.

Switching operation between the similarity order display and the time series order display is freely performed in response to the selection of the switch button 351 and the switch button 352 displayed on the output unit 77.

The relation level extraction process of the server 13 is described below.

The digital still camera 11, the cellular phone 12, and the server 13 retrieve images using the color name and the relation level of the color name as the feature of the image. The server 13 extracts the relation level of a predetermined color name from the image as one feature of the image.

The relation level of the color name means the degree of association under which the image is thought of in response to the particular color name. In other words, the relation level refers to the ratio of color in which the image is thought to have a color of a particular color name.

The color names are red, blue, yellow, white, black, green, etc.

Figure 33:
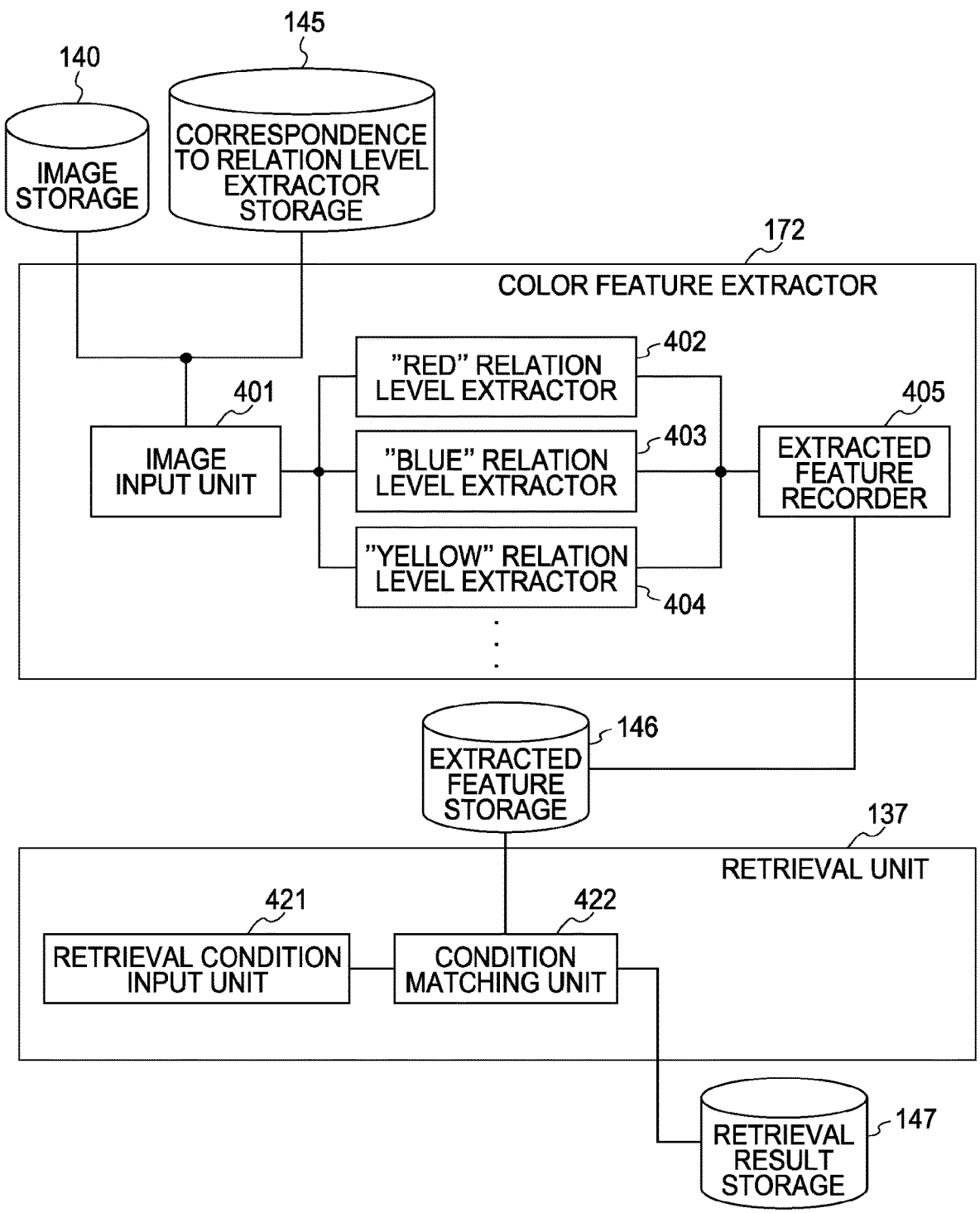
FIG. 33 is a block diagram illustrating a color feature extractor.

FIG. 33 is a block diagram illustrating the structure of the color feature extractor 172 extracting the relation level of the color name. The color feature extractor 172 includes an image input unit 401, a red relation level extractor 402, a blue relation level extractor 403, a yellow relation level extractor 404, and an extracted feature recorder 405.

The red relation level extractor 402, the blue relation level extractor 403, and the yellow relation level extractor 404 are described for exemplary purposes only, and any number of relation level extractors for extracting relation levels of any colors may be employed. More specifically, a relation level extractor is prepared on a per color name basis.

In the example discussed below, the red relation level extractor 402, the blue relation level extractor 403 and the yellow relation level extractor 404 are incorporated.

The image input unit 401 acquires from the image storage 140 the master image 201 from which the relation level is to be extracted. The image input unit 401 acquires from the correspondence to relation level extractor storage 145 the color name and correspondence information indicating mapping to each of the red relation level extractor 402, the blue relation level extractor 403, and the yellow relation level extractor 404.

As shown in FIG. 34, the correspondence information recorded on the correspondence to relation level extractor storage 145 contains the color name and information identifying the red relation level extractor 402, the blue relation level extractor 403, and the yellow relation level extractor 404 from which the relation level of the color name is extracted. For example, as shown in FIG. 34, the color name "red" corresponds to the red relation level extractor 402, the color name "blue" corresponds to the blue relation level extractor 403, and the color name "yellow" corresponds to the yellow relation level extractor 404.

Based on the correspondence information, the image input unit 401 supplies the master image 201 acquired from the image storage 140 to the image input unit 401, the blue relation level extractor 403, and the yellow relation level extractor 404.

The red relation level extractor 402 extracts from the master image 201 supplied from the image input unit 401 the relation level indicating the degree of association under which the master image 201 is thought of in response to the color name of red. The red relation level extractor 402 then supplies to the extracted feature recorder 405 the relation level, extracted from the master image 201, indicating the degree of association responsive to the color name of red.

The blue relation level extractor 403 extracts from the master image 201 supplied from the image input unit 401 the relation level indicating the degree of association under which the master image 201 is thought of in response to the color name of blue. The blue relation level extractor 403 then supplies to the extracted feature recorder 405 the relation level, extracted from the master image 201, indicating the degree of association responsive to the color name of blue.

The yellow relation level extractor 404 extracts from the master image 201 supplied from the image input unit 401 the relation level indicating the degree of association under which the master image 201 is thought of in response to the color name of yellow. The yellow relation level extractor 404 then supplies to the extracted feature recorder 405 the relation level, extracted from the master image 201, indicating the degree of association responsive to the color name of yellow.

The extracted feature recorder 405 associates the relation level indicating the degree of association responsive to the color name of red, the relation level indicating the degree of association responsive to the color name of blue, and the relation level indicating the degree of association responsive to the color name of yellow respectively from the red relation level extractor 402, the blue relation level extractor 403, and the yellow relation level extractor 404 with the master image 201, and then stores the resulting relation levels on the extracted feature storage 146.

As shown in FIG. 35, the extracted feature storage 146 stores, together with the content ID identifying the master image 201, the relation level indicating the degree of association responsive to the color name of red, the relation level indicating the degree of association responsive to the color name of blue, and the relation level indicating the degree of association responsive to the color name of yellow.

As described above, the image input unit 401 inputs the master image 201 recorded on the image storage 140. Not only the master image 201 but also the contracted image 202 or the reduced color image 221 may be input and processed. Instead of the images, the color histogram associated with the image from which each relation level is to be extracted may be input by the image input unit 401. The red relation level extractor 402, the blue relation level extractor 403 and the yellow relation level extractor 404 may then extract the relation level thereof from the input histograms.

FIG. 35 illustrates a logical structure of the relation level recorded on the extracted feature storage 146. As shown, in association with a content ID of 000, the extracted feature storage 146 stores a relation level of 0.80 indicating the degree of association responsive to the color name of red, a relation level of 0.00 indicating the degree of association responsive to the color name of blue, and a relation level of 0.10 indicating the degree of association responsive to the color name of yellow, each extracted from the master image 201 identified by a content ID of 000. In association with a content ID of 001, the extracted feature storage 146 stores a relation level of 0.00 indicating the degree of association responsive to the color name of red, a relation level of 0.25 indicating the degree of association responsive to the color name of blue, and a relation level of 0.20 indicating the degree of association responsive to the color name of yellow, each extracted from the master image 201 identified by a content ID of 001. Furthermore, in association with a content ID of 002, the extracted feature storage 146 stores a relation level of 0.15 indicating the degree of association responsive to the color name of red, a relation level of 0.05 indicating the degree of association responsive to the color name of blue, and a relation level of 0.00 indicating the degree of association responsive to the color name of yellow, each extracted from the master image 201 identified by a content ID of 002.

The extracted feature recorder 405 stores, as the metadata 261, the relation level indicating the degree of association responsive to the color name of red, the relation level indicating the degree of association responsive to the color name of blue, and the relation level indicating the degree of association responsive to the color name of yellow respectively supplied from the red relation level extractor 402, the blue relation level extractor 403, and the yellow relation level extractor 404, with the master image 201 associated therewith on the similar feature database 142.

The relation level may be embedded in a predetermined area of the master image 201 as the EXIF data.

The retrieval unit 137 retrieves the color name and the relation level of the color name as the feature of the image. In this case, the retrieval unit 137 may include a retrieval condition input unit 421 and a condition matching unit 422.

The retrieval condition input unit 421 receives a retrieval condition of the relation level in response to a signal from the input unit 76 operated by the user. The retrieval condition input unit 421 supplies the retrieval condition of the relation level to the condition matching unit 422.

The condition matching unit 422 matches the retrieval condition supplied from the retrieval condition input unit 421 against the relation level recorded on the extracted feature storage 146. The condition matching unit 422 stores the match result, namely, the content ID corresponding to the relation level satisfying the retrieval condition to the retrieval result storage 147.

Figure 36:
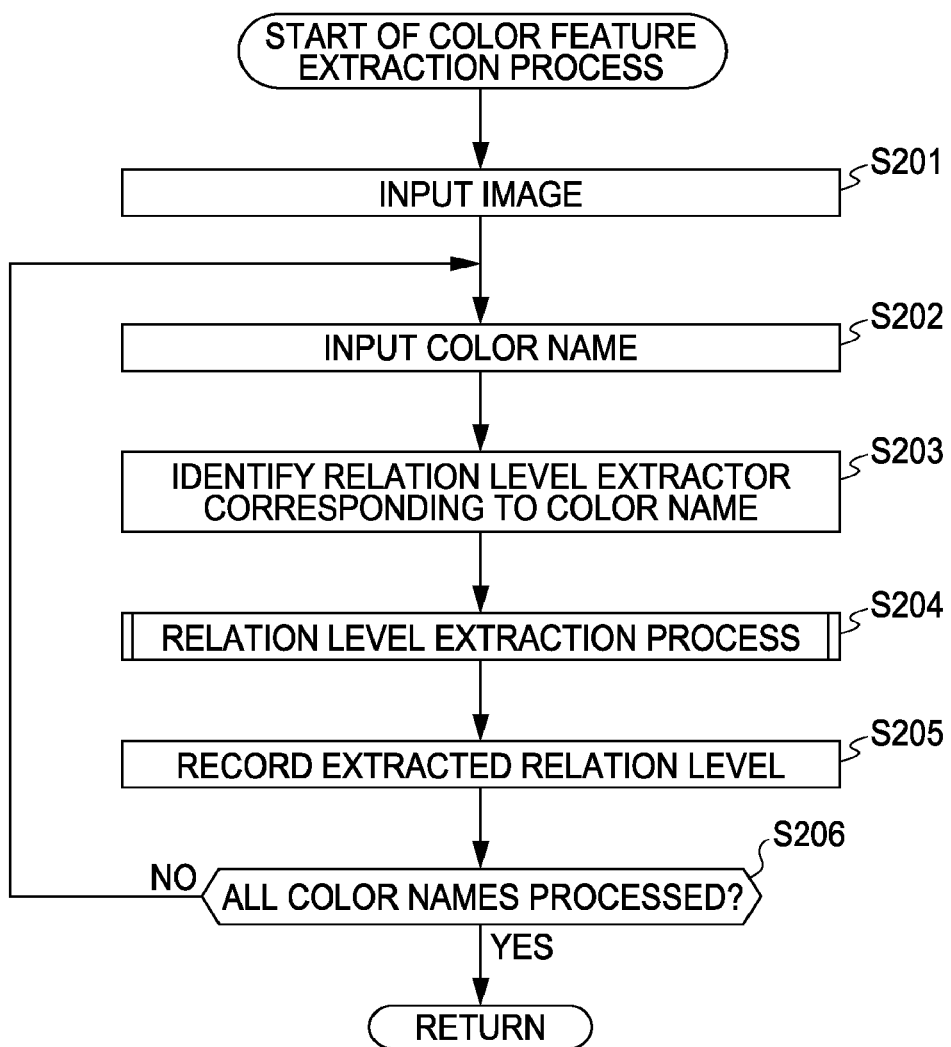
FIG. 36 is a flowchart illustrating in detail a color feature extraction process.

FIG. 36 is a flowchart illustrating in detail a color feature extraction process corresponding to step S43. In step S201, the image input unit 401 receives from the image storage 140 the master image 201 as a target image from which the relation level is to be extracted. The image input unit 401 also receives the correspondence information from the correspondence to relation level extractor storage 145.

In step S202, the image input unit 401 receives the color name. In step S203, in response to the correspondence information, the image input unit 401 identifies which of the red relation level extractor 402, the blue relation level extractor 403, and the yellow relation level extractor 404 corresponds to the input color name.

For example, if the color name of red is input in step S202, the image input unit 401 identifies the red relation level extractor 402 in response to the correspondence information in step S203.

The image input unit 401 supplies the input master image 201 to any identified one of the red relation level extractor 402, the blue relation level extractor 403, and the yellow relation level extractor 404.

In step S204, one of the red relation level extractor 402, the blue relation level extractor 403, and the yellow relation level extractor 404 identified in step S203 performs a relation level extraction process. The relation level extraction process will be described in detail later.

The extracted relation level is supplied to the extracted feature recorder 405.

In step S205, the extracted feature recorder 405 stores on the extracted feature storage 146 the extracted relation level as a color feature vector in association with the master image 201 as a target image from which the relation level is to be extracted.

In step S206, the image input unit 401 determines whether the relation level has been extracted from the master image 201 of all color names. If all color names have not been completed, processing returns to step S202 to input a next color name and to repeat subsequent steps.

If it is determined in step S206 that the current color name is the final one, i.e., that the relation levels have been extracted from the master image 201 in all color names, processing ends.

Figure 37:
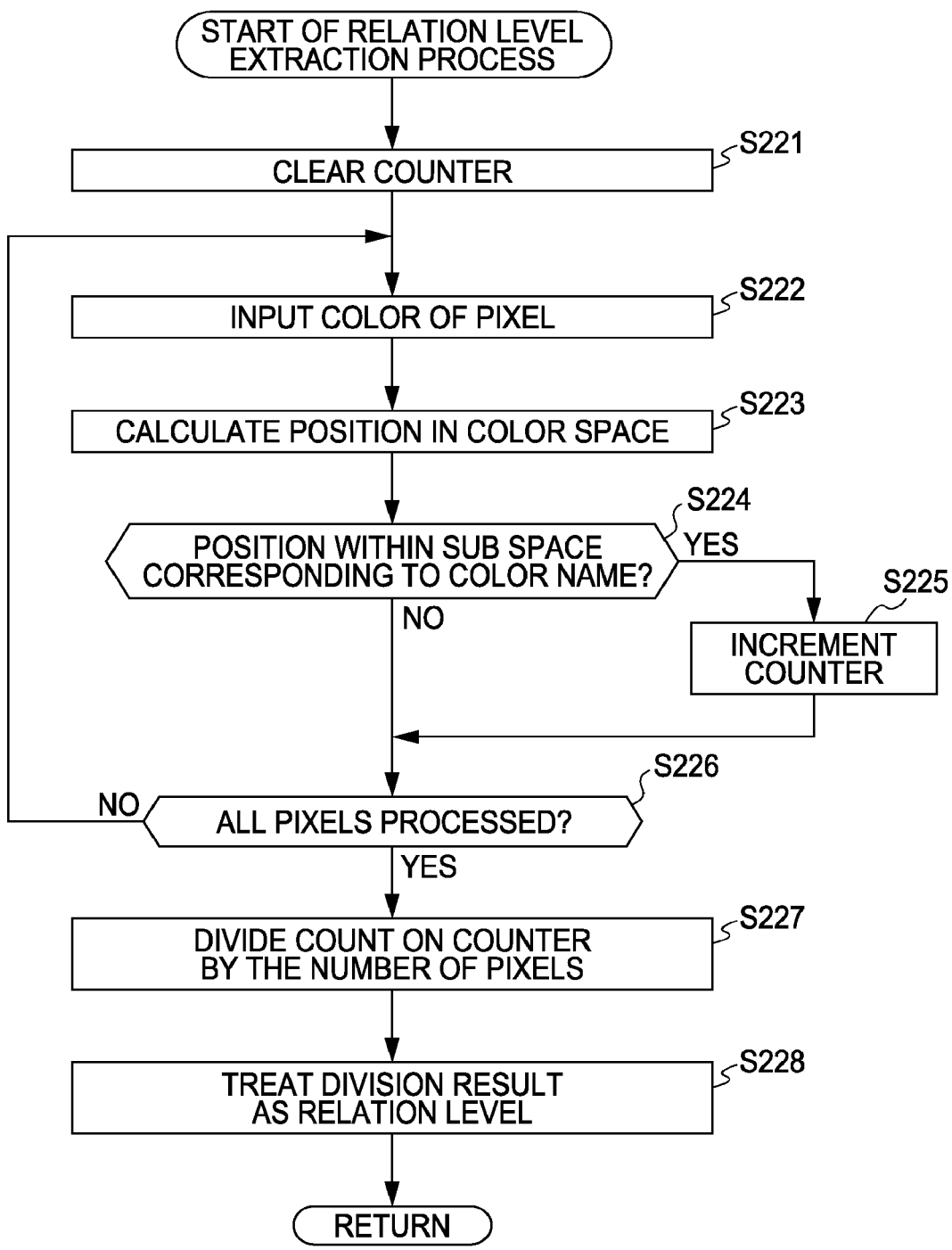
FIG. 37 is a flowchart illustrating in detail a relation level extraction process.
Figure 38:
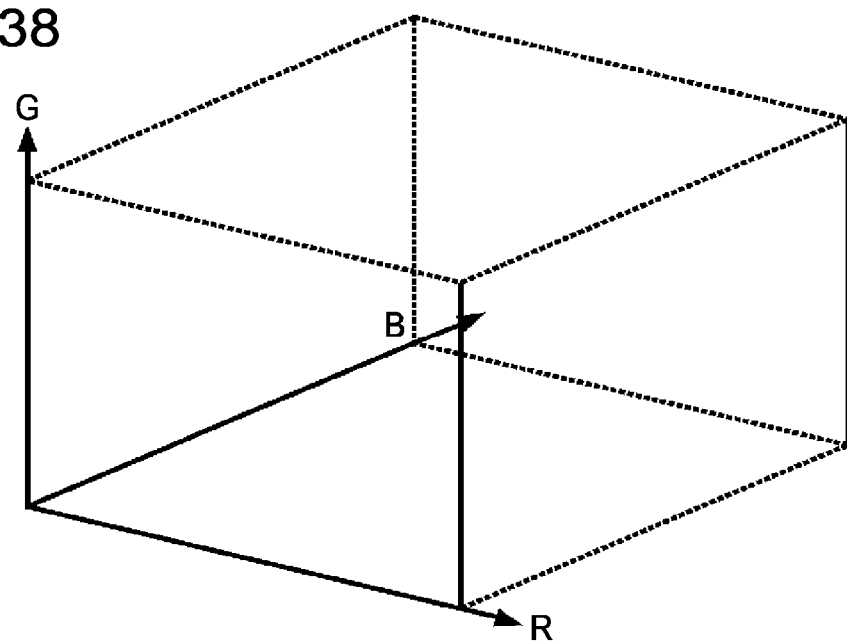
FIG. 38 illustrates an RGB color space.

FIG. 37 is a flowchart illustrating in detail the relation level extraction process corresponding to step S204 of FIG. 36 performed when the red relation level extractor 402 is identified in step S203.

In step S221, the red relation level extractor 402 clears an internal counter thereof. In step S222 to be executed first, the red relation level extractor 402 receives the color of a first pixel, namely, the pixel value of the first pixel of the master image 201. In step S223, the red relation level extractor 402 calculates a position of the color of the pixel in the color space.

In step S224, the red relation level extractor 402 determines whether the calculated position in the color space is within a sub space corresponding to the color name of red.

The position in the color space calculated for the color of a pixel is described below.

For example, the pixel value of each pixel in the master image 201 is represented by RGB. The pixel value is composed of a R value, a G value, and a B value. An RGB space is defined by mutually perpendicular three axes, namely, an R axis, a G axis, and a B axis. A single pixel value determines a single position in the RGB color space.

In the RGB color space, describing a position of a color perceived by the human as a color of a color name by a single area is difficult.

Figure 39:
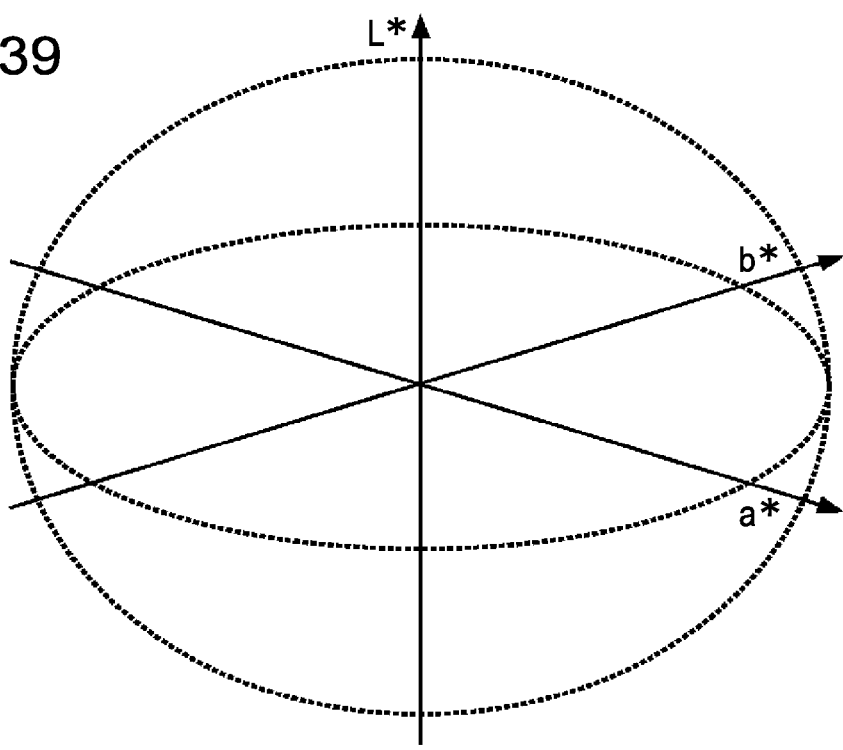
FIG. 39 illustrates a L*a*b space.

Describing a color of a pixel by a position in a L*a*b* space is now contemplated. As shown in FIG. 39, the L*a*b* space is defined mutually perpendicular three axes, namely, L* axis, a* axis, and b* axis. In the L*a*b* space, the larger the value L* in the L* axis, the higher the luminance becomes, and the lower the value L* in the L* axis, the lower the luminance becomes. Given a constant L* value, the color saturation becomes lower as it becomes closer to the L* axis.

A single pixel value determines a single position in the L*a*b* space.

In the L*a*b* space, a position of a color perceived by the human as a color of a color name is described by a single area. An area containing a position of a color perceived by the human as a color of a predetermined color name is referred to as a sub space. The sub space is an area having a breadth in the L*a*b* space.

Examples of sub space for white and black are described below.

Figure 40:
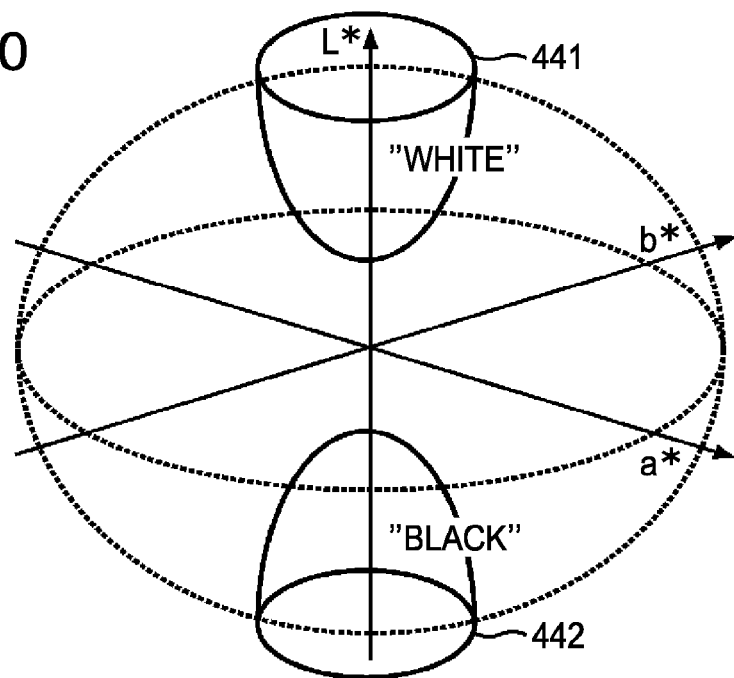
FIG. 40 illustrates a sub space of white and a sub space of black.
Figure 41:
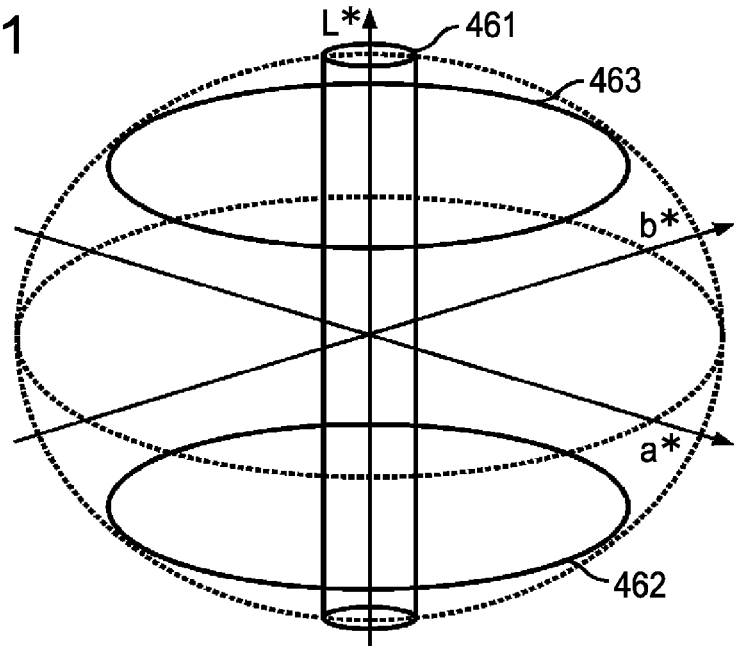
FIG. 41 illustrates a color saturation boundary and a luminance boundary.

FIG. 40 illustrates a white sub space 441 and a black sub space 442. The white sub space 441 is part of an elliptical body having one axis collinear with the L* axis. The graphical center of the elliptical body is located at the top position of the L*a*b* space (the position giving the maximum value of the L* axis). The white sub space 441 is the part of the internal space of the elliptical body which is also commonly shared by the L*a*b* space. The white sub space 441 provides low color saturation while providing high luminance. Color represented at a position within the white sub space 441 is perceived by the human as white.

The black sub space 442 is part of an elliptical body with one axis thereof collinear with the L* axis. The graphical center of the elliptical body is located at the bottom position of the L*a*b* space (the position giving the minimum value of the L* axis). The black sub space 442 is the part of the internal space of the elliptical body which is also commonly shared by the L*a*b* space. The black sub space 442 provides low color saturation while providing low luminance. Color represented at a position within the black sub space 442 is perceived by the human as white.

The sub spaces for red, yellow, green, and blue are described below.

Since red, yellow, green and blue are chromatic colors, space inside a color saturation boundary 461, space below a luminance lower limit boundary 462, space above a luminance upper limit boundary 463 are excluded from the L*a*b* space. The space inside the color saturation boundary 461 provides a low color saturation, and any color represented by a position within that space cannot be perceived by the human as red, yellow, green or blue.

The space below the luminance lower limit boundary 462 provides a low luminance, and any color represented by a position within that space cannot be perceived by the human as red, yellow, green or blue.

The space above the luminance upper limit boundary 463 provides a high luminance, and any color represented by a position within that space cannot be perceived by the human as red, yellow, green or blue.

Any color within the L*a*b* space excluding the space inside the color saturation boundary 461, the space below the luminance lower limit boundary 462, the space above the luminance upper limit boundary 463 is perceived by the human as red, yellow, green or blue.

Figure 42:
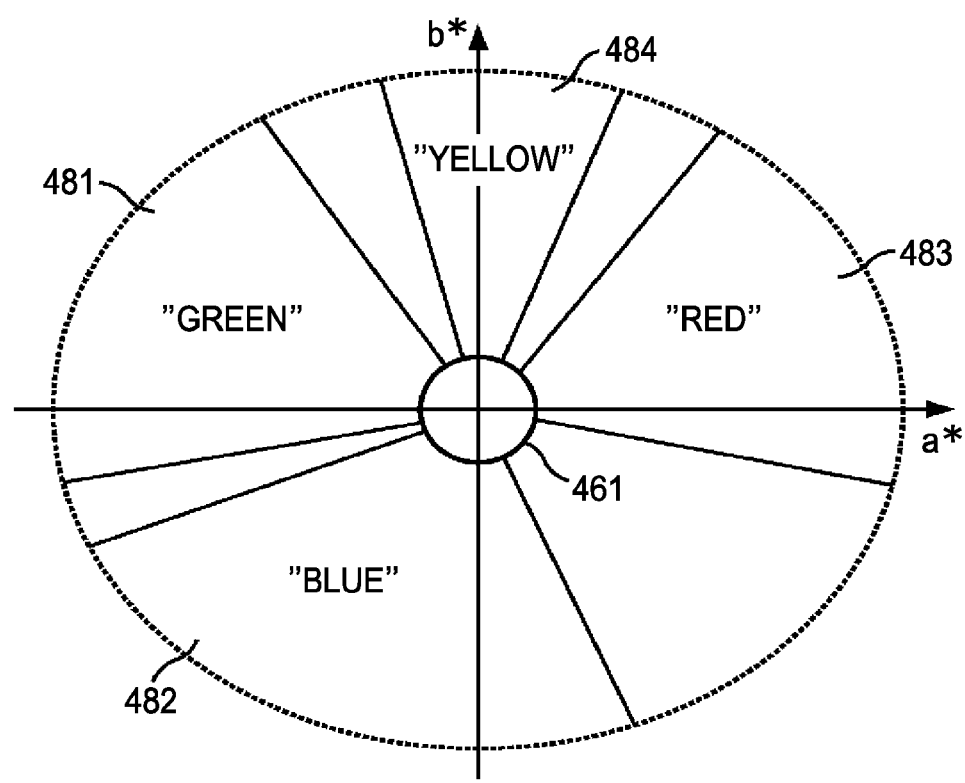
FIG. 42 illustrates sub spaces of green, blue, red, and yellow.

The space of the L*a*b* space excluding the space inside the color saturation boundary 461, the space below the luminance lower limit boundary 462, the space above the luminance upper limit boundary 463 is segmented by radially extending boundaries from the L* axis perpendicular to the plane formed by the a* axis and the b* axis as shown in FIG. 42. For example, a green sub space 481 is a space along the a* axis and surrounded by a boundary extending from the L* axis above a negative portion of the a* axis and a boundary extending from the L* axis above the negative portion of the a* axis, if the L*a*b* space is viewed from above a position positive portion of the L* axis. A color represented by a position within the green sub space 481 is perceived by the human as green.

If the L*a*b* space is viewed from above the positive portion of the L* axis, a blue sub space 482 is a space along the b* axis and surrounded by a boundary extending from the L* axis to the right of a negative portion of the b* axis and a boundary extending from the L* axis to the left of the negative portion of the b* axis. A color represented by a position within the blue sub space 482 is perceived by the human as blue.

If the L*a*b* space is viewed from above the positive portion of the L* axis, a red sub space 483 is a space along the a* axis and surrounded by a boundary extending above a positive portion of the a* axis and a boundary extending below the position portion of the a* axis. A color represented by a position within the red sub space 483 is perceived by the human as red. If the L*a*b* space is viewed from above the positive portion of the L* axis, a yellow sub space 484 is a space along the b* axis and surrounded by a boundary extending to the right of a positive portion of the b* axis and a boundary extending to the left of the positive portion of the b* axis. A color represented by a position within the yellow sub space 484 is perceived by the human as yellow.

In step S223, the red relation level extractor 402 calculates a position within the L*a*b* space corresponding to the color of the pixel. In step S224, the red relation level extractor 402 determines whether the calculated position within the L*a*b* space falls within the blue sub space 482 corresponding to the color name of red. More specifically, in step S224, the red relation level extractor 402 determines whether the color of the pixel is the one that can be perceived by the human as red.

If it is determined in step S224 that the calculated position within the L*a*b* space is within the red sub space 483 corresponding to the color name of red, the color of the pixel is the one that can be perceived by the human. processing proceeds to step S225. The red relation level extractor 402 increments a counter by 1 and then proceeds to step 226.

If it is determined in step S224 that the calculated position in the L*a*b* space is not within the red sub space 483 corresponding to the color name of red, the color of the pixel is not a color perceived by the human as red. Processing proceeds to step S226 skipping step S225, namely, without incrementing the counter.

In step S226, the red relation level extractor 402 determines whether all pixels in the master image 201 have bee processed. If it is determined in step S226 that all pixels in the master image 201 have not been processed, processing returns to step S222. The color, namely, the pixel value of a next one of the pixels in the master image 201 is input and then the above-described process is repeated.

If it is determined in step S226 that all pixels in the master image 201 have been processed, processing proceeds to step S227. The red relation level extractor 402 divides the count of the counter by the number of pixels of the master image 201. In this way, the ratio of the color determined to be red in the master image 201 is calculated.

In step S228, the red relation level extractor 402 treats the division result as the relation level of red, and supplies the relation level of red to the extracted feature recorder 405, thereby completing the process thereof.

The sub space of the L*a*b* space has been discussed. The present invention is not limited to the L*a*b* space. A color space in which the color of a color name is described using a space may be assumed. Using such a color space, the relation level may be determined based on a sub space in the color space.

In the relation level extraction process of FIG. 37, a binary-value determination process as to whether or not the color of each pixel falls within the sub space is performed. Whether the color of each pixel is in the close vicinity to the center of the sub space or close to the outer perimeter of the sub space may be accounted for in the relation level.

The relation level extraction process in that case is described below.

Figure 43:
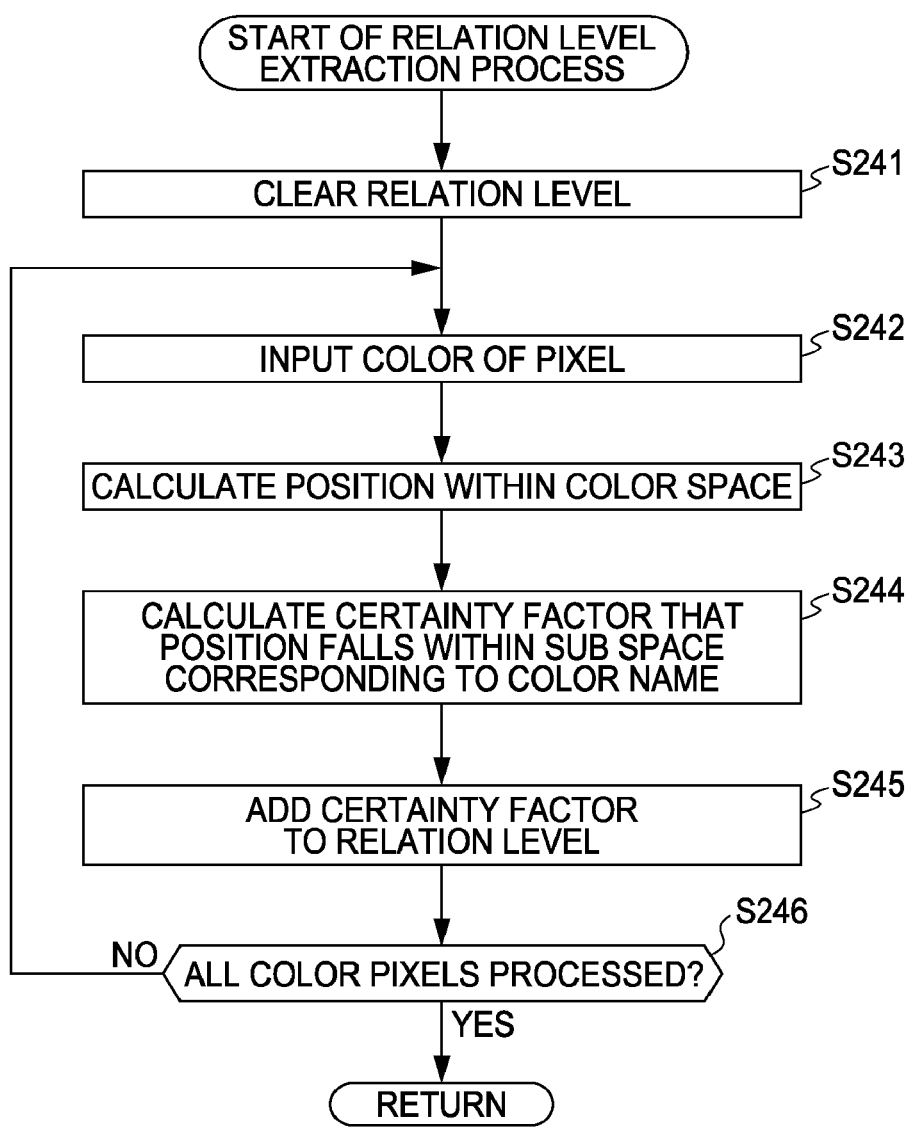
FIG. 43 is a flowchart illustrating in detail another relation level extraction process.

FIG. 43 is a flowchart illustrating in detail another relation level extraction process in step S204 of FIG. 36 performed when the red relation level extractor 402 is identified in step S203. In step S241, the red relation level extractor 402 clears a stored relation level. In step S242 to be performed for the first time, the red relation level extractor 402 receives the color, namely, the pixel value of a first pixel from among the pixels in the master image 201. In step S243, the red relation level extractor 402 calculates a position corresponding to the color of the pixel in the color space.

In step S224, the red relation level extractor 402 calculates the certainty factor that the calculated position in the color space falls within the sub space corresponding to the color name. More specifically, in step S224, the red relation level extractor 402 calculates the certainty factor that the calculated position in the color space falls within the sub space 483 corresponding to the color name of red.

The certainty factor is the degree of certainty that indicates whether the color of each pixel is in the close vicinity to the center of the sub space or close to the outer perimeter of the sub space, and continuously decreases from 0 to 1 as the calculated position is apart from the center of the sub space outward.

For example, in step S224, the red relation level extractor 402 results in a certainty factor close to 1 when the calculated position is close to the center of the red sub space 483, and results in a certainty factor close to 0 when the calculated position is close to the outer perimeter of the red sub space 483.

In step S245, the red relation level extractor 402 adds the certainty factor to the relation level. In step S246, the red relation level extractor 402 determines whether the current pixel is the final one, i.e., whether all pixels in the master image 201 have been processed. If it is determined in step S245 that the pixel is not the final one, processing returns to step S242. The color, namely, the pixel value of a next one of the pixels in the master image 201 is input and the above-described process is repeated.

If it is determined in step S226 that the current pixel is the final one, i.e., that all pixels in the master image 201 have been processed, the red relation level extractor 402 supplies the relation level of red to the extracted feature recorder 405, and completes the process thereof.

If the relation level is calculated based on the certainty factor, the resulting relation level becomes closer to the sense of human. In particular, when the image contains a large amount of color closer to the boundary of the sub space, a more reliable relation level results.

The process in step S224 in the relation level extraction process discussed with reference to FIG. 37 is a binary classification process as to whether or not the color of the pixel is determined to be a color of a particular color name, and may be replaced with a variety of pattern recognition techniques.

The relation level extraction process using such a technique is described below.

Figure 44:
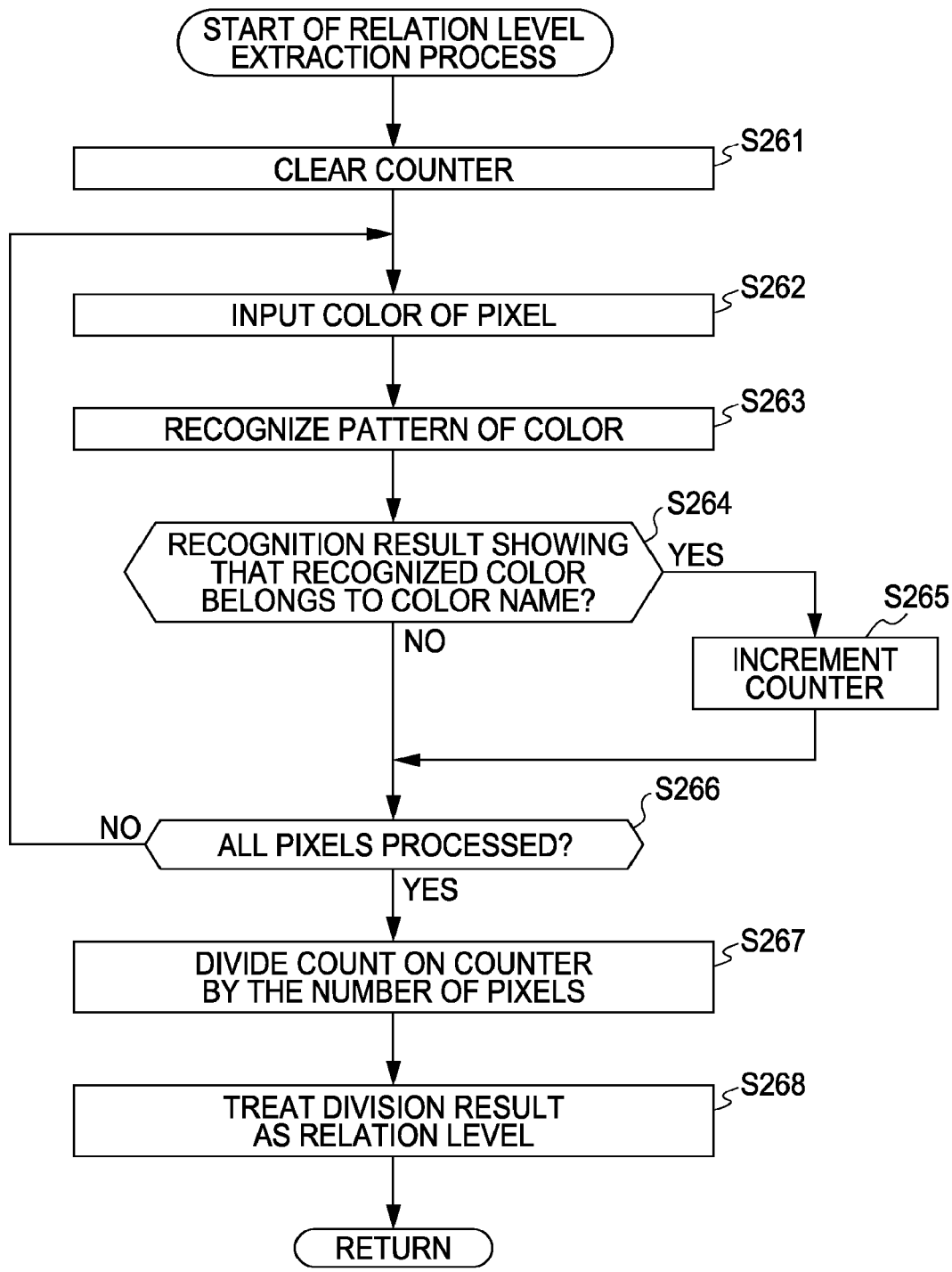
FIG. 44 is a flowchart illustrating in detail yet another relation level extraction process.

FIG. 44 is a flowchart illustrating in detail another relation level extraction process performed in step S204 of FIG. 36 when the red relation level extractor 402 is identified in step S203. Steps S261 and S262 are respectively identical to steps S221 and S222 of FIG. 37, and the discussion thereof is omitted herein.

In step S263, the red relation level extractor 402 recognizes a pattern of a color of a pixel.

For example, in step S263, the red relation level extractor 402 recognizes the color of the pixel using a neural network. For example, a pattern recognition technique using the neural network is described in the book entitled "Recognition Engineering—Pattern Recognition and Applications thereof" authored by Junichiro TORIWAKI, published by CORONA PUBLISHING CO., LTD.

In the pattern recognition, a plurality of pieces of determination data indicating whether a color having a particular color value (L*a*b*) is a color of a particular color name is manually collected beforehand, and a neural network learning process is performed on the collected determination data to produce parameters required for recognition.

FIG. 45 illustrates an example of the determination data indicating whether the color value is blue or not. In the determination data of FIG. 45, a color identified by an L* value of 0.02, an a* value of 0.04, and a b* value of 0.10 is not blue, a color identified by an L* value of 0.72, an a* value of 0.00, and a b* value of 0.12 is blue, and a color identified by an L* value of 0.28, an a* value of –0.02, and a b* value of 0.15 is not blue.

The use of the neural network allows the color of the pixel to be determined as the color of a particular color name in accordance with the parameters thus generated.

Any technique of pattern recognition is acceptable as long as the technique determines whether the color of the pixel is the color of a particular color name. For example, support vector machine (SVM) technique may be used.

In step S264, the red relation level extractor 402 determines the recognition result as to whether the color of the pixel belongs to red. If it is determined in step S264 that the color of the pixel belongs to red, processing proceeds to step S265. The red relation level extractor 402 increments the counter by 1 and then proceeds to step S266.

If it is determined in step S264 that the color of the pixel does not belong to red, processing proceeds to step S266 skipping step S265, namely, without incrementing the counter.

Steps S266 through S268 are respectively identical to steps S226 through S228, and the discussion thereof is omitted herein.

Furthermore, the certainty factor may be calculated using the pattern recognition technique.

Figure 46:
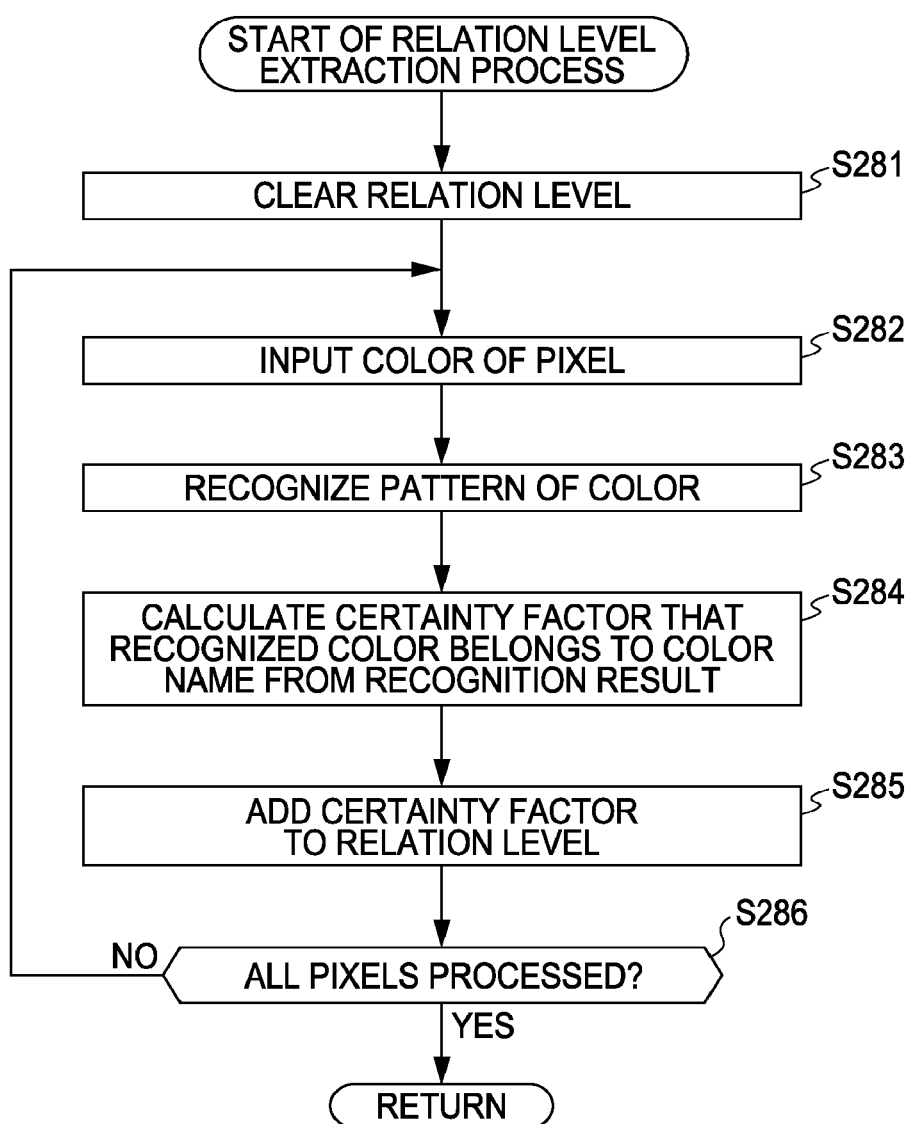
FIG. 46 is a flowchart illustrating in detail still another relation level extraction process.

FIG. 46 is a flowchart illustrating in detail the relation level extraction process performed in step S204 of FIG. 36 when the red relation level extractor 402 is identified in step S203. Step S281 is identical to step S241 of FIG. 43, and the discussion thereof is omitted herein. Steps S282 and S283 are respectively identical to steps S262 and S263 of FIG. 44, and the discussion thereof is omitted herein.

In step S284, the red relation level extractor 402 calculates, as the recognition result, the certainty factor that the color of the pixel belongs to the color of the color name. More specifically, in step S284, the red relation level extractor 402 calculates, as the recognition result, the certainty factor that the color of the pixel belongs to red. For example, a value input to an output layer of the neural network may be used as the certainty factor.

Steps S285 and S286 are respectively identical to steps S245 and S246 of FIG. 43, and the discussion thereof of omitted herein.

The relation level extraction process to be performed in step S204 of FIG. 36 when the blue relation level extractor 403 is identified in step S203, and the relation level extraction process to be performed in step S204 of FIG. 36 when the yellow relation level extractor 404 is identified in step S203 are respectively identical to the relation level process to be performed in step S204 when the red relation level extractor 402 is identified in step S203, except that the blue relation level extractor 403 and the yellow relation level extractor 404 operate and that sub spaces are different. The rest of the process remains unchanged from the process discussed with reference to FIGS. 37, 43, 44, and 46, and the discussion thereof is omitted herein.

Figure 47:
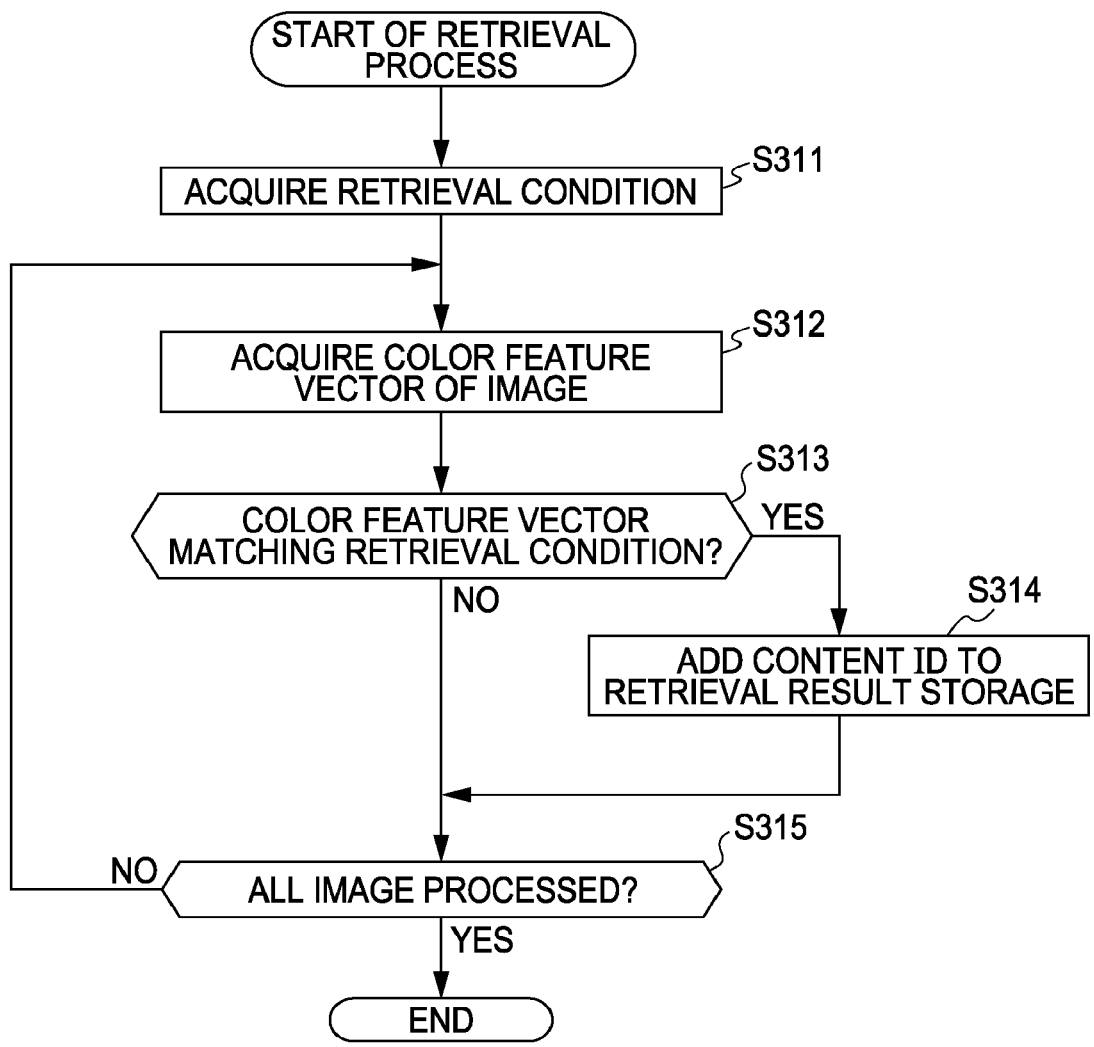
FIG. 47 is a flowchart illustrating the retrieval process.

FIG. 47 is a flowchart illustrating the retrieval process. In step S311, the retrieval condition input unit 421 acquires a retrieval condition relating to the relation level in response to a signal from the input unit 76 operated by the user. The retrieval condition input unit 421 supplies the retrieval condition relating to the relation level to the condition matching unit 422.

As shown in FIG. 48, the a graphical user interface (GUI) image is displayed on the output unit 77 as a display unit. As shown in FIG. 48, slide bars 491 operated by the user specify granularity (threshold value) of each color as the retrieval condition. When a check box 492 is checked by the user, the granularity of the color name specified by the slide bar 491 corresponding to the checked check box 492 is acquired in step S311 as the retrieval condition.

When a black check box 492, a red check box 492, and a green check box 492 are checked, a black granularity specified by a black slide bar 491, a red granularity specified by a red slide bar 491, and a green granularity specified by a green slide bar 491 are acquired in step S311 as the retrieval condition.

When an AND search radio button 493 is selected, a logical AND of granularities of the colors specified by the slide bars 491 is set as the final retrieval condition. When a OR search radio button 494 is selected, a logical OR of granularities of the colors specified by the slide bars 491 is set as the final retrieval condition.

More specifically, in step S311, the retrieval condition input unit 421 acquires the retrieval condition represented in a logical formula for a plurality of color names, such as ("red">0.5) AND ("blue"≥0.5) AND ("green"<0.1).

The user may wish to retrieve a photo of blue sky. The user then inputs a retrieval condition of "blue"≥0.3. In step S311, the retrieval condition input unit 421 acquires the retrieval condition of "blue"≥0.3.

The user may wish to retrieve a photo of strawberry picking and input a retrieval condition of ("red">0.1) AND ("green"≥0.3). In step S311, the retrieval condition input unit 421 acquires the retrieval condition of ("red">0.1) AND ("green"≥0.3).

The color name of the color in the retrieval condition is not necessarily a color name defined (prepared) by the relation level extractor. More specifically, the color name of the color in the retrieval condition may be part of the defined color name or one color name.

The color name may be directly input in numerals and then acquired.

In step S312, the condition matching unit 422 acquires from the extracted feature storage 146 the color feature vector of the master image 201 to be retrieved.

In step S313, the condition matching unit 422 determines whether the acquired color feature vector satisfies the retrieval condition. In step S313, elements of the color name corresponding to the checked check box 492 from among the elements of the acquired color feature vector are compared with the granularity of the color name specified by the slide bar 491. The condition matching unit 422 determines that the color feature vector satisfies the retrieval condition if the element of the color name of the color feature vector is higher than the specified granularity.

For example, the logical AND of the granularities of the colors may be the final retrieval condition. The condition matching unit 422 determines in step S313 that the color feature vector satisfies the retrieval condition if the element of the color name of the color feature vector is higher than the specified granularity in all elements of the color name corresponding to the checked check box 492. For example, the logical OR of the granularities of the colors may be the final retrieval condition. The condition matching unit 422 determines in step S313 that the color feature vector satisfies the retrieval condition if the element of the color name of the color feature vector is higher than the specified granularity in any of elements of the color name corresponding to the checked check box 492.

If it is determined in step S313 that the acquired color feature vector satisfies the retrieval condition, processing proceeds to step S314. The condition matching unit 422 additionally stores to the search result storage 147 the content ID identifying the master image 201 corresponding to the color feature vector acquired in step S312, and then proceeds to step 315.

If it is determined in step S313 that the acquired color feature vector fails to satisfy the retrieval condition, processing proceeds to step S315 skipping step S314, i.e., without additionally storing the content ID on the search result storage 147.

In step S315, the retrieval condition input unit 421 determines whether the current image is the final one, i.e., whether all images have been completed. If it is determined in step S315 that all images have not retrieved, processing returns to step S312. The color feature vector of a next master image 201 is then acquired to repeat the above-described process.

If it is determined in step S315 that the current image is the final one, i.e., that all images have been retrieved, processing ends.

After the above process, the content ID identifying the master image 201 satisfying the retrieval condition is stored on the retrieval result storage 147.

Figure 49A:
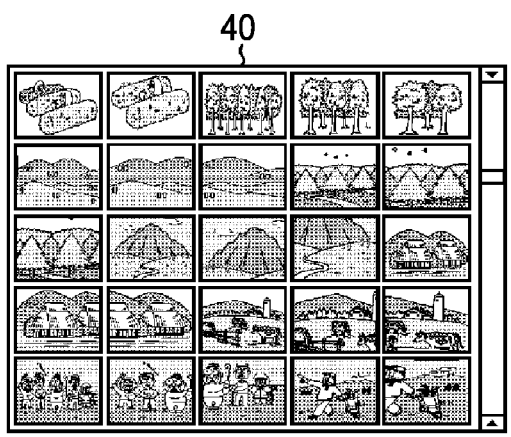
FIGS. 49A-49D illustrate an image hit in the retrieval process.
Figure 49B:
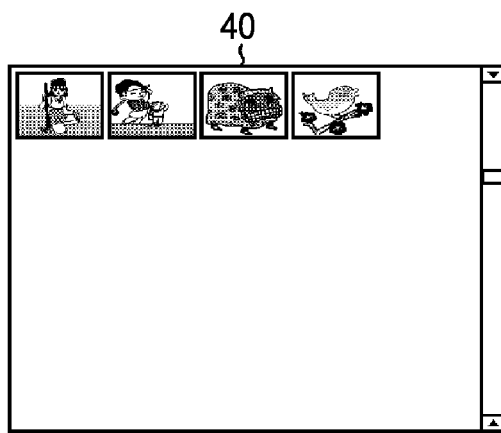

FIGS. 49A-49D illustrate examples of the master image 201 identified by the content ID stored on the retrieval result storage 147 and displayed on the output unit 77 as a display unit. For example, the green check box 492 might be checked, and the green slide bar 491 might specify a granularity. As shown in FIG. 49A, the master image 201 containing a large amount of green is displayed on the output unit 77. The green check box 492 might be checked with a granularity specified on the green slide bar 491, and the red check box 492 might be checked with a granularity specified on the red slide bar 491, and the AND search radio button 493 might be selected. As shown in FIG. 49B, the master image 201 containing large amount of green and red is displayed on the output unit 77.

Figure 49C:
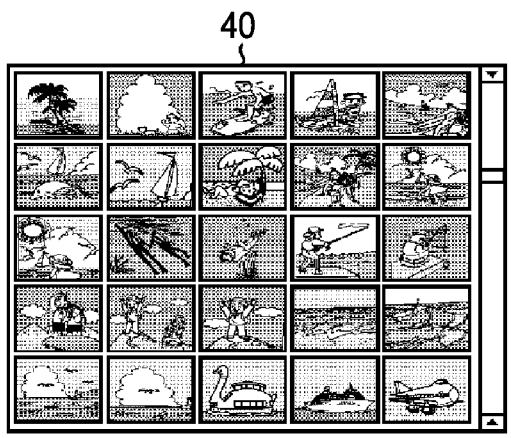
Figure 49D:
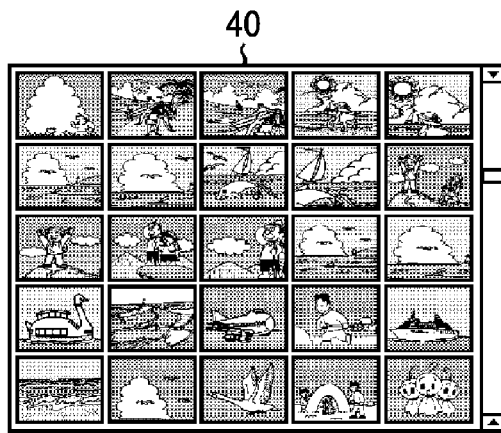

The blue check box 492 might be checked with a granularity specified on the blue slide bar 491. As shown in FIG. 49C, the master image 201 containing a large amount of blue is displayed on the output unit 77. The blue check box 492 might be checked with a granularity specified on the blue slide bar 491, the white check box 492 might be checked with a granularity specified on the white slide bar 491, and the AND search radio button 493 might be selected. In this case, as shown in FIG. 49C, the master image 201 containing large amounts of blue and white is displayed on the output unit 77.

It is easy for the user to estimate what color is contained in a desired image. The user can thus search and retrieve the desired image easily.

Depending the retrieval results, the user can re-retrieve the images with the retrieval condition narrowed, i.e., with the granularity modified. The user can thus retrieve a desired image even more easily.

The user can thus retrieve intuitively images from a color impression and an environment of each image.

Since a variety of retrieval conditions is set on the collection of images, a retrieval result as an image can be obtained at any granularity.

A color feature vector containing the relation level may be extracted from the images so that the images may be retrieved in accordance with the result of magnitude comparison with the relation level or logical computation. The images can thus be retrieved quickly.

Since the relation level is described in numerical values in a relatively small digit number, a data size of the color feature vector is reduced. A small recording space for the color feature vector works.

The digital still camera 11 and the cellular phone 12 have been described as the device. Any device is acceptable as long as the device handles images. For example, a mobile player or a mobile viewer may be acceptable as the device.

With the metadata of the image recorded, the device can retrieve the image. The device captures an image, records information relating to the image with the image associated therewith as data having a predetermined data structure, and controls transmission of the image to an image processing apparatus. The image processing apparatus controls reception of the image transmitted from the device, extracts a feature of the received image, stores the feature extracted from the image with the image associated therewith as data having the same data structure as in the device, and controls transmission of the feature of the image to the device. In such an arrangement, the device having even a relatively small throughput can retrieve a desired image.

With the metadata of the image recorded, the device can retrieve the image. The feature of the image is extracted, and the feature extracted from the image is stored with the image associated therewith as data having a predetermined data structure. Information relating to the image is stored as data having the same data structure as above on the device. Transmission of the data to the device is controlled. In such an arrangement, the device having even a relatively small throughput can retrieve a desired image.

The above series of process steps may be performed using hardware or software. If the above series of process steps is performed using software, a computer program forming the software may be installed onto a computer contained in a hardware structure or a general purpose personal computer that performs a variety of processes.

As shown in FIGS. 2 and 3, recording media recording a program to be installed on the computer and to be made ready for execution by the computer include removable medium 82 including magnetic disks (including a flexible disk), optical disks (including compact disk read-only memory (CD-ROM), digital versatile disk (DVD) and magneto-optical disk) or a semiconductor memory, and the ROM 72, the EEPROM 46, or a hard disk such as the storage unit 78 for temporarily or permanently storing the program. The storage of the program onto the recording media may be performed using wireless or wired communication media including the communication unit 47, the communication unit 48, the communication unit 79, and the communication unit 80, such as interfaces including a router and a modem, and a local area network, the Internet, and digital broadcasting satellites.

Process steps describing the program to be stored on the recording medium may be performed in the same time series order as described above. The process steps may not be performed in the time series order as described. Alternatively, the process steps may be performed in parallel or separately.

In the context of this specification, the system refers to an entire system including a plurality of apparatuses.

It should be understood by those skilled in the art that various modifications, combinations, sub-combinations and alterations may occur depending on design requirements and other factors insofar as they are within the scope of the appended claims or the equivalents thereof.

What is claimed:

1. An information processing apparatus comprising:
   circuitry configured to:
     receive via a network an input image from an image capturing device;
     extract feature information about a face from the input image, the feature information corresponding to at least one of a position of the face in the input image, size of the face in the input image or direction in which the face is positioned in the input image;
     control searching of other images stored in the information processing apparatus using the feature information; and
     control outputting to an external device one or more output images stored in the information processing apparatus that are determined to have common feature information with the input image.

2. The information processing apparatus of claim 1 wherein the external device is different than the image capturing device.

3. The information processing apparatus of claim 1, wherein to extract feature information about the face comprises the circuitry being further configured to identify a pixel having a pixel value indicating a color falling within a predetermined color range corresponding to human skin.

4. The information processing apparatus of claim 3, further comprising the circuitry being further configured to identify the face in the input image as an area composed of consecutive pixels of a predetermined number from among pixels identified as falling within the predetermined color range.

5. The information processing apparatus of claim 1, wherein the circuitry comprises a processor that is configured to perform one or more of the receive, extract feature information, control feature similarity and control outputting functions using programming instructions stored on a memory.

6. The information processing apparatus of claim 5, wherein the apparatus comprises a server that includes the processor.

7. The information processing apparatus of claim 1 wherein common feature information between the one or more output images and the input image comprises a determination that pixels classified in a given color appear in the one or more output images and in the input image.

8. The information processing apparatus of claim 1 wherein common feature information between the one or more images and the input image comprises a determination that a given face appears in the one or more output images and in the input image.

9. The information processing apparatus of claim 1 wherein common feature information between the one or more output images and the input image comprises a color histogram, a vertical component histogram and a horizontal component histogram associated with the input image.

10. An information processing method comprising:
    receiving via a network an input image from an image capturing device;
    extracting feature information about a face from the input image, the feature information corresponding to at least one of a position of the face in the input image, size of the face in the input image or direction in which the face is positioned in the input image;
    searching other images stored in a memory using the feature information; and
    outputting to an external device one or more output images stored in the information processing apparatus that are determined to have common feature information with the input image.

11. The information processing method of claim 10, wherein extracting feature information about the face comprises identifying a pixel having a pixel value indicating a color falling within a predetermined color range corresponding to human skin.

12. The information processing method of claim 10, wherein extracting feature information about the face comprises identifying a facial feature in the input image as an area composed of consecutive pixels of a predetermined number from among pixels identified as falling within a predetermined color range.

13. The information processing method of claim 10, wherein common feature information between the one or more output images and the input image comprises a determination that pixels classified in a given color appear in the one or more output images and in the input image.

14. The information processing method of claim 10 further comprising determining common feature information between the one or more images and the input image by identifying a given face as appearing in the one or more output images and in the input image.

15. The information processing method of claim 10 wherein common feature information between the one or more output images and the input image comprises a color histogram, a vertical component histogram and a horizontal component histogram associated with the input image.

16. A non-transitory storage medium storing a program, the program when executed by one or more processing devices cause the processing devices to perform a method comprising:

receiving via a network an input image from an image capturing device;

extracting feature information about a face from the input image, the feature information corresponding to at least one of a position of the face in the input image, size of the face in the input image or direction in which the face is positioned in the input image;

searching other images stored in a memory using the feature information; and outputting to an external device one or more output images stored in the information processing apparatus that are determined to have common feature information with the input image.

17. The non-transitory storage medium of claim 16, wherein extracting feature information about the face comprises identifying a pixel having a pixel value indicating a color falling within a predetermined color range corresponding to human skin.

18. The non-transitory storage medium of claim 16, wherein extracting feature information about the face comprises identifying a facial feature in the input image as an area composed of consecutive pixels of a predetermined number from among pixels identified as falling within a predetermined color range.

19. The non-transitory storage medium of claim 16, wherein common feature information between the one or more output images and the input image comprises a determination that pixels classified in a given color appear in the one or more output images and in the input image.

* * * * *